United States Patent
Li et al.

(10) Patent No.: US 9,775,045 B2
(45) Date of Patent: Sep. 26, 2017

(54) SLICING ARCHITECTURE FOR WIRELESS COMMUNICATION

(71) Applicant: Intel IP Corporation, Santa Clara, CA (US)

(72) Inventors: Qian Li, Hillsboro, OR (US); Huaning Niu, Milpitas, CA (US); Geng Wu, Plano, TX (US); Mo-Han Fong, Sunnyvale, CA (US); Apostolos Papathanassiou, San Jose, CA (US)

(73) Assignee: INTEL IP CORPORATION, Santa Clara, CA (US)

(*) Notice: Subject to any disclaimer, the term of this patent is extended or adjusted under 35 U.S.C. 154(b) by 0 days.

(21) Appl. No.: 15/056,965

(22) Filed: Feb. 29, 2016

(65) Prior Publication Data
US 2017/0079059 A1    Mar. 16, 2017

Related U.S. Application Data

(60) Provisional application No. 62/217,632, filed on Sep. 11, 2015, provisional application No. 62/217,536, filed on Sep. 11, 2015, provisional application No. 62/247,664, filed on Oct. 28, 2015, provisional application No. 62/250,447, filed on Nov. 3, 2015, provisional application No. 62/265,699, filed on Dec. 10, 2015.

(51) Int. Cl.
| | |
|---|---|
| *H04W 72/04* | (2009.01) |
| *H04W 16/02* | (2009.01) |
| *H04W 24/02* | (2009.01) |
| *H04W 28/08* | (2009.01) |
| *H04W 88/08* | (2009.01) |

(52) U.S. Cl.
CPC ............ *H04W 16/02* (2013.01); *H04W 24/02* (2013.01); *H04W 28/08* (2013.01); *H04W 88/085* (2013.01)

(58) Field of Classification Search
CPC ... H04W 16/02; H04W 24/02; H04W 88/085; H04W 28/08
See application file for complete search history.

(56) References Cited

U.S. PATENT DOCUMENTS

| | | | |
|---|---|---|---|
| 8,705,483 | B2 | 4/2014 | Liu |
| 9,059,778 | B2 | 6/2015 | Ling |
| 9,112,758 | B2 | 8/2015 | Niu et al. |
| 9,119,097 | B2 | 8/2015 | Chatterjee et al. |

(Continued)

FOREIGN PATENT DOCUMENTS

| | | |
|---|---|---|
| WO | 2014025945 A2 | 2/2014 |
| WO | 2014028130 A1 | 2/2014 |

(Continued)

OTHER PUBLICATIONS

International Search Report and Written Opinion mailed on Feb. 29, 2016 for International Application No. PCT/US2015/061064; 18 pages.

(Continued)

*Primary Examiner* — Omar Ghowrwal
(74) *Attorney, Agent, or Firm* — Schwabe, Williamson & Wyatt, P.C.

(57) ABSTRACT

Embodiments provide a system, apparatus, or non-transitory computer readable medium to provide a slicing architecture for wireless communications systems.

24 Claims, 27 Drawing Sheets

(56) References Cited

U.S. PATENT DOCUMENTS

| | | | |
|---|---|---|---|
| 9,380,614 | B2 | 6/2016 | Hahn et al. |
| 2010/0069109 | A1* | 3/2010 | Hall ................. H04W 72/1215 455/522 |
| 2012/0176966 | A1 | 7/2012 | Ling |
| 2013/0100907 | A1 | 4/2013 | Liu |
| 2013/0272170 | A1 | 10/2013 | Chatterjee et al. |
| 2014/0226736 | A1 | 8/2014 | Niu et al. |
| 2014/0349667 | A1 | 11/2014 | Hahn et al. |
| 2015/0245307 | A1* | 8/2015 | Chen ................. H04W 56/0045 370/336 |
| 2015/0257012 | A1 | 9/2015 | Zhang |
| 2016/0183248 | A1 | 6/2016 | Niu et al. |
| 2016/0205024 | A1* | 7/2016 | Haran ..................... H04L 47/22 370/235 |

FOREIGN PATENT DOCUMENTS

| | | |
|---|---|---|
| WO | 2014076004 A2 | 5/2014 |
| WO | 2014124160 A2 | 8/2014 |
| WO | 2015044871 A1 | 4/2015 |
| WO | 2016039839 A1 | 3/2016 |
| WO | 2016099748 A1 | 6/2016 |

OTHER PUBLICATIONS

International Search Report and Written Opinion mailed on Mar. 17, 2016 for International Application No. PCT/US2015/038679; 12 pages.

International Search Report and Written Opinion mailed on Aug. 17, 2016 for International Application No. PCT/US2016/020034; 16 pages.

International Search Report and Written Opinion mailed on May 13, 2016 for International Application No. PCT/US2016/020071; 20 pages.

International Search Report and Written Opinion mailed on May 20, 2016 for International Application No. PCT/US2016/020027; 15 pages.

International Search Report and Written Opinion mailed on Jul. 8, 2016 for International Application No. PCT/US2016/020029; 14 pages.

International Search Report and Written Opinion mailed on Aug. 29, 2016 for International Application No. PCT/US2016/020111; 14 pages.

3GPP TS 36.300 V13.1.0 (Sep. 2015); "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Sep. 23, 2015; 254 pages.

CMCC; "Discussion on Necessity of the Study on RAN Virtualization," 3GPP TSG RAN #64 Meeting, RP-140705, Agenda Item: 14.1.3; Sophia Antipolis, France, Jun. 10-13, 2014; 4 pages.

3GPP TR 22.891 V1.3.1 (Feb. 2016); "Technical Specification Group Services and System Aspects; Feasibility Study on New Services and Markets Technology Enablers; State 1 (Release 14)," Feb. 18, 2016; 97 pages.

3GPP TR 22.891 V0.1.1 (Apr. 2015); "Technical Specification Group Services and System Aspects; Feasibility Study on New Services and Markets Technology Enablers; Stage 1 (Release 14)," 25 pages.

CATT, RITT; "MAC Architecture for 1.28Mcps TDD Enhanced Uplink," 3GPP TSG RAN WG2#53 R2-061328, Agenda Item: 15; Shanghai, China, May 8-12, 2006; 9 pages.

Federico Boccardi, et al.; "Five Disruptive Technology Directions for 5g," IEEE Communications Magazine, Feb. 1, 2014; 7 pages.

Huber Flores, et al.; "Mobile Code Offloading: From Concept to Practice and Beyond," IEEE Communications Magazine, Mar. 1, 2015; 9 pages.

Intel Corporation et al.; "Smarter Use case for Bio-connectivity," 3GPP TSG-SA WG1 Meeting #71, S1-152413, Agenda Item: 8.1; Belgrade, Serbia, Aug. 17-21, 2015; 2 pages.

NGMN Alliance; "Description of Network Slicing Concept," Version 1.0; NGMN P1 WS1 E2E Architecture Team; Jan. 13, 2016; 7 pages.

NGMN Alliance; "5G White Paper," Version 1.0; NGMN 5G Initiative; Feb. 17, 2015; 125 pages.

Muhammad Shiraz, et al.; "A Review on Distributed Application Processing Frameworks in Smart Mobile Devices for Mobile Cloud Computing," IEE Communications Surveys & Tutorials, vol. 15, No. 3; Jul. 1, 2013; 20 pages.

\* cited by examiner

SLICING ARCHITECTURE FOR WIRELESS COMMUNICATION

RELATED APPLICATIONS

The present application claims priority to U.S. Provisional Patent Application Nos. 62/217,536, filed Sep. 11, 2015; 62/217,632, filed Sep. 11, 2015; 62/247,664, filed Oct. 28, 2015; 62/250,447, filed Nov. 3, 2015; and 62/265,699, filed Dec. 10, 2015, the entire specification of all of these priority applications are hereby incorporated by reference in their entirety, and for all purposes.

TECHNICAL FIELD

Embodiments described herein generally relate to the field of wireless communications systems, and in particular to the management of the Radio Access Network of a wireless communications system.

BACKGROUND

Implementations of the disclosure generally may relate to the field of wireless communications.

BRIEF DESCRIPTION OF THE DRAWINGS

Aspects, features and advantages of embodiments of the present disclosure will become apparent from the following description of embodiments in reference to the appended drawings in which like numerals denote like elements and in which.

DETAILED DESCRIPTION

Figure 1:
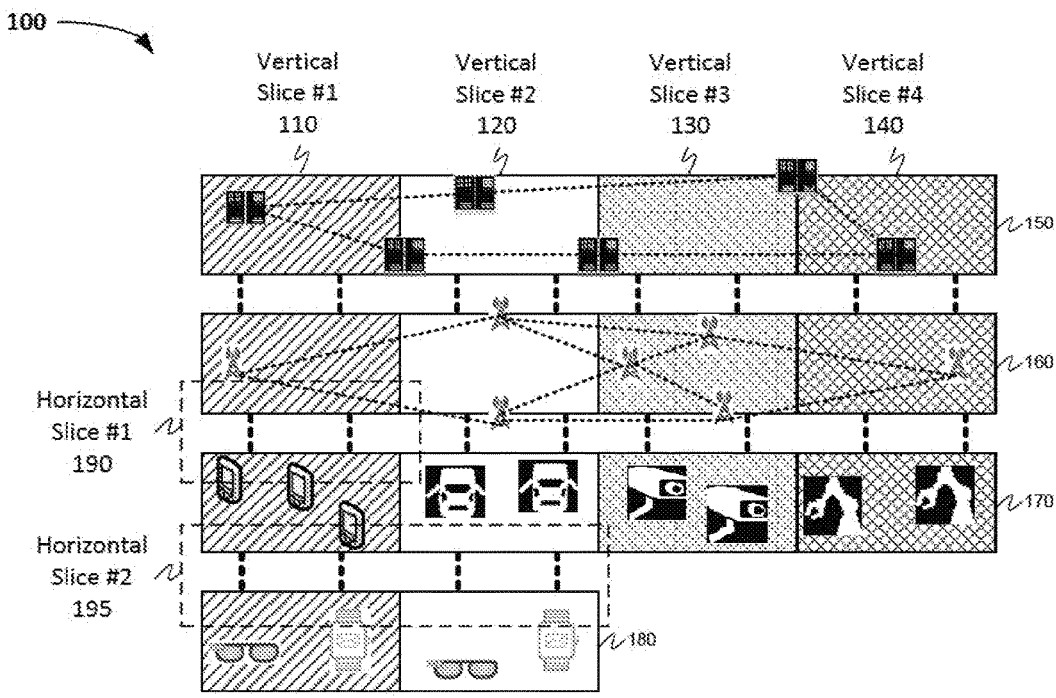
FIG. 1 shows a first view of the broad concept of vertical and horizontal network slicing.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the present disclosure. However, it will be apparent to those skilled in the art having the benefit of the present disclosure that the various aspects of the claims may be practiced in other examples that depart from these specific details. In certain instances, descriptions of well-known devices, circuits, and methods are omitted so as not to obscure the description of the present disclosure with unnecessary detail.

In fourth generation Long Term Evolution (4G-LTE) and LTE-Advanced/Pro wireless communications networks, there has been a trend for heterogeneity in the network architecture and applications. Examples of these trends are the development of small cells and relay networks, device-to-device (D2D) communication networks (also known as proximity services (ProSe)), and machine type communications (MTC). Small cells may be considered any form of cell that is smaller than the traditional macro eNB/base station, e.g. micro/pico/femto cells. Moving into fifth generation (5G) wireless communications networks, the trend of heterogeneity may be more prominent, and suitably improved methods and apparatus for control of the wireless resources is desirable. For example, because the 5G wireless communication networks may be expected to serve diverse range of applications (with various traffic types and requirements), network and user equipment (with various communication and computation capabilities), and commercial markets (i.e. use-cases) other than the more traditional voice services (e.g. Voice over LTE, VoLTE) and mobile broadband (MBB), there is a desire to provide control over each of these use-cases, so that an optimized, or at least improved, use of the wireless resources is possible.

Embodiments of the present disclosure generally relate to the slicing of a radio access network (RAN) architecture of a wireless communications network. The RAN may be the portion of the wireless communications network that implements one or more radio access technologies (RATs), and may be considered to reside at a position located between a user device (UE) such as a mobile phone, smartphone, connected laptop, or any remotely controlled (or simply accessible) machine and provides connection with the core network (CN) servicing the wireless communications network. The RAN may be implemented using silicon chip(s) residing in the UEs and/or base stations, such as enhanced Node B (eNBs), base stations, or the like that form the cellular based wireless communications network/system. Examples of RANs include, but are not limited to: GRAN (a GSM radio access network); GERAN (essentially an EDGE enabled GRAN); UTRAN (a UMTS radio access network); and E-UTRAN (an LTE, or LTE-Advance/Pro, high speed and low latency radio access network).

The herein described embodiments discuss the general architecture of network slicing in a radio access network of a wireless communication network, such as but not limited to a 5G wireless communication network. In particular, embodiments may include the concept of horizontal and vertical network slicing. Vertical slicing may comprise slicing the radio access network according to vertical markets, where a vertical market may comprise a single/particular type of communication (i.e. that may be defined as a single or particular use-case for the communications involved), out of the many existing and new types of communication that may be carried out over future wireless communication networks, particularly including the radio access network. A commercial market that may be provisioned over a wireless communications network may also be called a vertical market. The existing types include Mobile Broad Band (MBB) and Voice (VoLTE), while the new types of communication may include new types of connectivity services and use-cases, such machine type communications (MTC), personal area networks, dedicated health networks, machine to machine (M2M), enhanced MBB (eMBB), time critical communications, vehicle communications (V2X) (including vehicle to vehicle (V2V) and vehicle to infrastructure (V2I)), and the like. The definition of a vertical market is not limited, and will cover any existing or future logical separation (i.e. segregation, partition or the like) of a physical radio access network for exclusive use by wireless communications for particular use, or type of communication. In some examples, there may be multiple physical radio access networks in use, each separated into logically separated radio access networks.

The proposed network slices may be programmable and highly scalable and flexible, taking into consideration the availability, latency and power requirements and impact on battery life, reliability, capacity, security and speed of the wireless communications network required by each particular use-case.

Network slicing is considered as one of the key technologies to fulfill the diverse requirements and the diverse services and applications expected to be supported in 5G communication networks. This is because, in wireless communication technologies, further improving the spectral efficiency at the radio link level is becoming increasingly challenging, so new ways have been found to build future wireless networks and devices served by those wireless networks to meet the ever increasing capacity demand. To achieve these goals, 5G and future generations of wireless networks, and in particular the wireless devices serving those, or served by those wireless networks, are evolving, to be about the combination of computing and communications, and the provision of end-to-end solutions. This is a paradigm shift from previous generations where technology development focused primarily on single level communications alone.

To provide the increased capacity in wireless networks, they may be sliced. This may involve slicing (i.e. logically partitioning/separating) the traditional large, single, mobile broadband network into multiple virtual networks to serve vertical industries and applications in a more cost and resource efficient manner. Each network slice may have a different network architecture, and different application, control, packet and signal processing capabilities and capacity, in order to achieve optimum return on investment. New vertical slices (i.e. industry or type of service) can be added to an existing sliceable wireless network at any time, instead of deploying a new dedicated wireless network for that vertical market. Thus, vertical network slicing provides a practical means to segregate the traffic from a vertical application standpoint from the rest of general mobile broadband services, thereby practically avoiding or dramatically simplifying the traditional QoS engineering problem. Wireless network slicing may include slicing in both the core network and the radio access networks (i.e. is an end-to-end solution).

In 5G wireless networks and beyond, the capacity scaling of a network may no longer be as uniform as it has been in previous generations. For example, the scaling factor may be higher when the wireless network is closer to a user, and lower as we move deeper into the infrastructure of the wireless network. This non-uniform scaling may be a result of an augmented user experience enabled by the significantly increased sensing capabilities (and/or processing resources) available at the wireless devices making use of wireless networks. Unlike previous generations of wireless networks where a network serves primarily as a data pipe, scaling uniformly (but singularly) from end-to-end as the air interface improves, 5G and future generations of wireless networks may at least partly rely on information networks comprising diverse (heterogeneous and/or homogeneous) computing, networking and storage capabilities of the wireless networks and the wireless devices they serve/are served by.

For example, the overall wireless network may continue to scale up rapidly, but the computing and networking at the network edge may grow even faster, therefore enabling user data traffic to be processed at the edge of the wireless network (so-called edge cloud applications). User devices may no longer be simply "terminals" that terminate a communication link. Instead, they may become a new generation of moving or fixed networking nodes for a new generation of consumer devices, machines, and things. For example, a laptop, a tablet, a smart phone, a home gateway or any other wireless network device (or component device forming the, or part of the, wireless network device as sold to the consumer), can become a computing and networking center of a network cluster with many devices or things deployed around it. For example, it may form a Personal Area Network (PAN). Many such mobile or fixed wireless network clusters may form what may be called an underlay network, a new type of network in 5G and beyond, with devices capable of communicating with each other or directly with the fixed networks, and with computing able to be offloaded to larger form-factor platforms or edge cloud base stations (i.e. entities in the wireless network with greater processing resources, either outright, or simply available at the that time). This may be done to achieve optimum mobile computing and communication over a virtualized platform across many devices, including the edge cloud.

This new kind of wireless network scaling may be driven by a number of factors. For example, as device sensing is typically local, the processing of sensed data may be local, and the decisions and actions upon sensed data become local. This trend may be further amplified by the proliferation of wearable devices and the internet of things. For example, as machines start playing a greater role in communication than human users, the whole communication link speed may be increased.

The definition of end-to-end is therefore to be revisited, as an increasing number of communication links are in the proximity of users and user devices. It is therefore proposed to provide a cloud architecture framework that may incorporate data centers as well as edge clouds providing local intelligence and services closer to the end users or devices. This may be because, for example, as wireless networks and systems get deployed in enterprise, home, office, factory and automobile, edge cloud servers become more important for both performance and information privacy and security. These latter factors may be driven by user's (and governments) growing concern on privacy and security. Moreover, data centers deep into the fixed networks may continue to grow rapidly since many existing services may be better served with centralized architecture, with the new generation of portable and wearable devices, drones, industrial machines, self-driving cars, and the like fueling even more rapid growth in communication and computing capabilities at the edge of the network and locally around users.

The newly introduced concept of network slicing, particularly of the sort that provides a wireless network system architecture that has End-to-End (E2E) vertical and horizontal network slicing may introduce changes to the air interface, the radio access network (RAN) and the core network (CN) to enable a wireless network system with E2E network slicing.

In simple terms horizontal slicing enhances device capability by allowing computing resources to be shared across devices serving or being served (i.e. in or on) the wireless network, according to the processing needs of those devices over time and space/location.

Horizontal network slicing is designed to accommodate the new trend of traffic scaling and enable edge cloud computing and computing offloading: The computing resources in the base station and the portable device may be horizontally sliced, and these slices, together with the wearable devices may be integrated to form a virtual computing platform though a new wireless air interface design as described herein, in order to significantly augment the computing capability of future portable and wearable devices. Horizontal slicing augments device capability and enhances user experience.

Network slicing, in the most general of terms, may be thought of as a way to use virtualization technology to architect, partition and organize computing and communication resources of a physical wireless network infrastructure, into one or more logically separated radio access networks, to enable flexible support of diverse use-case realizations. For example, with network slicing in operation, one physical wireless network may be sliced into multiple logical radio access networks, each architected and optimized for a specific requirement and/or specific application/service (i.e. use-case). Thus, a network slice may be defined as a self-contained, in terms of operation and traffic flow, and may have its own network architecture, engineering mechanisms and network provision. Network slicing as proposed herein is able to simplify the creation and operation of network slices and allows function reuse and resource sharing of the physical wireless network infrastructure (i.e. provides efficiencies), whilst still providing sufficient wireless network resources (communications and processing resources) for the wireless devices served by the wireless network.

Vertical slicing is targeted at supporting diverse services and applications (i.e. use-case/types of communication). Examples include but are not limited to: Wireless/Mobile Broadband (MBB) communications; Extreme Mobile Broadband (E-MBB) communications; Real-time use-case such as Industrial Control communications, Machine-to-Machine communications (MTC/MTC1); non-real-time use-case, such as Internet-of-Things (IoT) sensors communications, or massive-scale Machine-to-Machine communications (M-MTC/MTC2); Ultra Reliable Machine-to-Machine communications (U-MTC); Mobile Edge Cloud, e.g. caching, communications; Vehicle-to-Vehicle (V2V) communications; Vehicle-to-Infrastructure (V2I) communications; Vehicle-to-anything communications (V2X). This is to say, the present disclosure relates to providing network slicing according to any readily definable/distinguishable type of communication that can be carried out over a wireless network. Vertical network slicing enables resource sharing among services and applications, and may avoid or simplify a traditional QoS engineering problem.

Horizontal network slicing, meanwhile, is targeted at extending the capabilities of devices in the wireless network, particularly mobile devices that may have limitations on the local resources available to them, and enhancing user experiences. Horizontal network slicing goes across and beyond the hardware platforms' physical boundaries. Horizontal network slicing enables resource sharing among network nodes and devices, i.e., highly capable network nodes/devices may then share their resources (e.g., computation, communication, storage) to enhance the capabilities of less capable network nodes/devices. A simple example may be to use a network base station and/or a smartphone mobile device, to supplement the processing and communication capabilities of a wearable device. An end result of horizontal network slicing may be to provide a new generation of mobile (e.g. moving) underlay network clusters, where mobile terminals become moving networking nodes. Horizontal slicing may provide over-the-air resource sharing across wireless network nodes. The wireless network air interface in use may be an integrated part and an enabler of horizontal slicing.

Vertical network slicing and horizontal network slicing may form independent slices. The end-to-end traffic flow in a vertical slice may transit between the core network and the terminal devices. The end-to-end traffic flow in a horizontal slice may be local and transit between the client and host of a mobile edge computation service.

In vertical slicing, each of the network nodes may implement similar functions among the separate slices. A dynamic aspect of vertical slicing may lie predominantly in the resource partitioning. In horizontal slicing, however, new functions could be created at a network node when supporting a slice. For example, a portable device may use different functions to support different types of wearable devices. The dynamic aspect of horizontal slicing may therefore lie in the network functions as well as the resource partitioning.

FIG. 1 shows a first view of the broad concept of vertical and horizontal network slicing. There is shown a complete wireless network 100, including multiple vertical slices 110-140, each serving a different (or at least separate) vertical market, i.e. use-case. In the example shown vertical slice #1 110 serves mobile broadband communications, vertical slice #2 120 serves vehicle-to-vehicle communications, vertical slice #3 130 serves security communications, and vertical slice #4 140 serves industrial control communications. These are only exemplary use-cases, and the use-cases that may be served by sliceable wireless network according to the present disclosure is practically unlimited.

The wireless network 100 includes a core network layer portion 150 (e.g. having multiple servers/control entities/control portions of eNodeBs, etc.), a radio access network layer portion 160 (e.g. including multiple base stations, eNodeBs, etc.), a device layer portion 170 (including e.g. portable devices such as UEs, vehicles, surveillance devices, industrial devices, etc.), and a personal/wearable layer portion 180 (including, e.g. wearable devices such as smart watches, health monitors, Google™ glasses/Microsoft™ Hololens type devices, and the like). The wearable portion may only be involved in some use-cases, as shown by its inclusion in only vertical slices #1 and #2 in the example of FIG. 1.

In the vertical domain, the physical computation/storage/radio processing resources in the network infrastructure (as denoted by the servers and base stations 150/160) and the physical radio resources (in terms of time, frequency, and space) are sliced, by use-case (i.e. type of communication) to form end-to-end vertical slices. In the horizontal domain, the physical resources (in terms of computation, storage, radio) in adjacent layers of the network hierarchy are sliced to form horizontal slices. In the example shown, there is a first horizontal network slice 190 operating between the RAN 160 and Device 170 layers, and a second horizontal network slice 195 operating between the Device 170 and wearable 180 layers. Any given device served or to be served by the wireless network 100 as a whole, and the RAN 160 (and below layers) in particular, could operate on multiple network slices, of either (or both) types. For instance, a smart phone can operation in a vertical slice on mobile broad band (MBB) service, a vertical slice on health care service and a horizontal slice supporting wearable devices.

When enabling network slicing in the RAN (including the air interfaces employed in the RAN), besides meeting the 5G requirements (e.g., data rate, latency, number of connections, etc.), further desirable features of the RAN/air interfaces used to enable network slicing and in general 5G may include Flexibility (i.e. support flexible radio resource allocation among slices); Scalability (i.e. easily scale up with the addition of new slices; and Efficiency (e.g. efficiently use the radio and energy resources).

Horizontal slicing may comprise slicing the network hierarchy, e.g. the layers of network connectivity and compute (i.e. processing resource) capability. This may be done across any number of the vertical slices served by the network 100, for example anything from all the vertical markets down to within a one or more vertical slice(s). This is shown as the different widths of the two exemplary horizontal slices in FIG. 1—horizontal slice #1 190 is limited to a single vertical slice, whereas horizontal slice #2 is covers two vertical slices. Examples of network hierarchy/layers may include, but is not limited to, a macro network layer, a micro/small cell network layer, a device to device communications layer, and the like. Other network layers may also be involved.

Figure 2:
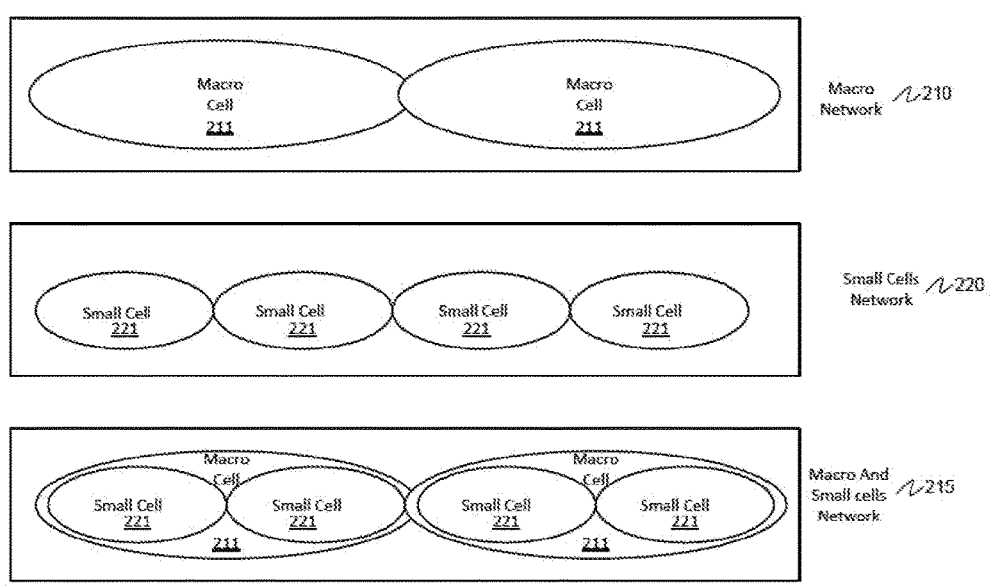
FIG. 2 shows a second view of a portion of the wireless network of FIG. 1.

FIG. 2 shows a second view 200 of a portion of the wireless network 100 of FIG. 1. In particular, FIG. 2 shows an example of a slice-specific RAN architecture, where slices may be across multiple levels of the traditional wireless network architecture. For example, depending on factors such as traffic type, traffic load, QoS requirement, the RAN architecture of each of the slices may be dynamically configured. In a first example, slice #1 210 may only operate on the macro cell level. Whereas slice #2 220 only operates on the small cells level. Finally, slice #3 230 may operate on both macro and small cells levels. In another example, a slice (e.g. slice #1 210) may open up operation on small cells while another slice (e.g. slice #3 230) may close operation on some of the small cells.

Opening up operation/activating a slice may be referenced as a network slice turn-on, and closing operation/deactivating a slice may be referenced as a network slice turn-off. The slice-specific RAN architecture may require slice-specific control-plane/user-plane operation, slice on/off operation and slice-based treatment on access control and load balancing, as will be discussed in more detail below.

Horizontal slicing comprising slicing the network/device computation and communication resources may achieve computation offloading. Examples include the base station using a slice of its computation resource to help a user device's computation, or a user device (e.g. smartphone) using a slice of its computation resource to help computation of an associated wearable device(s).

Embodiments of the present disclosure are not limited to any particular form of slicing in the vertical (markets) or horizontal (network hierarchy/layers) directions.

Embodiments of the present disclosure may provide a management entity operable across the Control-plane (C-plane) and/or User-plane (U-plane), that may provide a management-plane entity that may be used to coordinate the operation of the different slices, either horizontal or vertical (or multiple/combined, or partial, ones thereof). The management entity may use a flat management architecture or a hierarchal management architecture.

Slicing of the radio access network may be considered as compartmentalization of the radio access network according to predetermined vertical markets, or horizontal network layers (or multiple/partial layers) of the network. This may be considered a form of logical separation between the wireless resources provided by, or in use by, the radio access network. Logical separation of the wireless resources may allow that they may be separately defined, managed, and/or (generally or specifically) resourced. This separation may provide the ability for the different slices to not be able to, or allowed to, affect one another. Equally, in some embodiments, one or more slices may be specifically provided with the ability to manage another one or more slices, for operational reasons.

In some embodiments network functions may be fully offloaded to a network slice, and the slice may operate in a standalone mode, for example a standalone millimeter-wave (mmWave) small cell network, and an out-of-coverage D2D network. A mmWave small cell is one that uses milli-meter size radio waves (i.e. high frequency—e.g. 60 GHz).

In some embodiments network function(s) may be partially offloaded to a slice, and the slice may operate in a non-standalone mode, for example in an anchor-booster architecture, where an anchor-booster architecture may comprise an anchor cell, providing a control-plane and a mobility anchor for maintaining connectivity. In an embodiment, the anchor cell may be a cell with wide coverage, for example a macro cell. The anchor-booster architecture may further comprise a booster cell, providing user-plane data offloading. In an embodiment, the booster cell may be a small cell, and may be deployed under the coverage of an anchor cell. From a device perspective, the control-plane and user-plane may be decoupled, i.e., the control-plane may be maintained at the anchor cell while the data-plane may be maintained at the booster cell.

Figure 3:
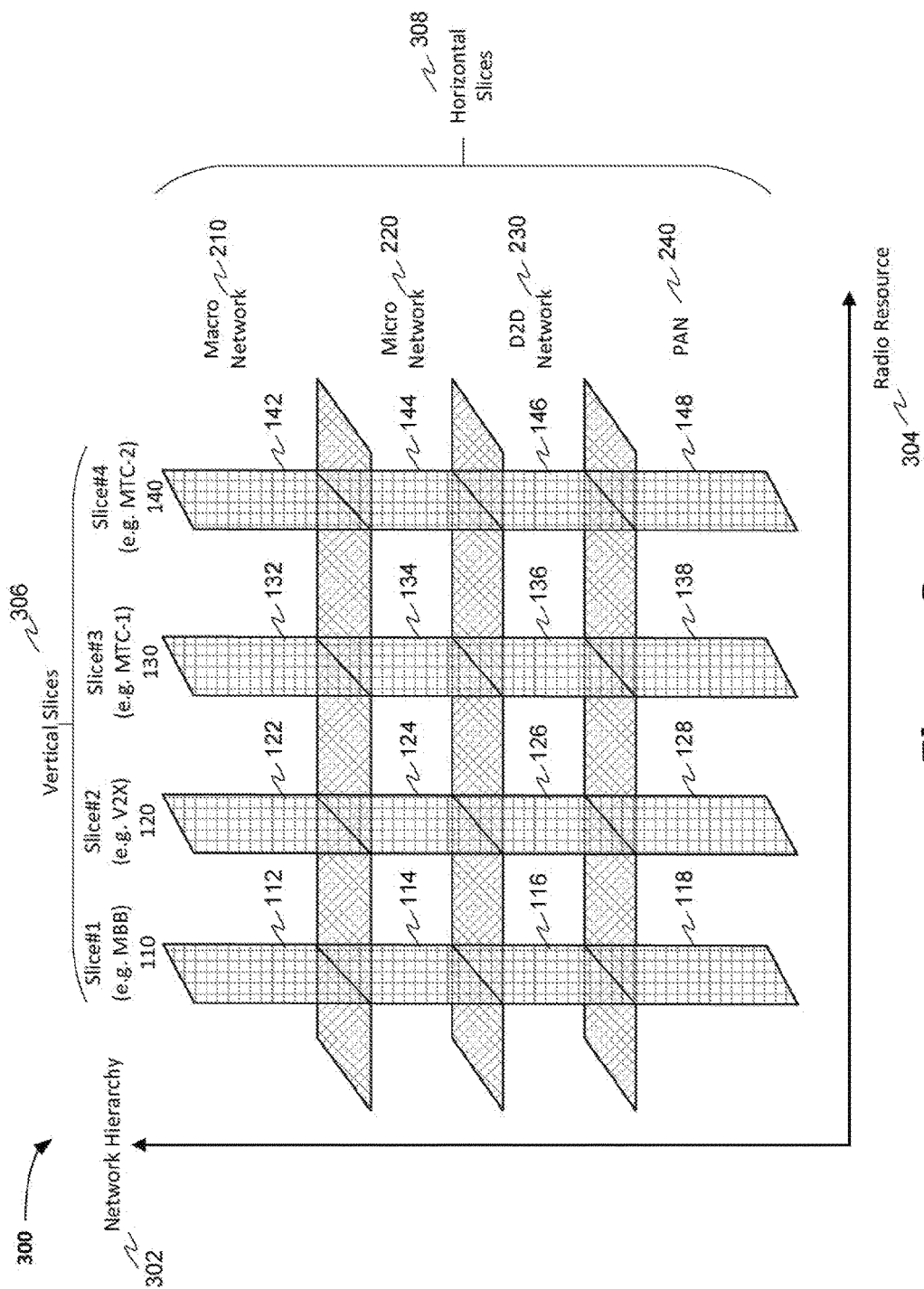
FIG. 3 shows how a Radio Access Network (RAN) can be sliced into horizontal and vertical slices according to an embodiment that is alternative (or additional) to that shown in FIG. 1.

In some example embodiments, the horizontal slices and vertical slices may be viewed as intertwined (i.e. where the radio access network functions/resources are shared among some of the vertical and horizontal slices), as illustrated in the graph 300 of FIG. 3. Thus, FIG. 3 shows how a Radio Access Network (RAN) can be sliced into horizontal and vertical slices according to an embodiment that is alternative (or additional) to that shown in FIG. 1, where the slices are totally independent in terms of traffic flow and operation. The graph 300 of FIG. 1 has Network Hierarchy 302 (i.e. the network layers involved/in use) along the y-axis, and Radio Resource 304 (i.e. indicative of using separate radio resources, such as frequencies, time slots, etc.) along the x-axis. In the example of FIG. 1, vertical slicing is shown as comprising four vertical slices 306. However, any number of different markets/use-cases may be involved. The four vertical markets/use-cases shown chosen for the vertical slices are mobile broadband (MBB) 110, a vehicle type communication (V2X) 120, a first machine type communication (MTC-1) 130, a second machine type communication (MTC-2) 140, being slices Slice #1-Slice #4, respectively. These are only exemplary choices of the use-cases that could be served.

Also shown in FIG. 3 is horizontal slicing, in this example again comprising four horizontal slices 308. The four horizontal slices shown are macro network layer 210, micro network layer 220, device to device network layer 230, and Personal Area Network (PAN) (e.g. wearable) network layer 240. According to an example, each horizontal slice contains a portion of multiple vertical slices. Equally, each vertical slice contains a portion of each horizontal slice. The separate portions, as separated in both the horizontal and vertical directions may be referred to as a slice portion. Thus, in the example of FIG. 1, the MBB vertical slice 110 comprises four slice portions: Macro Network layer portion 112; Micro Network layer portion 114; D2D Network layer portion 116; and PAN Network layer portion 118. Similarly, V2X vertical slice 120 comprises four slice portions: Macro Network layer portion 122; Micro Network layer portion 124; D2D Network layer portion 126; and PAN Network layer portion 128. Meanwhile, the MTC-1 vertical slice 130 comprises four slice portions: Macro Network layer portion 132; Micro Network layer portion 134; D2D Network layer portion 136; and PAN Network layer portion 138, and MTC-2 vertical slice 140 comprises four slice portions: Macro Network layer portion 142; Micro Network layer portion 144; D2D Network layer portion 146; and PAN Network layer portion 148.

An example of such an architecture is, in a personal area network, a wearable health sensor may belong to a dedicated health network. The personal area network layer may then represent a horizontal network slice. The health sensor running under the coverage of the personal area network may belong to a vertical network slice. In the same token, each horizontal network slice could comprise multiple vertical network slices. Each vertical network slice may have multiple horizontal network slices. Another example is a macro cell (i.e. macro eNB) that serves a number of different use-case communications. Likewise, each vertical slice may contain portions of multiple horizontal slices, for example, in a V2X network, there may be V2I and V2V layers. In another example, the mobile broad band (MBB) vertical slice includes portions in each of the macro, micro and device to device layers, as shown. Thus, embodiments provide a way to logically carve up the wireless resources provided by, and/or in use by, the radio access network, according to both use-case (vertically) and network layer (horizontally).

Communication and computation have been helping each other in pushing the boundaries of information and computing technologies. At the network side, computation has been used to help communication by moving computation and storage to the edge. With edge cloud and edge computation, the communication link between the source and the destination is getting shorter, thereby improving the communication efficiency and reducing the amount of information propagation in the network. The optimal deployment of edge cloud and computation scheme varies. As a general rule, the less capable the end device is and/or the higher the device density, the closer the cloud and computation to the network edge.

Moving forward at the device side, with the devices further shrinking in size from portable devices to wearable devices and the user expectation on computation keeping increasing, we expect future communications will help to deliver the user experience, e.g., the network nodes slice out part of their computation resources to help computation at the portable device, while the portable devices slice out part of their computation resources to help the computation at the wearable devices. In this way, the network is horizontally sliced. The sliced out computation resources and the air interface connecting the two ends form an integrated part that delivers the required service.

Figure 4:
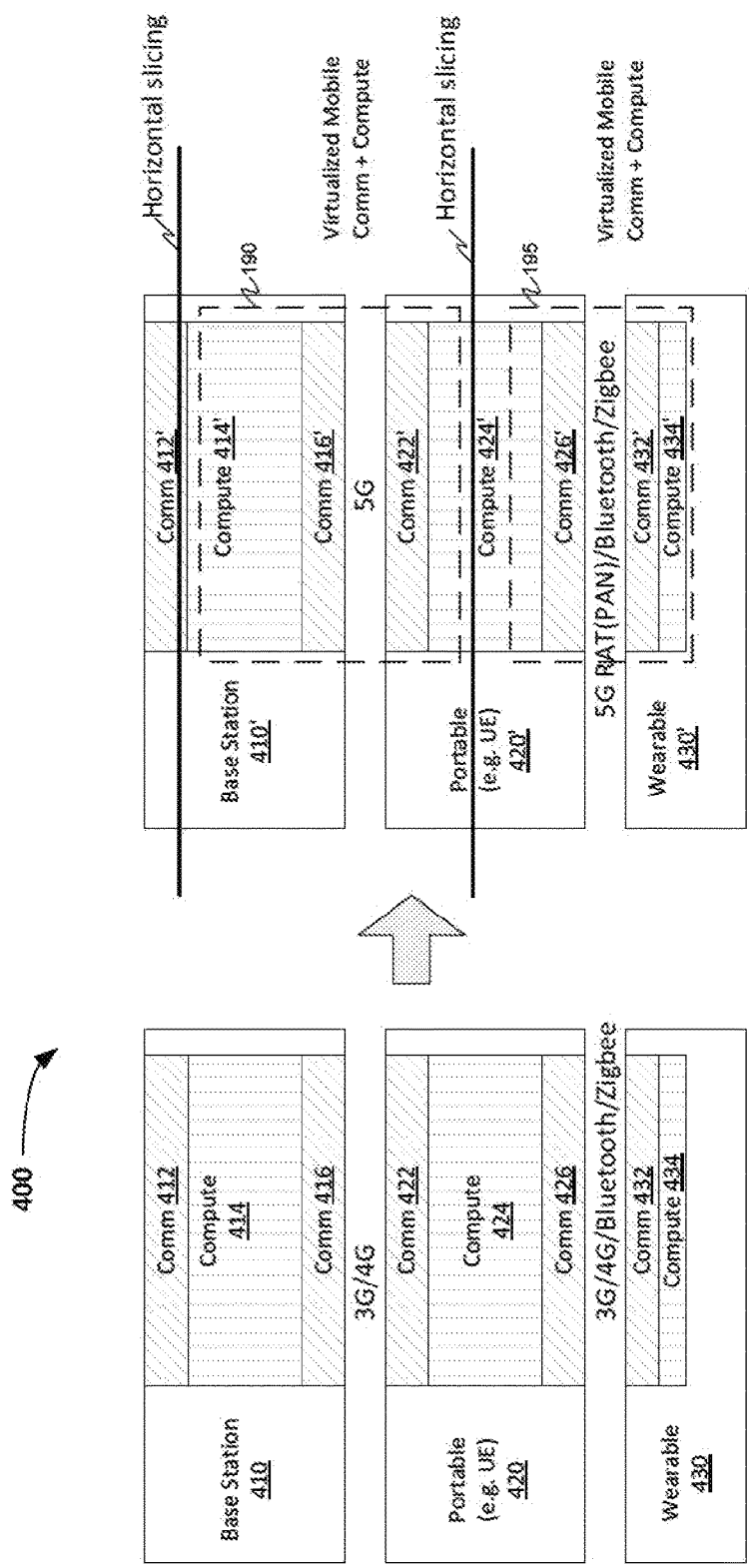
FIG. 4 shows a more detailed example of horizontal slicing in a sliceable wireless network architecture according to examples.

FIG. 4 shows a more detailed example of horizontal slicing in a sliceable wireless network architecture according to embodiments. The left hand side shows the traditional 3G/4G architecture (but only from the RAN down). This comprises a base station portion 410, comprising an up-stream/core network side communication function 412, a base station compute function 414 (i.e. the processing resources available in the base station, or closely coupled entity thereof), and a down-stream/wireless/device side communication function 416 (to communicate with the devices being served by that base station, or other, peer base station, e.g. in the case of fronthaul, etc.). There is also shown a portable portion 420 (e.g. a User Equipment, or a like device) comprising a similar combination of up-stream and down-stream communication resources and local processing resources. In this case, the up-stream communication link is the typical cellular wireless communication link 422 (e.g. OFDM/CDMA/LTE type link) and a down-stream communication link 426 such as a 5G radio access technology (RAT) (e.g. OFDM/CDMA/LTE type link), a next generation communication link(s) such as a 5G PAN RAT (yet to be created), or a current or next generation other PAN wireless communication technology, e.g. Bluetooth, zigbee or the like. In between is the local compute function 424, i.e. processing resources local to the portable device. Lastly, in the example, there is the wearable portion 430, which typically has only a single up-stream communications link 432 and limited local processing resources function 434.

The right hand side of FIG. 4 shows the one of the new proposed horizontal network slicing concepts, in particular, how the processing resources of higher and lower entities in the network can be "combined", i.e. shared between themselves, using the communications and processing resource abilities of the entities taking part. The basic functions are similar, therefore are denoted as items 410' to 434' respectively, and act in similar ways. However, there is now the concept of horizontal slices, in this case, showing the horizontal slices #1 190 and #2 195 of FIG. 1 in more detail. In this basic example, the wearable device 430' is able to make use of the processing resources 424' of portable device 420', by using the communications functions to share processing data (e.g. data to process and the resultant processed data). Similarly, the portable device 420' is able to use the base station 410' processing resources 414'.

There will now follow more detailed description of a portion of the network slicing concept, according to the present disclosure. In some example, these functions may be provided as new network function (NFs), which may be virtualized in some cases, e.g. by using network function virtualization (NFV). These NFs and NFVs may be slice specific, or operate over multiple/all slices. The proposed wireless network, both as a whole (e.g. including the core network), but particularly the RAN will now be slice aware, by making use of a newly implemented slice identification.

Future wireless communication systems are expected to enable fully connected society and things, which may propel the advancement of the global economy and social wellbeing. This may require the future wireless communication systems to be able to support various market segments including manufacturing, public safety, road safety, health care, smart home, smart workplace, etc. The new demands give mobile network operators opportunities to exploit new business models to support vertical markets and extend their subscriber ownership.

Legacy mobile communication systems are mainly designed for mobile broadband service. Operators provide horizontal platforms with flat air interface and network architecture. To support the future vertical markets, network slicing could be needed.

Current investigations on network slicing are focused on the core network, such as by means of software defined network (SDN) and network function virtualization (NFV), etc. Air-interface slicing is largely unattended. To see the operation of air interface slicing, we take random access (RA) as an example: In the legacy Long Term Evolution (LTE) air interface standards, user equipment (UE) or other like mobile devices fairly content for access and are treated indiscriminately in case of collision. With network slicing, UEs accessing different network slices should be differentiated. A crowded network slice A with high RA collision probability should not affect a UE with network slice B access authorization to access network slice B.

Example embodiments are directed towards techniques for air interface slicing. Example embodiments include fifth generation (5G) LTE air interfaces with support on public mobile broadband access and dedicated access for certain applications, services, and/or requirements. The dedicated access may be assigned with one dedicated air interface slice. Example embodiments include air interface slicing architecture and techniques. The example embodiments may be summarized as follows:

1. Protocol Stack:

Two-level media access control (MAC): Level-1 MAC for scheduling across network slices. Level-2 MAC for scheduling within each network slice. Each network slice has dedicated MAC entity in Level-2 MAC;

Physical Layer (PHY) to logical PHY mapping: map physical radio resource to logical radio resource;

MAC operates on logical PHY.

2. Network Slice Identity:

Define network slice identifier (sNetID);

Broadcast the sNetIDs of the active network slices in system information.

3/4. Device random access and network slice activation:

RA can be in common with physical random access channel (PRACH) shared among all the devices in the cellular network or in dedicated random access channel (RACH) for a network slice;

In case of dedicated PRACH, a network slice may be in an active state. The PRACH location may be broadcasted to the devices in system broadcasting information and/or system information blocks (SIBs);

When the network slice is in a dormant state or idle state, devices may do RA in the common PRACH, during which the network slice may be triggered;

The RA sequence used to access a network slice may carry the sNetID;

Slice-specific contention resolution may be applied.

5. Physical Downlink Control Channel (PDCCH):

Common control channel (CCCH) and dedicated control channel (DCCH) configuration may be transmitted within one radio subframe;

The CCCH addresses to the cell radio network temporary identifier (C-RNTI) of the devices in the mobile broadband (MBB) service and the sNetID. All the devices admitted in the network slice can detect the common control information addressed to the sNetID. The common control information addressed to the sNetID may carry the resource allocation information for the network slice;

The DCCH may locate within the radio resources assigned for each network slice and may be used to schedule the transmission of the devices operating under the network slice.

6. Physical Uplink Control Channel (PUCCH) and Hybrid Automatic Repeat Request (HARM):

Devices operating under a network slice may transmit uplink (UL) control information in the control region of the UL resource assigned for the network slice.

7. Resource Allocation for Network Slices:

Factors to be considered in assigning radio resources to a network slice may include: traffic load, traffic type and quality of service (QoS) requirements, and/or resource allocation granularity and dynamics.

PHY and MAC Architecture

Figure 5:
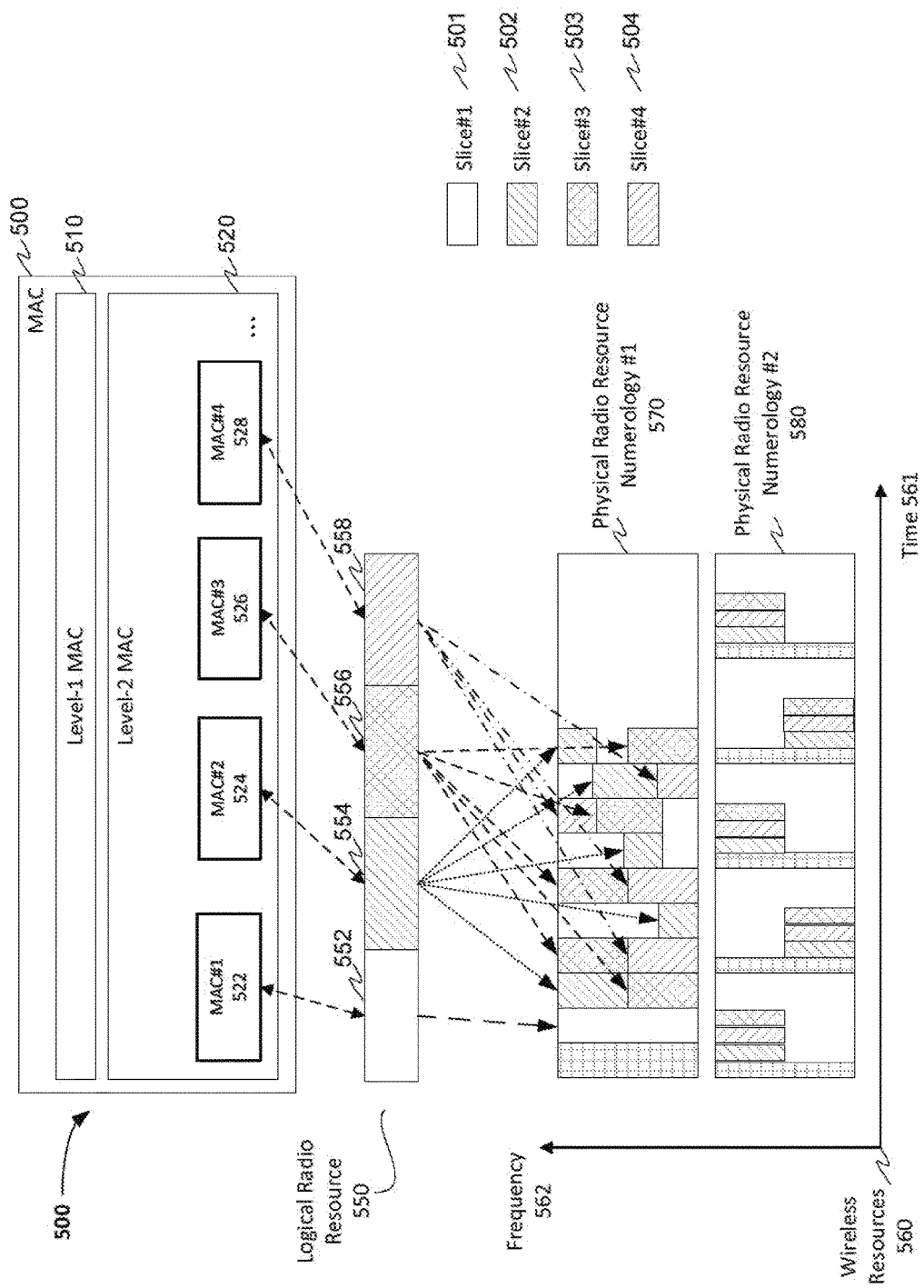
FIG. 5 shows an example of a physical Layer (PHY) and media access control Layer (MAC) architecture with network slicing on an air interface in accordance with embodiments.

FIG. 5 shows an example embodiment of the PHY and MAC architecture with network slicing on the air interface. For the PHY, FIG. 5 illustrates a case where multiple PHY numerologies are implemented to meet different QoS requirements. A portion of the radio resource is allocated to the active network slices in the cell. In the example shown by FIG. 5, three network slices additional to the base Mobile broadband slice are shown (i.e. there is shown Slice #1 to Slice #4, denoted by shading styles 501-504, respectively. These shading styles are used uniformly throughout). Each Slice is assigned a portion of the radio resource. The resource allocation may be scheduled by a Level-1 MAC 510. The granularity and dynamics of the resource allocation may be selected according to various design choices and/or empirical studies. Note that each of the network slices 501-504 can have multiple radio frame types with different numerologies. This scenario may be implemented when the network slice has traffic with diverse performance and QoS requirements.

In more detail, FIG. 5 shows an overall MAC entity 500 comprising a Level-1 (L1) MAC entity 510 operating across all the network slices, and an Level-2 (L2) MAC entity 520, itself comprising a number of slice-specific sub-entities 522-528 (i.e. a MAC for each of slices #1-#4, respectively). These sub-entities 522-528 each are slice-specific, and operate on a respective, slice-specific portion of an overall logical radio resource 550, shown as slice-specific portions 552-558. The respective relation between a slice-specific L2 MAC sub-entity 522-528 and a slice-specific portion of the logical radio resource, items 552-558, is shown by a doubled ended dotted arrow.

How each of the slice-specific portions 552-558 of the logical radio resource are allocated to the actual physical radio resources (and more specifically, the numerologies in use on the wireless network at this point, e.g. numerologies #1 570 and #2 580, for this example) are shown by the single ended arrows. Each set of single ended arrows for a particular slice is dotted in a different fashion, and each respective portion of the physical radio resources has suitably corresponding shading, for ease of review. The shown relationships are merely exemplary, and any suitable arrangement of the network slice logical resource on to the physical resources may be used. As herein used, the physical radio resources are the actual physical frequencies 562 and time 561 allocations across the wireless resources 560 available, in a similar fashion to current 4G resource mapping, e.g. Physical resource blocks (PRBs), with TTI spacing, etc.

Figure 6:
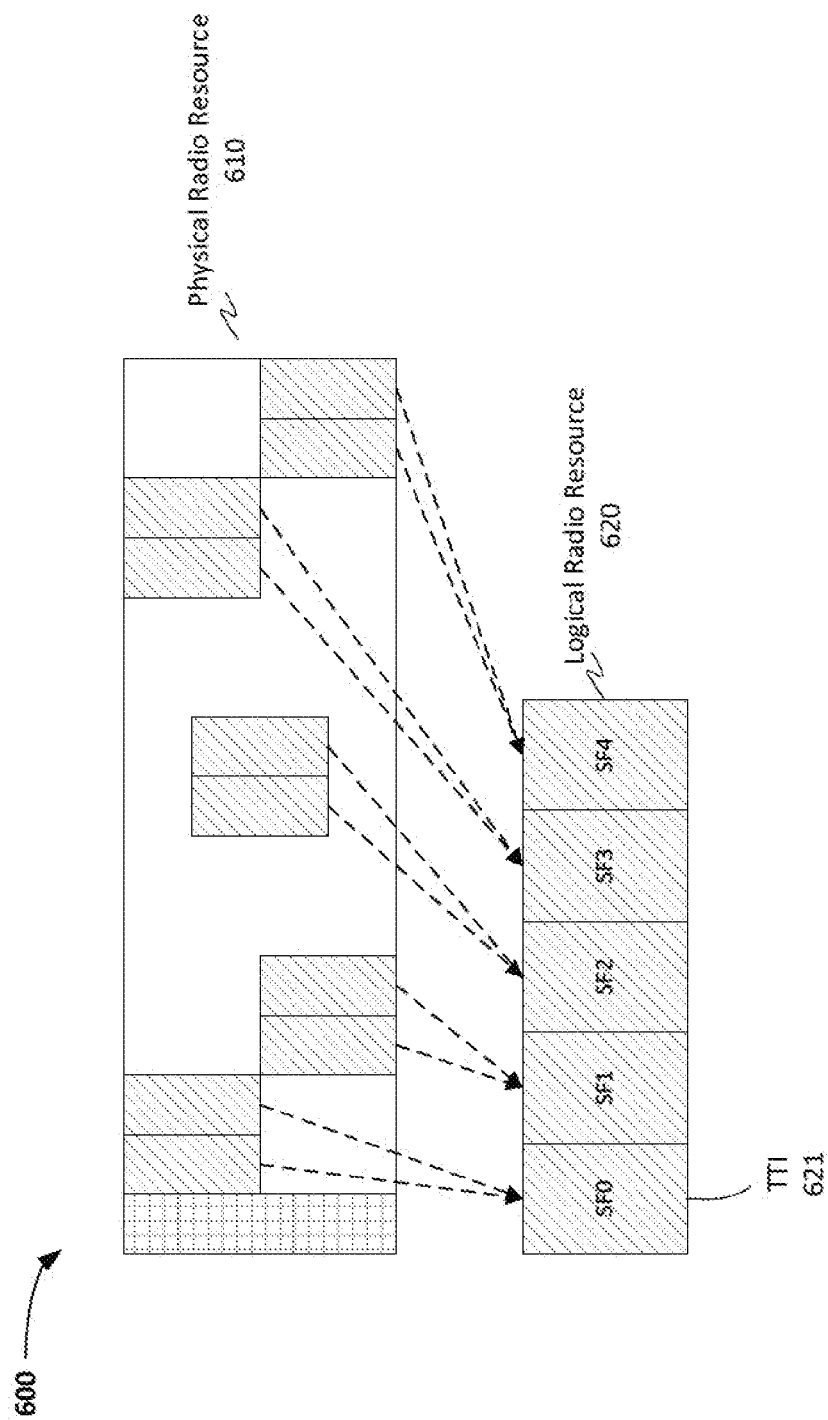
FIG. 6 shows an example mapping of physical radio resource to logical radio resource in accordance with embodiments.

As described above, the distributed physical radio resource of each network slice is mapped to continuous logical radio resource, which may be used for Level-2 MAC scheduling for communication within the network slice. Each network slice may have dedicated Level-2 MAC entity (e.g. sub-entities 522-528 noted in FIG. 5). A logical transmission time interval (TTI) is defined based on the logical radio resource as shown in FIG. 6, which is an illustration of physical radio resource to logical radio resource mapping and logical TTI. The logical TTI may be the functional equivalent, in the logical/network slicing domain, as the TTI (i.e. physical TTI) of the traditional 4G network standards. The TTI may be considered a logical unit instead of a temporal unit. MAC operation on logical radio resource allows more scalable HARQ procedure, which may be based on a logical TTI unit instead of a temporal TTI unit.

In more detail, FIG. 6 shows the mapping of a physical radio resource 610 distributed arrangement to a logical radio resource 620 contiguous/continuous arrangement. In FIG. 6, blocks of physical radio resource 610 are illustrated as being mapped to blocks of logical radio resource 620 by dashed arrows. The blocks of physical radio resource 610 may be distributed in time and frequency, and may be mapped to the contiguous/continuous subframes of logical radio resource 620 (denoted as SF0 to SF4 in FIG. 6) to form a contiguous logical ordering of blocks. FIG. 6 also shows a TTI 621 of logical radio resource 620, wherein the transmission time interval 621 is a subframes (labelled as SF0-SF4) of the logical radio resource 620. The TTI may refer to the duration of a smallest transmission period on a radio link for each subframe, e.g. 1 ms.

Figure 7:
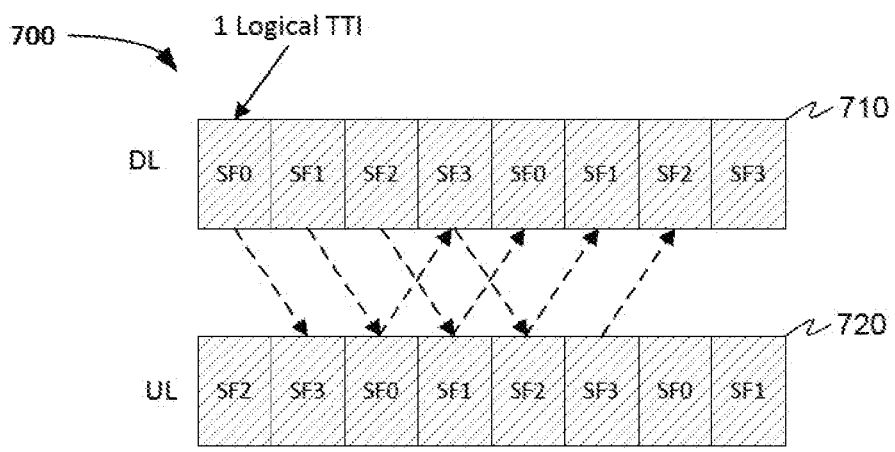
FIG. 7 shows a first example of a hybrid automatic repeat request (HARQ) process in accordance with embodiments.
Figure 8:
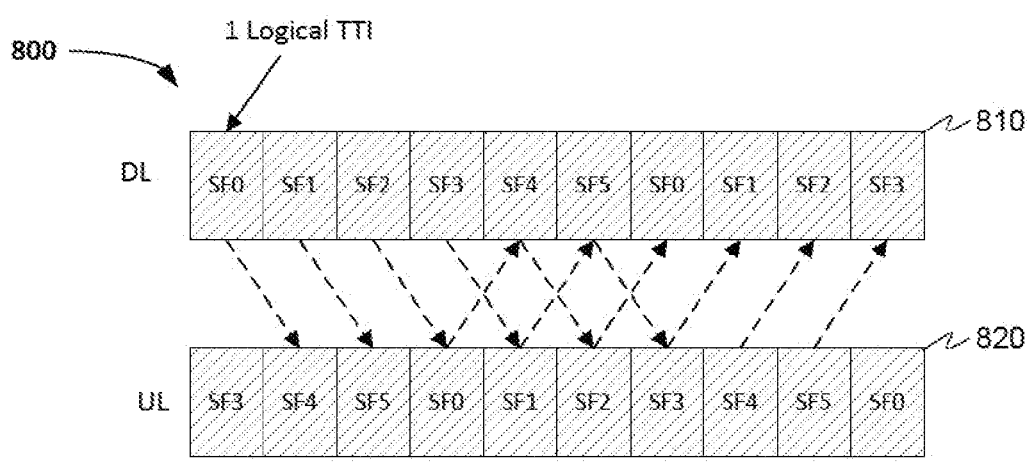
FIG. 8 shows a second example of a hybrid automatic repeat request (HARQ) process in accordance with embodiments.

FIGS. 7 and 8 show two examples 700 and 800 of a hybrid automatic repeat request (HARQ) process operating on the logical radio resource of a slice, which may be based on logical TTI units, such as the TTI unit 621 of FIG. 6. The example of FIG. 7 is a HARQ procedure with four stop and wait (SAW) processes, acting between a set of downlink subframe blocks 710 and the respective the uplink subframe blocks 720.

FIG. 8 shows a similar HARQ process to FIG. 7, however the example of FIG. 8 includes a six SAW process instead of the four of FIG. 7, acting between a set of downlink subframe blocks 810 and the respective the uplink subframe blocks 820.

Network Slice Identification

According to example embodiments, to identify a network slice in the air interface, a network slice ID (sNetID) may be assigned to the network slice. The sNetID is known by devices accessing (or going to access) the network slice. The sNetID may be used to address all the devices in the network slice. sNetIDs of the active networks can be broadcasted in system information and the like.

Random Access (RA)

Figure 9:
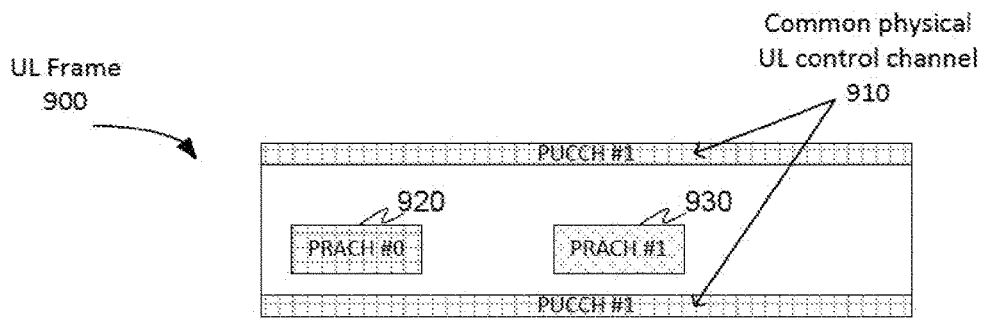
FIG. 9 shows an example PRACH channel type in an uplink frame in accordance with embodiments.

According to various embodiments, random access (RA) can be in a common physical random access channel (PRACH) shared among all devices in a wireless network, or in a dedicated PRACH for a network slice. In the example shown in FIG. 9, which is an illustration of example PRACH channel types in uplink frame 900, PRACH #0 920 may be a common PRACH that can be used by all the devices in the cell or network. PRACH #1 930 may be a dedicated PRACH assigned for the network slice #1. The example of FIG. 9 illustrates both the common PRACH 920 and the dedicated PRACH 930 contained in a common physical uplink control channel PUCCH #1 910. In the case of a dedicated PRACH 930, the network slice may be in an active state. The PRACH location may be broadcast to devices in a system that are broadcasting information, and/or one or more system information blocks (SIBs). When the network slice is in a dormant state or idle state, devices may perform a RA procedure in the common PRACH 920, during which the network slice may be triggered. The RA sequence used to access a network slice may carry the sNetID. Slice-specific contention resolution may be applied.

Network Slice Dormancy and Activation

According to various embodiments, a network slice in a cell can be turned into a dormant state if no traffic is present for a desired period of time. Once turned into the dormant state, the resources allocated to the network slice may be released. In various embodiments, a dormant network slice may be turned into an active state in at least one of the following two cases:

When downlink traffic occurs in the network slice. In this case, the network slice may be triggered by the network; or When uplink traffic occurs in the network slice. In this case, the network slice may be triggered by the UE during RA or another like scheduling request.

Physical Downlink Control Channel (PDCCH)

Figure 10:
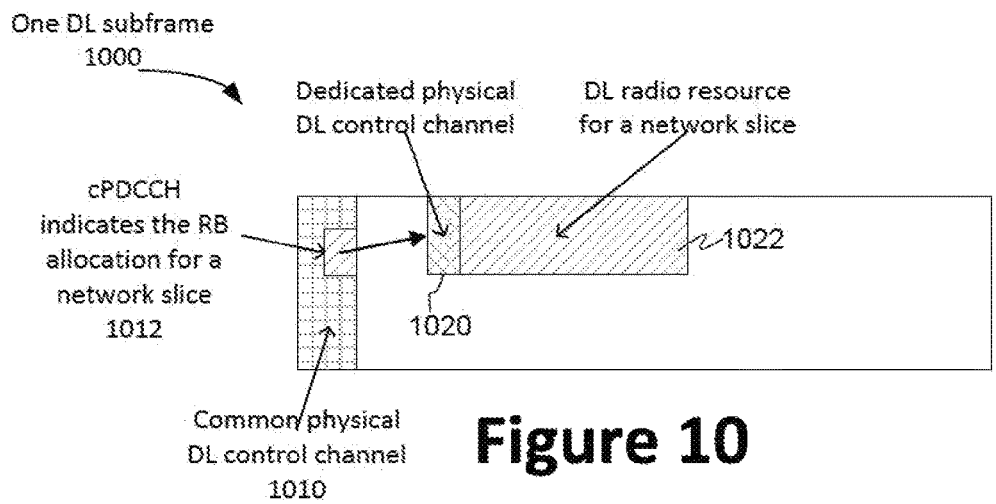
FIG. 10 shows an example of one downlink subframe, and is an illustration of an example physical downlink control channel type and location in accordance with embodiments.

According to various embodiments, common physical downlink control channel (cPDCCH) information and dedicated physical downlink control channel (dPDCCH) information may be transmitted within one radio subframe. FIG. 10 shows an example of one downlink subframe 1000, and is an illustration of an example physical downlink control channel type and location. FIG. 10 shows the locations of cPDCCH information 1010 and dPDCCH information 1020 according to an example.

The cPDCCH 1010 may be located in fixed symbols of each subframe (e.g., the first three symbols, as in 4G LTE/LTE-Advanced). The cPDCCH 1010 may carry resource allocation information for devices accessing a mobile broad band (MBB) network and may also carry the resource allocation information for any other network slices in a wireless network.

In an example, the cPDCCH 1010 may use a sNetID to address scheduled network slices. In such an example, all devices accessing a scheduled network slice may detect the cPDCCH information 1010 addressed to the corresponding sNetID.

Dedicated physical downlink control channel (dPDCCH) information 1020 for a network slice may be located in the radio resources assigned to the network slice. The dPDCCH information 1020 may be located in two or more continuous resource blocks of the network slice, or may be distributed in the resource blocks of the network slice. The dPDCCH 1020 carriers scheduling information for the devices operating under the network slice.

In more detail, FIG. 10 shows a cPDCCH portion 1010 of one downlink subframe 1000. In the example of FIG. 10, the cPDCCH portion 1010 may include an indication 1012 of the resource block (RB) allocation for a network slice. The example of FIG. 10 further shows the indication 1012 of the RB allocation mapped to a dPDCCH portion of one DL subframe. In the example of FIG. 10, the dPDCCH may further contain the downlink radio resource 1022 for a network slice.

Physical Uplink Control Channel

Figure 11:
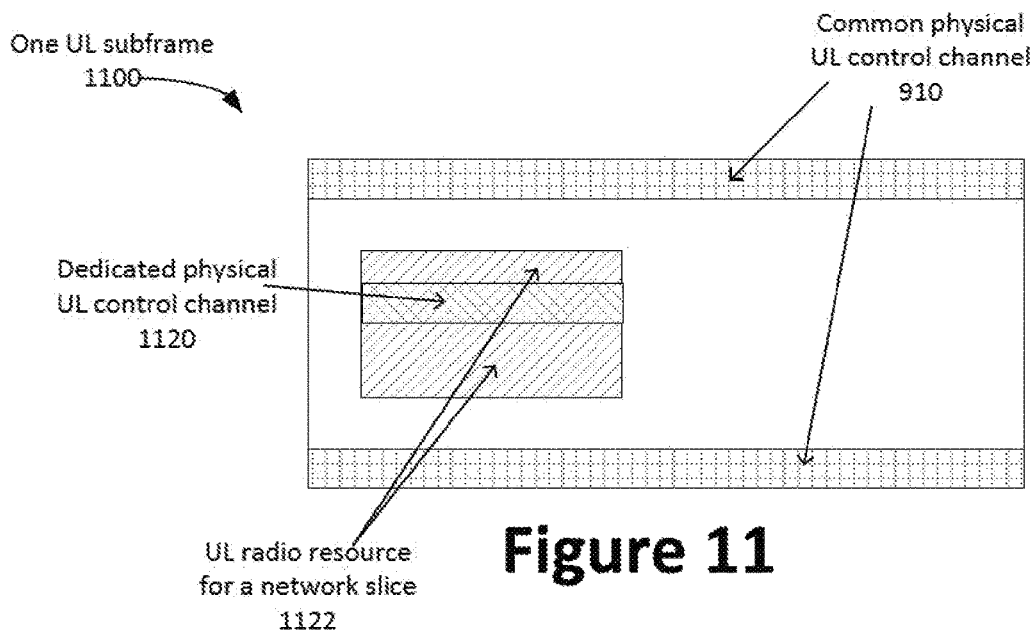
FIG. 11 shows an example of one uplink subframe, and is an illustration of an example physical uplink control channel type and location in accordance with embodiments.

According to example embodiments, common physical uplink control channel (cPUCCH) transmissions and dedicated physical uplink control channel (dPUCCH) transmissions may be transmitted within one radio subframe, as illustrated in FIG. 11, which is an illustration of an example physical uplink control channel type and location. The cPUCCH may be used by all devices accessing the mobile operator network. The dPUCCH may be dedicated to devices accessing a network slice. A device with both MBB access and network slice access may aggregate its uplink control information of the MBB access and the network slice access to one control unit, and transmit the control unit in the cPUCCH.

In more detail, the example of FIG. 11 shows one uplink subframe 1100, comprising common physical uplink control channel portions 910, similar to the example of FIG. 9. In the example of FIG. 11, the one uplink subframe 1100 may comprise cPUCCH portions 910 and dedicated physical uplink control channel dPUCCH portion 1120. The example of FIG. 11 may further comprise uplink radio resource 1122 for a network slice, associated with dPUCCH 1120.

Resource Allocation

Factors to be considered in assigning radio resources to a network slice include: traffic load, traffic type and QoS requirements, and/or resource allocation granularity and dynamics. For example, for network slices that require low latency delivery, the resource can be allocated in continuous physical subframes to achieve the minimum amount of transmission latency as designed in the air interface. To reduce control signaling overhead, resource allocation patterns may be defined.

Figure 12:
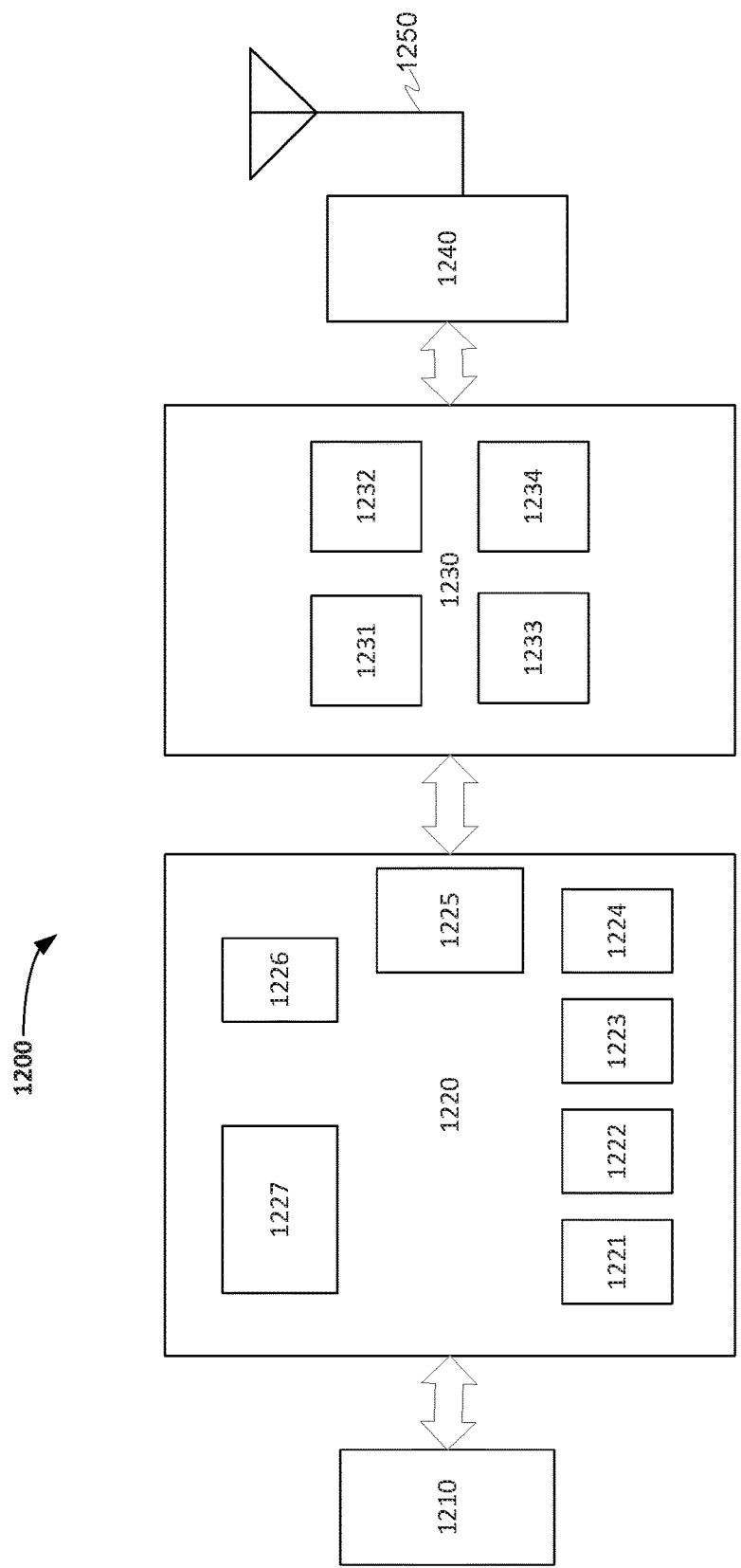
FIG. 12 shows an example implementation of an electronic device (e.g. UE or base station) in accordance with embodiments.

FIG. 12 shows an example of a RAN control entity 1200 according to an embodiment. As used herein, the term RAN control entity may be any circuit, logic or circuitry suitable for and arranged to carry out the disclosed methods and control functions. The term "logic", "circuit" and "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 12 illustrates, for one embodiment, example components of an electronic device 1200. In embodiments, the electronic device 1200 may be, implement, be incorporated into, or otherwise be a part of a user equipment (UE), base station (BS) such as an evolved NodeB (eNB), a RAN controller, or some other electronic device or network entity that is capable and arranged to perform the disclosed RAN slicing methods and functions. In some embodiments, the electronic device 1200 may include application circuitry 1210, control circuitry, such as baseband circuitry 1220, Radio Frequency (RF) circuitry 1230, front-end module (FEM) circuitry 1240 and one or more antennas 1250, coupled together at least as shown.

The application circuitry 1210 may include one or more application processors. For example, the application circuitry 1210 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1220 may include circuitry such as, but not limited to, one or more single-core or multi-core processors. The baseband circuitry 1220 may include one or more baseband processors and/or control logic to process baseband signals received from a receive signal path of the RF circuitry 1230 and to generate baseband signals for a transmit signal path of the RF circuitry 1230. Baseband processing circuitry 1220 may interface with the application circuitry 1210 for generation and processing of the baseband signals and for controlling operations of the RF circuitry 1230. For example, in some embodiments, the baseband circuitry 1220 may include a second generation (2G) baseband processor 1221, third generation (3G) baseband processor 1222, fourth generation (4G) baseband processor 1223, and/or other baseband processor(s) 1224 for other existing generations, generations in development or to be developed in the future (e.g., fifth generation (5G), 6G, etc.). The baseband circuitry 1220 (e.g., one or more of baseband processors 1221-1224) may handle various radio control functions that enable communication with one or more radio networks via the RF circuitry 1230. The radio control functions may include, but are not limited to, signal modulation/demodulation, encoding/decoding, radio frequency shifting, etc. In some embodiments, modulation/demodulation circuitry of the baseband circuitry 1220 may include Fast-Fourier Transform (FFT), precoding, and/or constellation mapping/demapping functionality. In some embodiments, encoding/decoding circuitry of the baseband circuitry 1220 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1220 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1226 of the baseband circuitry 1220 may be configured to run elements of the protocol stack for signaling of the PHY, MAC, RLC, PDCP and/or RRC Layers. In some embodiments, the baseband circuitry may include one or more audio digital signal processor(s) (DSP) 1227. The audio DSP(s) 1227 may be include elements for compression/decompression and echo cancellation and may include other suitable processing elements in other embodiments.

The baseband circuitry 1220 may further include memory/storage 1225. The memory/storage 1225 may be used to load and store data and/or instructions for operations performed by the processors of the baseband circuitry 1220. Memory/storage for one embodiment may include any combination of suitable volatile memory and/or non-volatile memory. The memory/storage 1225 may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 1225 may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 1220 and the application circuitry 1210 may be implemented together such as, for example, on a system on a chip (SOC).

In some embodiments, the baseband circuitry 1220 may provide for communication compatible with one or more radio technologies. For example, in some embodiments, the baseband circuitry 1220 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1220 is configured to support radio communications of more than one wireless protocol may be referred to as multi-mode baseband circuitry.

RF circuitry 1220 may enable communication with wireless networks using modulated electromagnetic radiation through a non-solid medium. In various embodiments, the RF circuitry 1230 may include switches, filters, amplifiers, etc. to facilitate the communication with the wireless network. RF circuitry 1230 may include a receive signal path which may include circuitry to down-convert RF signals received from the FEM circuitry 1240 and provide baseband signals to the baseband circuitry 1220. RF circuitry 1230 may also include a transmit signal path which may include circuitry to up-convert baseband signals provided by the baseband circuitry 1220 and provide RF output signals to the FEM circuitry 1240 for transmission.

In some embodiments, the RF circuitry 1230 may include a receive signal path and a transmit signal path. The receive signal path of the RF circuitry 1230 may include mixer circuitry 1231, amplifier circuitry 1232 and filter circuitry 1233. The transmit signal path of the RF circuitry 1230 may include filter circuitry 1233 and mixer circuitry 1231. RF circuitry 1230 may also include synthesizer circuitry 1234 for synthesizing a frequency for use by the mixer circuitry 1231 of the receive signal path and the transmit signal path. In some embodiments, the mixer circuitry 1231 of the receive signal path may be configured to down-convert RF signals received from the FEM circuitry 1240 based on the synthesized frequency provided by synthesizer circuitry 1234. The amplifier circuitry 1232 may be configured to amplify the down-converted signals and the filter circuitry 1233 may be a low-pass filter (LPF) or band-pass filter (BPF) configured to remove unwanted signals from the down-converted signals to generate output baseband signals. Output baseband signals may be provided to the baseband circuitry 1220 for further processing. In some embodiments, the output baseband signals may be zero-frequency baseband signals, although this is not a requirement. In some embodiments, mixer circuitry 1231 of the receive signal path may comprise passive mixers, although the scope of the embodiments is not limited in this respect.

In some embodiments, the mixer circuitry 1231 of the transmit signal path may be configured to up-convert input baseband signals based on the synthesized frequency provided by the synthesizer circuitry 1234 to generate RF output signals for the FEM circuitry 1240. The baseband signals may be provided by the baseband circuitry 1220 and may be filtered by filter circuitry 1233. The filter circuitry 1233 may include a low-pass filter (LPF), although the scope of the embodiments is not limited in this respect.

In some embodiments, the mixer circuitry 1231 of the receive signal path and the mixer circuitry 1231 of the transmit signal path may include two or more mixers and may be arranged for quadrature downconversion and/or upconversion respectively. In some embodiments, the mixer circuitry 1231 of the receive signal path and the mixer circuitry 1231 of the transmit signal path may include two or more mixers and may be arranged for image rejection (e.g., Hartley image rejection). In some embodiments, the mixer circuitry 1231 of the receive signal path and the mixer circuitry 1231 may be arranged for direct downconversion and/or direct upconversion, respectively. In some embodiments, the mixer circuitry 1231 of the receive signal path and the mixer circuitry 1231 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1230 may include analog-to-digital converter (ADC) and digital-to-analog converter (DAC) circuitry and the baseband circuitry 1220 may include a digital baseband interface to communicate with the RF circuitry 1230.

In some dual-mode embodiments, a separate radio IC circuitry may be provided for processing signals for each spectrum, although the scope of the embodiments is not limited in this respect.

In some embodiments, the synthesizer circuitry 1234 may be a fractional-N synthesizer or a fractional N/N+1 synthesizer, although the scope of the embodiments is not limited in this respect as other types of frequency synthesizers may be suitable. For example, synthesizer circuitry 1234 may be a delta-sigma synthesizer, a frequency multiplier, or a synthesizer comprising a phase-locked loop with a frequency divider.

The synthesizer circuitry 1234 may be configured to synthesize an output frequency for use by the mixer circuitry 1231 of the RF circuitry 1230 based on a frequency input and a divider control input. In some embodiments, the synthesizer circuitry 1234 may be a fractional N/N+1 synthesizer.

In some embodiments, frequency input may be provided by a voltage controlled oscillator (VCO), although that is not a requirement. Divider control input may be provided by either the baseband circuitry 1220 or the applications processor 1210 depending on the desired output frequency. In some embodiments, a divider control input (e.g., N) may be determined from a look-up table based on a channel indicated by the applications processor 1210.

Synthesizer circuitry 1234 of the RF circuitry 1230 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1234 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1230 may include an IQ/polar converter.

FEM circuitry 1240 may include a receive signal path which may include circuitry configured to operate on RF signals received from one or more antennas 1250, amplify the received signals and provide the amplified versions of the received signals to the RF circuitry 1230 for further processing. FEM circuitry 1240 may also include a transmit signal path which may include circuitry configured to amplify signals for transmission provided by the RF circuitry 1230 for transmission by one or more of the one or more antennas 1250.

In some embodiments, the FEM circuitry 1240 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1230). The transmit signal path of the FEM circuitry 1240 may include a power amplifier (PA) to amplify input RF signals (e.g., provided by RF circuitry 1230), and one or more filters to generate RF signals for subsequent transmission (e.g., by one or more of the one or more antennas 1250).

In some embodiments, the electronic device 1200 may include additional elements such as, for example, memory/storage, display, camera, sensor, and/or input/output (I/O) interface.

In some embodiments, the electronic device 1200 may be, implement, incorporate, or be otherwise part of a RAN entity. In embodiments, the baseband circuitry 1220 may be to: identify one or more vertical slices of a RAN, the vertical slices related to vertical market segments of the RAN; identify one or more horizontal slices of the RAN, the horizontal slices related to network hierarchy segments of the RAN; and slice the RAN into the one or more vertical and/or horizontal slices. The RF circuitry may be to send and/or receive one or more signals in accordance with the vertical and/or horizontal slices.

Figure 13:
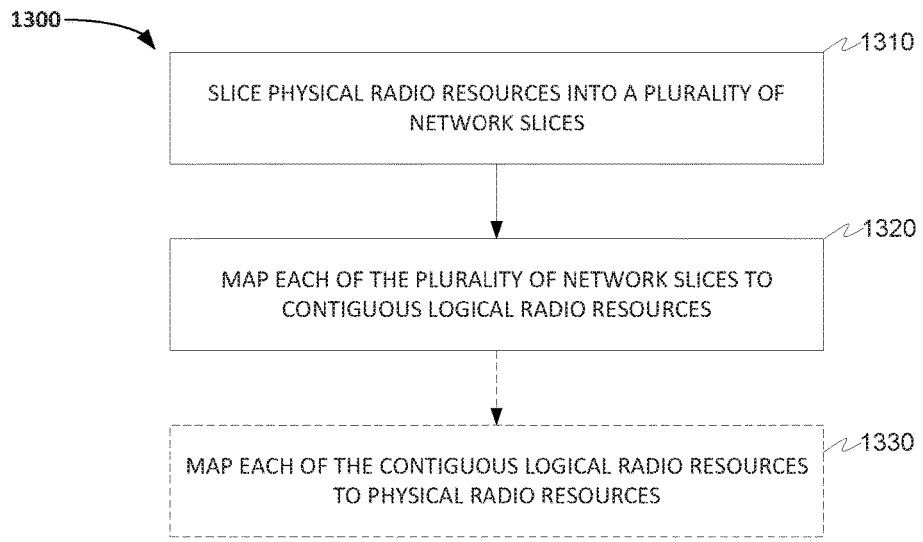
FIG. 13 shows a first example method according to embodiments.

In some embodiments, the electronic device of FIG. 12 may be configured to perform one or more processes, techniques, and/or methods as described herein, or portions thereof. FIG. 13 depicts one such process 1300. For example, in embodiments where the electronic device is, implements, is incorporated into, or is otherwise part of a an evolved node B (eNB), or a portion thereof, the process may include slicing a physical radio resource into a plurality of network slices 1310; and mapping each of the plurality of network slices to contiguous logical radio resources 1320. The method 1300 of FIG. 13 may further comprise mapping each of the contiguous logical radio resources to physical radio resources 1330.

In some embodiments, a Level-1 media access control (MAC) is to slice the physical radio resource into the plurality of network slices and a Level-2 MAC is to map the plurality of network slices to the contiguous logical radio resource wherein the Level-2 MAC is to schedule the physical radio resources within the network slice.

In some embodiments, the plurality of network slices may be mapped to the contiguous logical radio resource according to a predefined logical transmission time interval (TTI) unit.

In some embodiments, the method may include assigning a network slice identifier (sNetID) to a corresponding network slice of the plurality of network slices; and broadcasting each sNetID to each device being served by the eNB.

In some embodiments, each of the plurality of network slices are assigned to dedicated physical random access channel (PRACH) such that a user equipment (UE) is to access at least one of the plurality of network slices by performing a random access procedure over the dedicated PRACH.

In some embodiments, each of the plurality of network slices are to be in an active state in order to utilize the dedicated PRACH, and wherein when a network slice of the plurality of network slices is in a dormant state or an idle state, the UE is to perform a random access procedure over a common PRACH, and method further comprises: triggering the network slice to enter the active state in response to reception of a message indicative that the UE performed the random access procedure over the common PRACH, wherein the message is to include an sNetID of the network slice to be triggered.

In some embodiments, the method may include broadcasting a location of the dedicated PRACH within a subframe to each device being served by the eNB in system broadcasting information message and/or in a system information block (SIB).

In some embodiments, the method may include determining whether traffic is present within each of the plurality of network slices for a desired (e.g. specified) period of time; transitioning each network slice of the plurality of network slices to a dormant state when no traffic is determined to be present for the desired (e.g. specified) period of time; and releasing resources allocated to network slices that are in the dormant state.

In some embodiments, the method may include transitioning at least one network slice of the plurality of network slices from a dormant state to an active state when downlink traffic occurs in the at least one network slice, wherein the at least one network slice is to be triggered by a network element.

In some embodiments, the method may include transitioning at least one network slice of the plurality of network slices from a dormant state to an active state when uplink traffic occurs in the at least one network slice, wherein the at least one network slice is to be triggered by a UE during a random access procedure.

In some embodiments, the method may include providing common physical downlink control channel (cPDCCH) information and dedicated physical downlink control channel (dPDCCH) information.

In some embodiments, the cPDCCH information is to be used by a UE to locate fixed symbols of each subframe, wherein the cPDCCH is to carry resource allocation information for UEs accessing a mobile broadband (MBB) network and resource allocation information for the network slices, wherein each UE is to use an sNetID to detect the cPDCCH information addressed to a corresponding UE.

In some embodiments, the dPDCCH information associated with one of the plurality of network slices is located in the radio resources assigned to one of the plurality of network slices, wherein the dPDCCH information is to be assigned to two or more continuous resource blocks of the one of the plurality of network slices or is to be distributed in the resource blocks associated with the one of the plurality of network slices, and wherein the dPDCCH is to carry scheduling information for a UE operating under the one of the plurality of network slices.

In some embodiments, the method may include receiving a common physical uplink control channel (cPUCCH) transmission and a dedicated physical uplink control channel (dPUCCH) transmission within one radio subframe, wherein the cPUCCH is to be used by one or more UEs that desire to access a mobile broadband (MBB) network, wherein the dPUCCH is to be used by one or more UEs that desire to access at least one network slice of the plurality of network slices.

In some embodiments, a UE configured to access both the MBB and the network slice is to aggregate associated uplink control information for accessing the MBB and accessing the network slice to a single control unit and the UE is to transmit the control unit in the cPUCCH.

In some embodiments, the method may include determining a minimum amount of transmission latency for a traffic type of a data stream, and allocating the data stream to a number of continuous physical subframes to achieve the minimum amount of transmission latency.

In some embodiments, the method may include performing a hybrid automatic repeat request (HARM) operation on logical subframes defined by the logical TTI.

Figure 14:
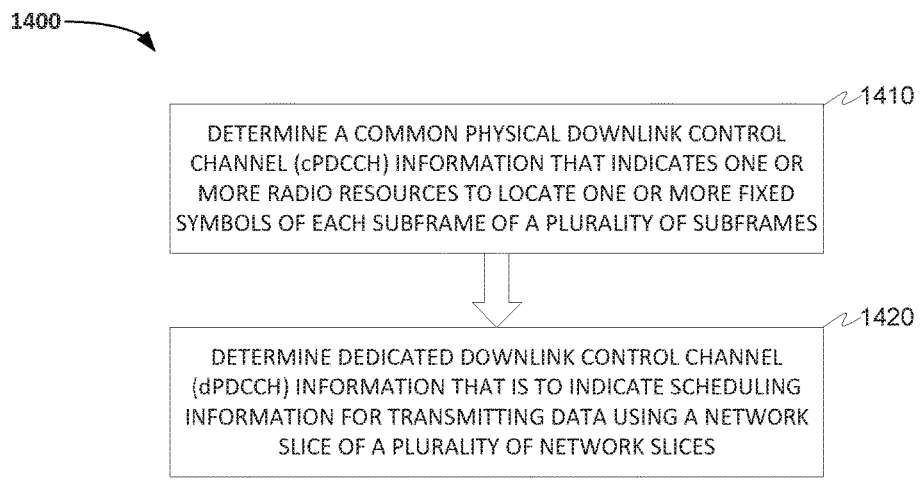
FIG. 14 shows a second example method according to embodiments.

In some embodiments, the electronic device of FIG. 12 may be configured to perform one or more processes, techniques, and/or methods as described herein, or portions thereof. FIG. 14 depicts one such process 1400. For example, in embodiments where the electronic device is, implements, is incorporated into, or is otherwise part of a user equipment (UE), or a portion thereof, the process may include determining, based on a communication from an evolved Node B (eNB), a common physical downlink control channel (cPDCCH) information that indicates one or more radio resources to locate one or more fixed symbols of each subframe of a plurality of subframes 1410; and determining, based on the communication from the eNB or another communication from the eNB, dedicated physical downlink control channel (dPDCCH) information that is to indicate scheduling information for transmitting data using a network slice of a plurality of network slices 1420.

In some embodiments, the cPDCCH is to carry resource allocation information for UEs accessing a mobile broadband (MBB) network and resource allocation information for accessing one of a plurality of network slices, and wherein the UE is to use an sNetID to detect the cPDCCH information addressed the UE.

In some embodiments, the dPDCCH information associated with the network slice is located in the radio resources assigned to the network slice, and wherein the dPDCCH information is to be assigned to two or more continuous resource blocks of the network slice or is to be distributed in the resource blocks associated with the network slice.

In some embodiments, the method may include transmitting a common physical uplink control channel (cPUCCH) transmission and a dedicated physical uplink control channel (dPUCCH) transmission within one radio subframe, wherein the cPUCCH is to be used by the UE to access a mobile broadband (MBB) network and the dPUCCH is to be used by the UE to access the network slice.

In some embodiments, when the UE is configured to access both the MBB and the network slice, the method may include aggregating uplink control information for accessing the MBB and uplink control information for accessing the network slice to a single control unit; and transmitting the control unit in the cPUCCH.

Figure 15:
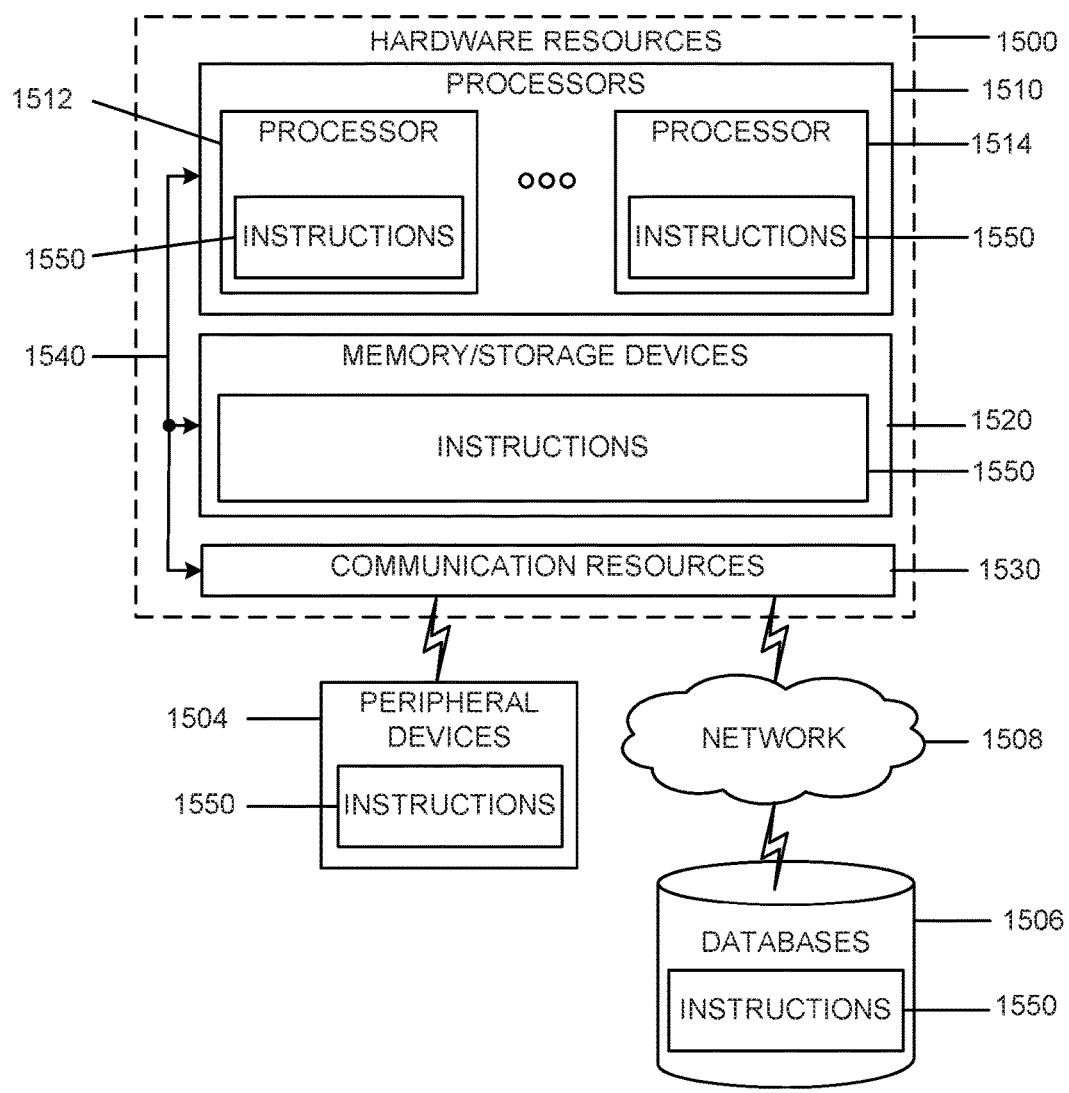
FIG. 15 shows a diagrammatic representation of hardware resources according to an embodiment.

FIG. 15 is a block diagram illustrating components, according to some example embodiments, able to read instructions from a machine-readable or computer-readable medium (e.g., a machine-readable storage medium) and perform any one or more of the methodologies discussed herein. Specifically, FIG. 15 shows a diagrammatic representation of hardware resources 1500 including one or more processors (or processor cores) 1510, one or more memory/storage devices 1520, and one or more communication resources 1530, each of which are communicatively coupled via a bus 1540.

The processors 1510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1512 and a processor 1514. The memory/storage devices 1520 may include main memory, disk storage, or any suitable combination thereof.

The communication resources 1530 may include interconnection and/or network interface components or other suitable devices to communicate with one or more peripheral devices 1504 and/or one or more databases 1506 via a network 1508. For example, the communication resources 1530 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1550 may comprise software, a program, an application, an applet, an app, or other executable code for causing at least any of the processors 1510 to perform any one or more of the methodologies discussed herein. The instructions 1550 may reside, completely or partially, within at least one of the processors 1510 (e.g., within the processor's cache memory), the memory/storage devices 1520, or any suitable combination thereof. Furthermore, any portion of the instructions 1550 may be transferred to the hardware resources 1500 from any combination of the peripheral devices 1504 and/or the databases 1506. Accordingly, the memory of processors 1510, the memory/storage devices 1520, the peripheral devices 1504, and the databases 1506 are examples of computer-readable and machine-readable media.

Figure 16:
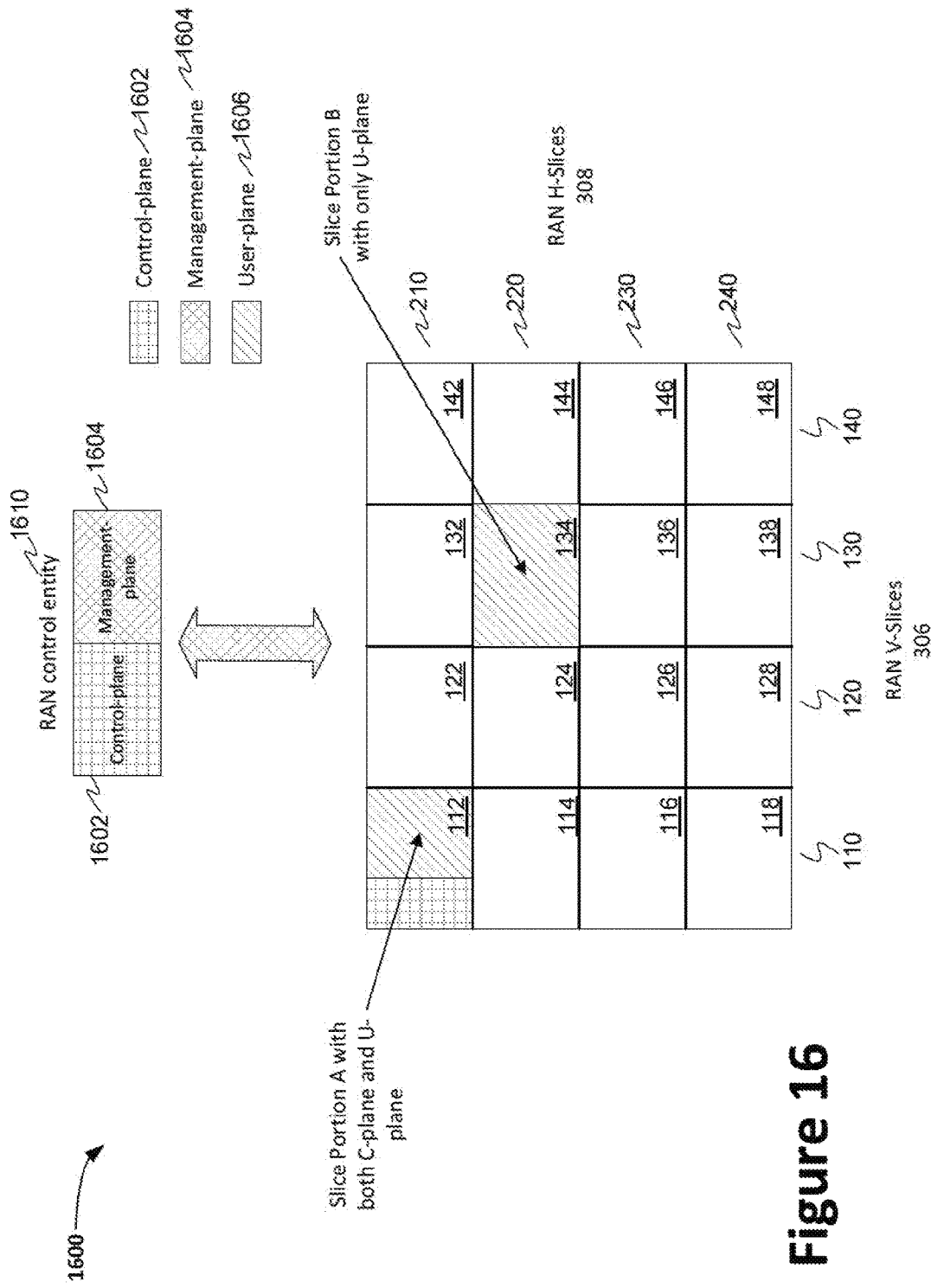
FIG. 16 illustrates how a RAN control entity according to an embodiment can control the horizontal and vertical slices of FIG. 3.

FIG. 16 shows a schematic diagram 1600 of an example illustrating the building blocks of a sliceable radio access network architecture according to an embodiment, and in particular illustrates how a RAN control entity according to an embodiment can control the horizontal and vertical slices of FIG. 3. In this Figure, control-plane (c-plane) functionality is shown as a first fill type 1602, management plane (m-plane) functionality is shown as a second fill type 1604, and user-plane (u-plane) functionality is shown as a third fill type 1606. It is to be noted that the remaining figures uses the same Key for the different plane portions, however the numbering of specific instances of those plane types in the later Figures will be numbered in series related to the Figure number being discussed, e.g. 1700 series for FIG. 17=items 1702-1706, 1800 series for FIG. 18, etc.).

In FIG. 16, there is shown the sliceable (and now sliced) radio access network architecture, comprising a number of horizontal RAN slices 308, and a number of vertical RAN slices 306. The vertical/horizontal slices comprise portions 112-148, as shown. Any given slice portion in the matrix may include a portion of control-plane functionality and/or a portion of user-plane functionality. For example, slice portion A, which in this example is the top horizontal slice portion 112 of the MBB vertical market 110, comprises both c-plane and u-plane functionality. Meanwhile, Slice Portion B, which is the second level horizontal slice portion 134 of the MTC-1 vertical market 130 has only u-plane functionality.

The RAN slices in FIG. 16 are being managed by a RAN control entity 1610, which may include either, or both, c-plane 1602 and m-plane 1604 functionality. In the example shown, both types of functionality are included in the RAN control entity that controls and coordinates the network slice operation (the m-plane). Thus, the RAN control entity may run the control-plane (c-plane) 1602 and the management-plane (m-plane) 1604. The c-plane 1602 may be responsible for establishing and maintaining the connectivity of the network slices. The m-plane 1604 may be responsible for slice configuration/reconfiguration, e.g. the setup and subsequent management of the slices or slice portions, as described in more detail below. In some embodiments, the c-plane 1602 function of the RAN control entity may be the c-plane anchor for slices that do not have c-plane. In the m-plane 1604, the RAN control entity 1610 may operate in both Layer 1 (L1, PHY Layer) and Layer 2 (L2, MAC Layer and above, up to below the IP Layer—in LTE context, the Layer 2 control functions may be the radio resource control (RRC) functions) of the protocol stack, where L1 control coordinates the normal Layer 1 (PHY) operations of the slices, and L2 control (which is a function introduced by this disclosure) coordinates the L2 (RRC) operation of the slices, i.e. the per vertical slice operation of the slices. In some examples, the RAN control entity 1610 may be a virtual entity, whose functions can be physically distributed in different locations of the radio access network.

Figure 17:
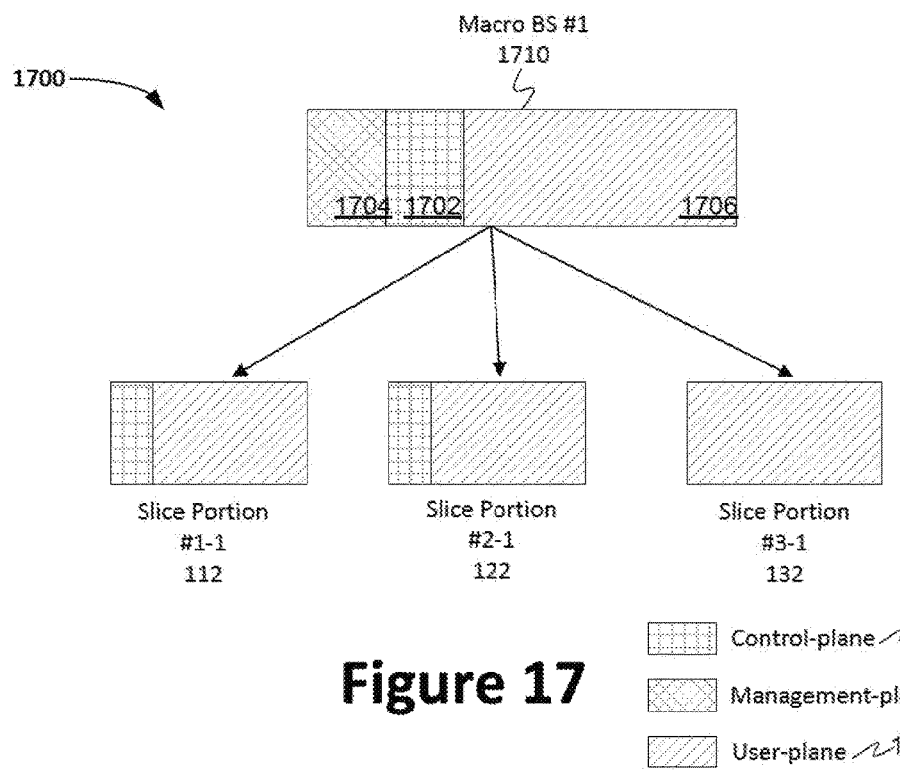
FIG. 17 illustrates a first, distributed, example of a RAN control entity according to an embodiment.

FIG. 17 illustrates a first, distributed, example of a RAN control entity according to an embodiment. In this embodiment, the RAN control entity 1610 may be distributed across multiple (or all) macro BSs in a wireless communications network (however, only one is such macro BS 1710 is shown in the Figure, for clarity). In this example, each of the macro BSs may run a RAN control entity function 1704 to manage the portion(s) of the network slice(s) within the macro BS's coverage. In the example of FIG. 17, there are three slices portions: Slice Portion #1-1; Slice Portion #2-1 and Slice Portion #3-1. Slice Portion #1-1 may be, in one example, the portion of (vertical) MBB slice 110 under the coverage of macro BS #1 1710, i.e. slice portion 112 in FIG. 16. Slice Portion #2-1 may be, in one example, the portion of (vertical) MTC-1 slice 120 under the coverage of macro BS #1 1710, i.e. slice portion 122 in FIG. 16. Slice Portion #3-1 may be, in one example, the portion of (vertical) MTC-2 slice 130 under the coverage of macro BS #1 1710, i.e. slice portion 132 in FIG. 16. As discussed above, with reference to FIG. 16, each of the slice portions may have c-plane and/or u-plane function portions.

In FIG. 17, the macro BS #1 1710 has an m-plane function portion 1704, c-plane function portion 1702 and a u-plane function portion 1706, and the multiple macro BSs making up the RAN act in unison (i.e. a distributed system) to manage the slices of the RAN as a whole. Embodiments of the present disclosure are not limited to any specific combination of slices, slice portions, or their individual make-up in terms of c-plane, u-plane or m-plane functionality.

Figure 18:
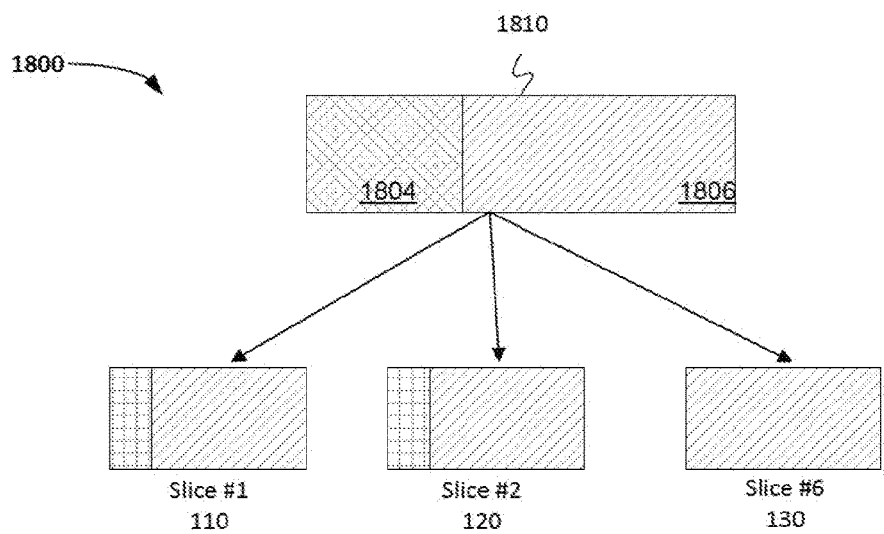
FIG. 18 illustrates a second, centralized, example of a RAN control entity according to an embodiment.

FIG. 18 illustrates a second, centralized, example of a RAN control entity according to an embodiment. In this embodiment, the RAN control entity 1610 may be centrally located, for example at a centralized RAN controller 1810, managing all the slices in its coverage, and may, for example, span multiple macro BS areas. In this Figure, the RAN controller 1810 has both m-plane 1804 and c-plane 1806 function portions, which control the different slices as a whole, i.e. Slice #1, Slice #2 and Slice #3. In the example of FIG. 18, Slice #1 is the MBB vertical slice 110, Slice #2 is the V2X vertical slice 120 and Slice #3 is the MTC-1 vertical slice 130, however the particular slices in use are not limiting. Also in the example, Slice #1 and Slice #2 are each shown as having both a c-plane function portion and a u-plane function portion 1806, whereas Slice #3 is shown as having only a u-plane function portion.

Thus, according to embodiments, the management plane control function that controls and coordinates the slices/slice portions (i.e. the RAN control entity) may be either distributed or centrally provisioned.

Figure 19:
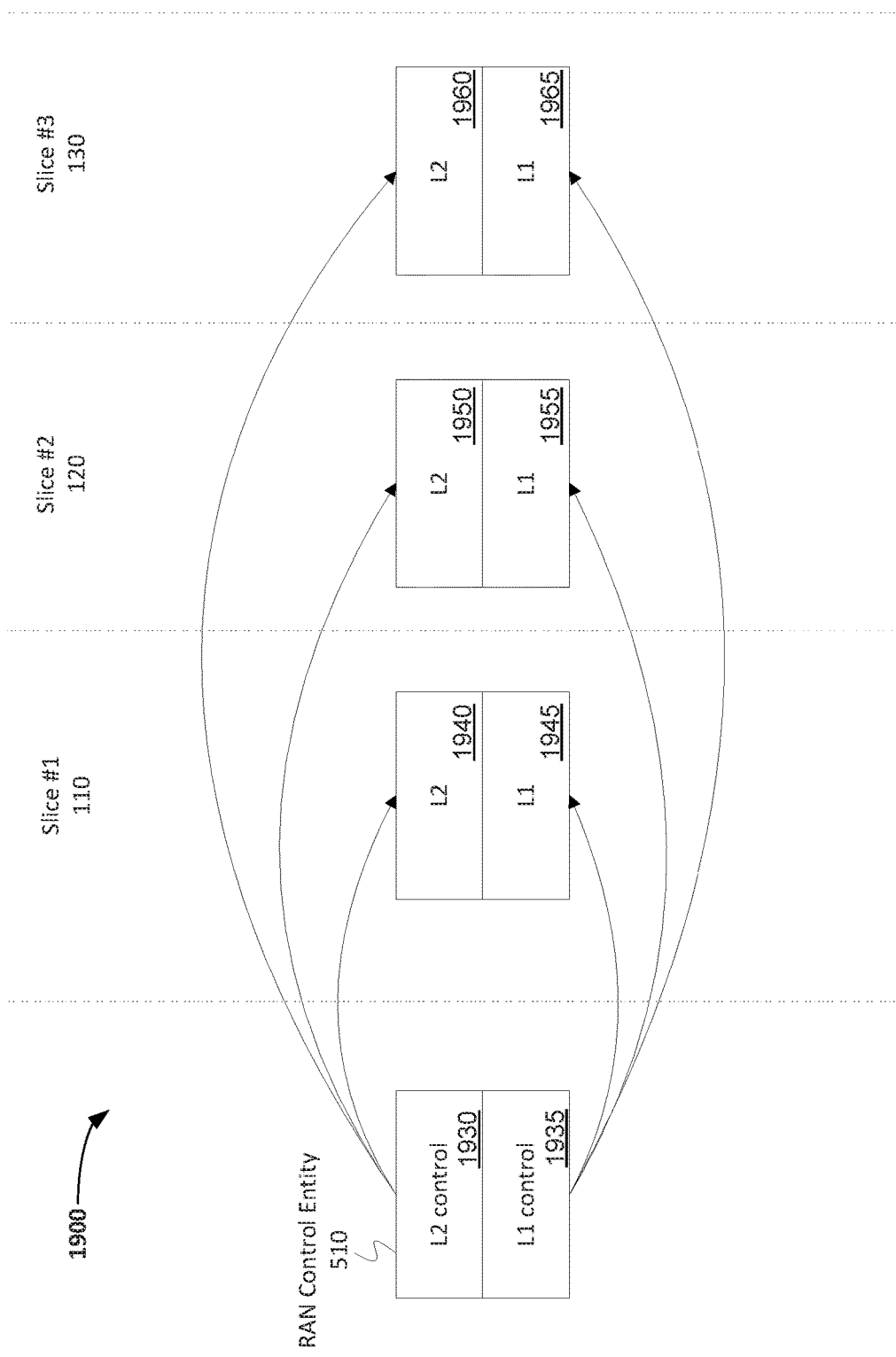
FIG. 19 illustrates a first, flat, example of how a RAN control entity according to an embodiment controls slices of the network.
Figure 20:
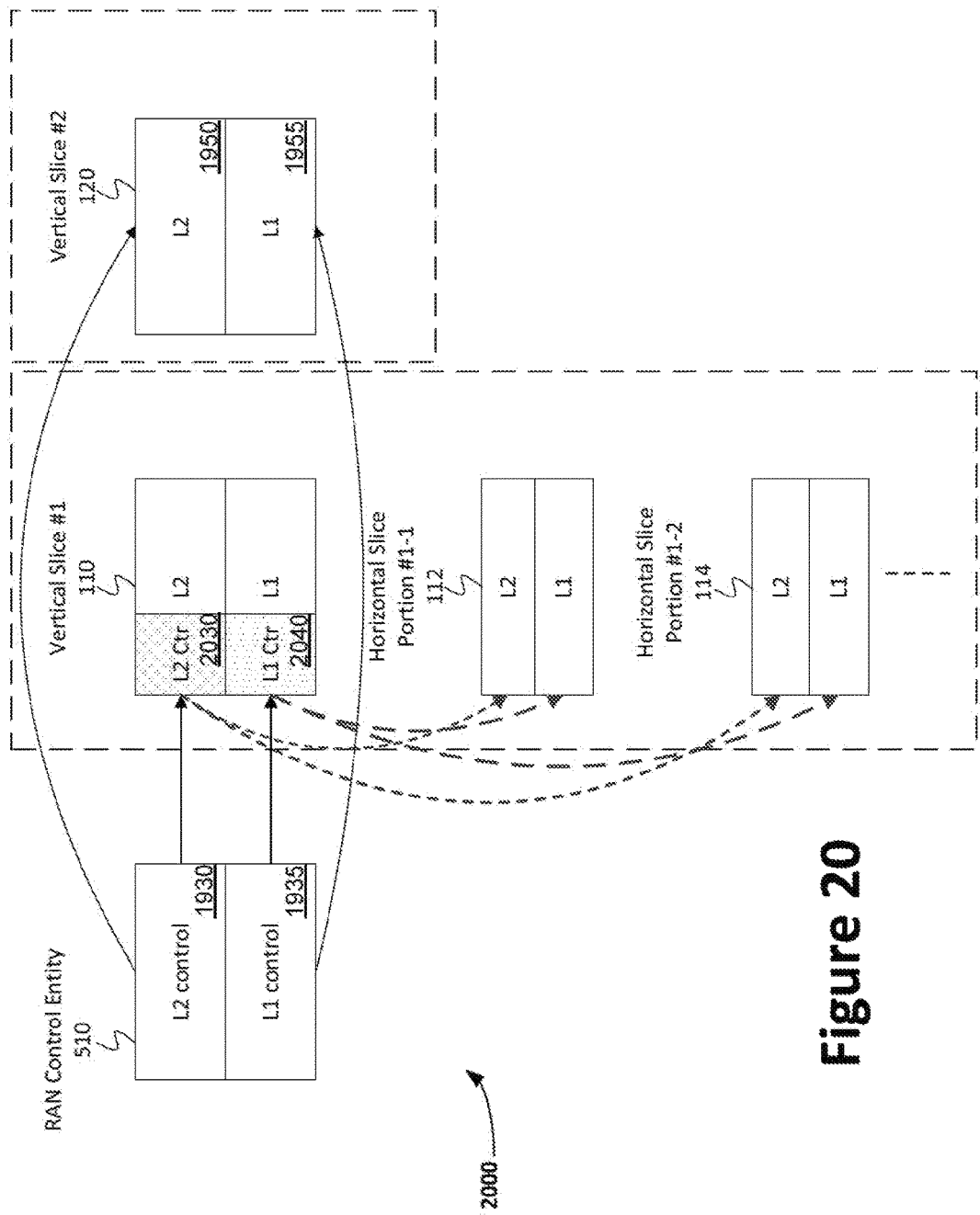
FIG. 20 illustrates a second, hierarchical, example of how a RAN control entity according to an embodiment controls slices of the network.

According to embodiments the Layer 1 (L1—e.g. PHY) and Layer 2 (L2—e.g. MAC and above Layers, providing RRC functions) control functions, which may operating together to control u-plane operation, can follow a flat architecture or a hierarchical control architecture, as illustrated in FIG. 19 and FIG. 20 respectively.

In the flat control architecture illustrated in FIG. 19, the u-plane control of all of the vertical and horizontal slices may be managed by the RAN control entity 1610. According to the example of FIG. 19, the RAN control entity 1610 has both an L2 control function portion 1930 and a L1 control function portion 1935. The L2 control function portion 1930 may be operable to control the L2 function portions 1940, 1950, 1960 of each of the respective slices Slice #1-Slice #3, 110-130. In the same example, the L1 control function portion 1935 may be operable to control the L1 function portions 1945, 1955, 1965 of each of the respective slices Slice #1-Slice #3, 110-130.

In the hierarchical control architecture illustrated in FIG. 20, the RAN control entity 1610 may only control one type of slice, for example a vertical slice, which will further control the other type of slice(s), for example, a horizontal slice. As a further example, in V2X, it is likely for the vertical slice (V2X) to control the horizontal slice (V2V), however in personal area networks (PAN), it is likely for the horizontal slice (PAN) to control the vertical slice (e.g., a health sensor MTC).

According to the specific example of FIG. 20, the RAN control entity 1610 has both an L2 control function portion 1930 and a L1 control function portion 1935. The L2 control function portion 1930 may be operable to control an (overall) L2 controller function portion 2030 of slice #1 110, which in turn controls the L2 function portions of each of the horizontal slice portions forming the vertical slice 110—i.e. horizontal slice portions #1-1 112, horizontal slice portions #1-2 114, etc. (only two horizontal slice portions of Slice #1 are shown, for clarity). The different vertical slices may be controlled separately, and in different ways—as shown by the vertical slice #2 120 only having a single L2 control function portion 1950 (i.e. Slice #2 is controlled in a similar way to that shown in FIG. 19, discussed above).

Thus, examples may provide heterogeneous control of the different vertical slices, as may be necessary in some example implementations of the disclosed sliced RAN technology. The L1 control function may operate in the same or similar way. FIG. 20 shows the exact same way being applied. Thus, in FIG. 20, the L1 control function portion 1935 may be operable to control an (overall) L2 controller function portion 2040 of slice #1 110, which in turn controls the L1 function portions of each of the horizontal slice portions forming the vertical slice 110—i.e. horizontal slice portions #1-1 112, horizontal slice portions #1-2 114, etc.

The different vertical slices may be controlled separately, and in different ways—as shown by the vertical slice #2 120 only having a single control function portion 1955 (i.e. Slice #2 is controlled in a similar way to that shown in FIG. 19, discussed above).

Figure 21:
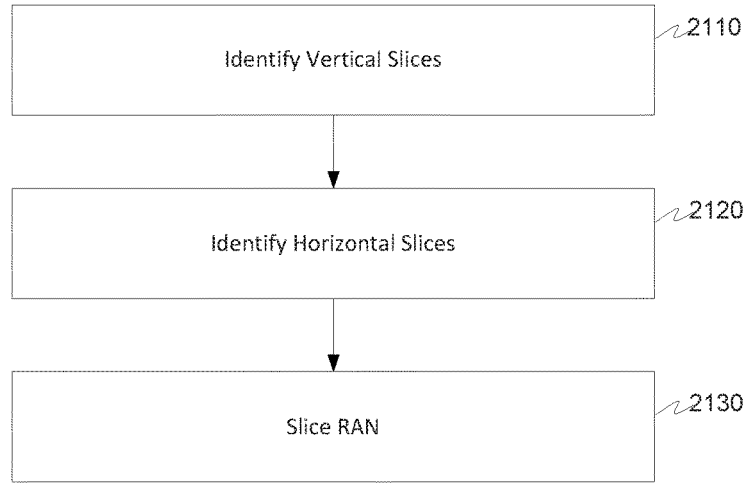
FIG. 21 shows a first example method of managing a Radio Access Network according to an embodiment.

FIG. 21 shows a first example method 2100 of managing a Radio Access Network according to an embodiment. This example is shown at the highest level of detail, and comprises identifying vertical slices (i.e. markets to be served) 2110 and then identifying the horizontal slices (i.e. the network layer(s)) involved 2120, and then slicing the RAN accordingly 2130. It will be appreciated that the identification of the vertical and horizontal slicing may be done in the opposite sequence, or at the same time. The slice identification may be carried out separately and out of sync for each type (horizontal or vertical, or sub-type) and may be carried out periodically. The RAN may be (re)sliced, and the operation of the slices may be altered according to any and each slice identification process carried out.

Figure 22:
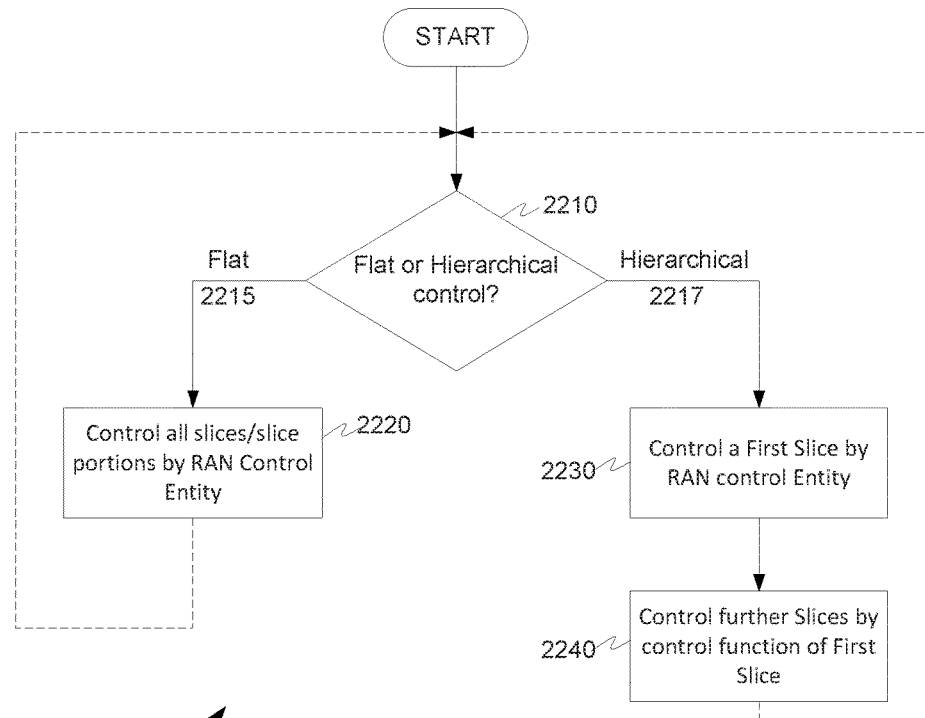
FIG. 22 shows a second example method of managing a Radio Access Network according to an embodiment.

FIG. 22 shows a second example method 2200 of managing a Radio Access Network according to an embodiment. This example is shown at a lower level of detail than FIG. 21. The example method starts and then proceeds to determine whether a slice is going to be controlled in a flat architecture or a hierarchical architecture 2210. If a Flat architecture is followed 2215, the method proceeds to control 2220 all the slices (and associated slice portions) by the RAN control entity 1610 (as per FIG. 19). The method may return to re-test the configuration at a later stage, dependent on implementation. If a hierarchical architecture is followed 2217, the method proceeds to control 2230 a first slice (and optionally its associated slice portions) by the RAN control entity 1610, and then control 2240 the further slices (and their associated slice portions) by the control function of the first slice (as per FIG. 20). The method may return to re-test the configuration at a later stage, dependent on implementation.

As used herein, the term RAN control entity may be any circuit, logic or circuitry suitable for and arranged to carry out the disclosed methods and control functions. The term "logic", "circuit" and "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software as described above (e.g., FIG. 12, FIG. 15, etc.).

According to the present disclosure, network slicing is designed to build slice-specific end-to-end communication solution and enables a scalable 5G radio access network (RAN) and core network (CN) with heterogeneous deployment, heterogeneous traffics and services, and heterogeneous requirements. Network slicing is considered as one of the key technologies for 5G.

The criterion and the granularity of doing network slicing may be implementation specific. However, as discussed above, in general, network slicing may include two dimensions: vertical slicing and horizontal slicing and may be carried out to achieve a user-centric service.

Each slice may be self-contained, operating on the assigned logical resource, e.g. logically separated radio access network (RAN) and corresponding (i.e. serving) core network (CN). In an example, this may involve slice-specific treatment in the CN and RAN. In the CN, network function virtualization (NFV) and software defined network (SDN) may be the technical enablers for network slicing. For example, NFV and SDN may be used to virtualize the network elements and functions, which in turn may enable easily configured/reused network elements and functions in (or for) each slice, in order to meet each slice's own operational requirement(s). In the RAN, slicing may be built on the logical resources abstracted from physical radio resource(s) (e.g. transmission point, spectrum, time, etc.). Each slice may have its own air-interface and RAN architecture.

In the RAN, each cell site may have multiple slices operating on them, each slice may have its own RAN architecture and each mobile device, such as user equipment (UE), may subscribe to one or multiple slices. The mobile device (e.g. UE) association, access control and load balancing schemes may be slice-specific instead of cell-specific as in current mobile networks. Slice on/off operation may be enabled at each access point (AP) or base station (BS). The control-plane and user-plane configuration may be tailored considering the slice-based operation. In a sense, the slice-specific operation may blur the concept of the physical cell site (e.g. base station) and makes the network operation more service/traffic/user oriented instead of physical cell oriented.

Examples of the present disclosure provide slice-based operation in the RAN. Specifically, the following aspects are discussed: 1) Slice-specific RAN architecture; 2) Control-plane and user-plane configuration with network slicing; 3) Slice on/off operation; 4) Slice-based access control; and/or 5) Slice-based load balancing.

Slice-Specific RAN Architecture

FIG. 2 showed an example of a slice-specific RAN architecture that depends on factors such as traffic type, traffic load, QoS requirement, and the like, and the RAN architecture of each of the slices may be dynamically configured. The proposed sliceable RAN architecture may include control-plane and user-plane functions, which may provide functionality for slice on/off operation and slice-based treatment on access control and load balancing, amongst other functions. The proposed sliceable RAN architecture may utilize control-plane and user-plane operation, where the c-plane portion may be either common or slice-specific, or a combination thereof, as will be illustrated in the following sections.

Control-Plane and User-Plane Configuration in the RAN

Depending on how the control-plane (C-plane) and the user-plane (U-plane) are (de)coupled in the RAN, there are various options on how the C/U-planes may be configured for use in a sliceable RAN architecture. In the following, the reference to 'decoupled' may mean the respective portions are not co-located, or are not on the same logical or physical signal path for the signaling messages (i.e. if decoupled, the messages for the C-plane do not travel the same path as the messages for the u-plane). The term coupled may mean the opposite, i.e. the respective portions are co-located, or are on the same logical or physical signal path for the signaling messages.

Figure 23:
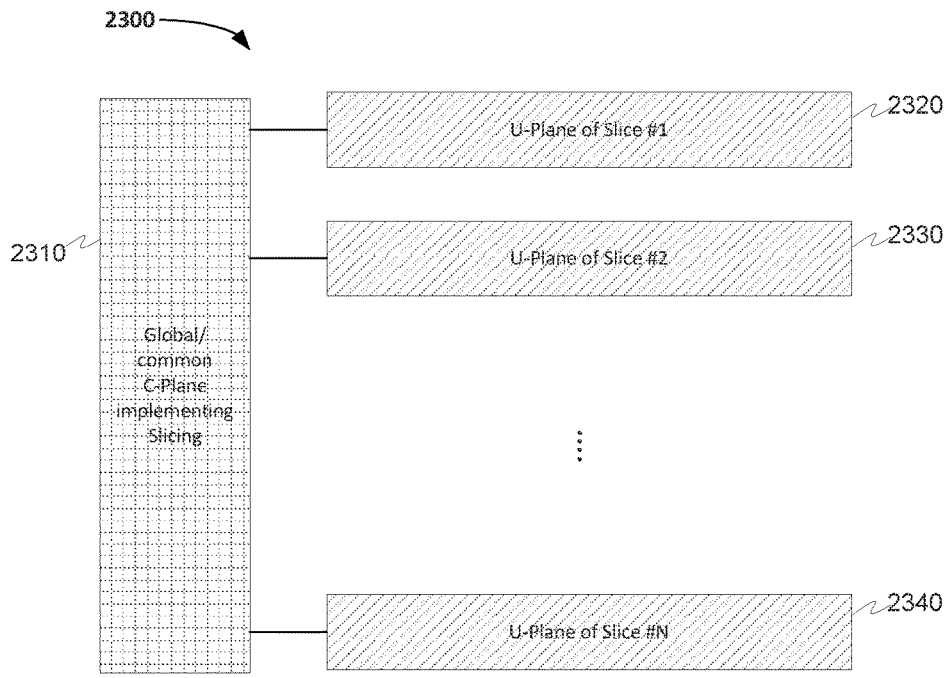
FIG. 23 shows a first example C/U-plane implementation with a decoupled configuration for the network slices.

Option 1: Control-plane as an independent slice, decouple control-plane slice and user-plane slices. In this option, the C-plane and the U-plane of each network slice are decoupled. There may be one C-plane slice supporting all the U-planes. The C-plane slice and the U-plane slice may operate on different network nodes. For example, the C-plane slice may be maintained at the macro BSs while the U-plane slices may operate on macro BS, small cell BS, and/or via device-to-device links. The advantage of this option is that the C-plane functions may be always-on, providing full coverage for the devices being served by the network slice(s). The drawbacks may be the signaling exchange between the C-plane slice and the U-plane slice when they are not physically co-located. FIG. 23 shows an example C/U-plane implementation 2300 with a decoupled configuration for the network slices. In particular, FIG. 23 shows a global common c-plane 2310 (i.e. for use on all the network slices), connected to the respective u-planes, e.g. u-plane of slice #1 2320, u-plane of slice #2 2330, all the way down to the u-plane of slice #N 2340. This is to say, the specific number of u-planes (of) slices/number of slices in use is arbitrary for any given example implementation and the current circumstances of that implementation.

Figure 24:
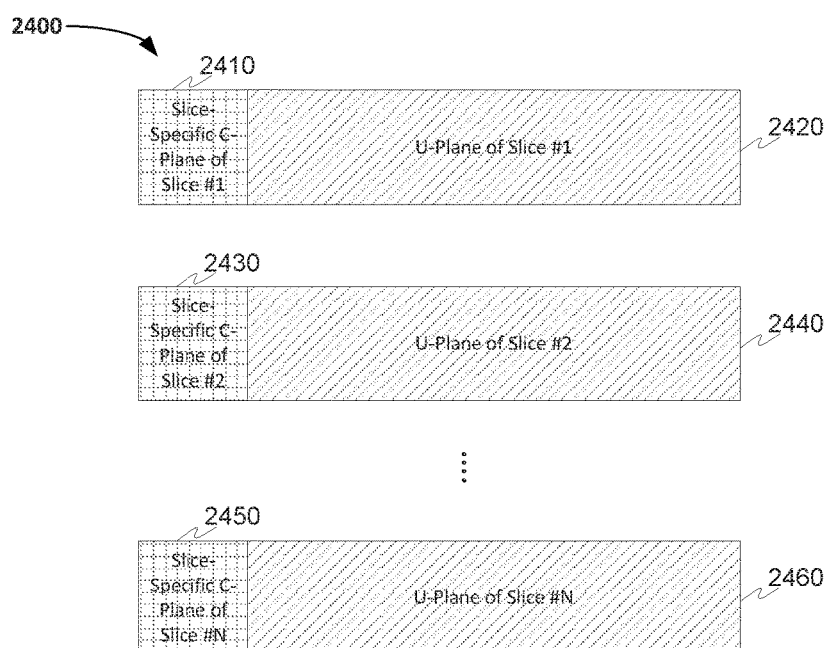
FIG. 24 shows a second example C/U-plane implementation with a coupled configuration for the network slices.

Option 2: Control-plane coupled with user-plane in each slice. In this option, the C-plane and the U-plane of each slice may be coupled and physically co-located. The advantage of this configuration may include less control signaling delay and signaling exchange overhead among transmission points. In some examples, in order to ensure C-plane coverage, the slices may be kept on at the transmission points that only have small traffic on that slice. FIG. 24 shows a C/U-plane coupled slice configuration 2400, in which a slice-specific c-plane of slice #1 2410 is coupled to the u-plane of slice #1 2420, a slice-specific c-plane of slice #2 2430 is coupled to the u-plane of slice #2 2440, and may continue all the way down (i.e. up to) to a slice-specific c-plane of slice #N 2450 being coupled to the u-plane of slice #N 2460. Again, the number of slices in use is arbitrary to the implementation and the current circumstances of that implementation.

Figure 25:
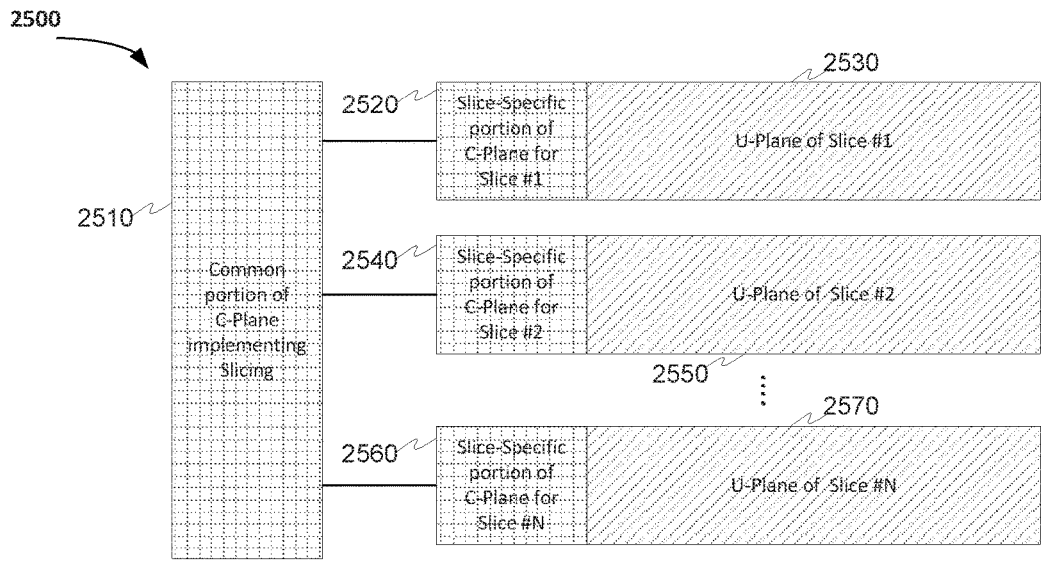
FIG. 25 shows a third example C/U-plane implementation with a partially decoupled, partially coupled, configuration for the network slices.

Option 3: Control-plane splitting into a common control-plane slice and slice-specific control-plane. In this option, some of the common control-plane functions such as the functions in 'radio resource control-idle' (RRC-idle) mode (e.g., paging, cell reselection, tracking area update) may be categorized into a common C-plane portion, while the functions in 'radio resource control-connected' (RRC-connected) mode (e.g., handover, dedicated bearer setup) may be categorized into slice-specific control plane function. In an example, the advantage is to provide coverage and at the same time reduce control signaling exchange among network nodes. FIG. 25 shows a partially decoupled C/U-plane configuration 2500 in which a common c-plane function 2510 is connected to: a slice-specific portion for Slice #1 2520 and the slice-specific u-plane function for slice #1 2530; a slice-specific portion for Slice #2 2540 and the slice-specific u-plane function for slice #2 2550, and may continue all the way down (i.e. up to) to a slice-specific portion for Slice #N 2560 and the slice-specific u-plane function for slice #N 2570. Again, the number of slices in use is arbitrary to the implementation and the current circumstances of that implementation.

Slice On/Off Procedure

Regardless of the c-plane/u-plane topology in use, the proposed slice-specific RAN architecture inherently suggests the use of a slice on/off procedure. Some scenarios of slice on/off include: opening up a slice in a small cell underlying macro cell coverage; opening up a slice in a cell operating on a different frequency band (e.g. high frequency band, unlicensed band). The triggers for turning on a slice at an access point may include:

Traffic load of a slice goes beyond a certain threshold—e.g. such information may be obtained from the UEs trying to access the AP on the slice and/or indicated by the neighboring APs and/or by the network central controller and/or by the APs in the parent hierarchy, e.g., a macro cell.

The number of active UEs operating on a slice goes beyond a certain threshold—e.g. such information may be obtained from the UEs trying to access the AP on the slice and/or by the neighboring APs, and/or by the APs in the parent hierarchy, e.g., a macro cell In order to keep service continuity of a moving UE, where the US is moving across base-stations (e.g. Macro BSs), and is connected to a particular slice (or slices) on one base station, but the base station to which they are about to move (and handover) does not yet have any or all of the respective slices in operation thereon.

In order to meet certain QoS requirement, such as low latency, ultra-reliability, etc., i.e. a QoS requirement is instigated that may be best/better served by a new slice for that QoS class.

Figure 26:
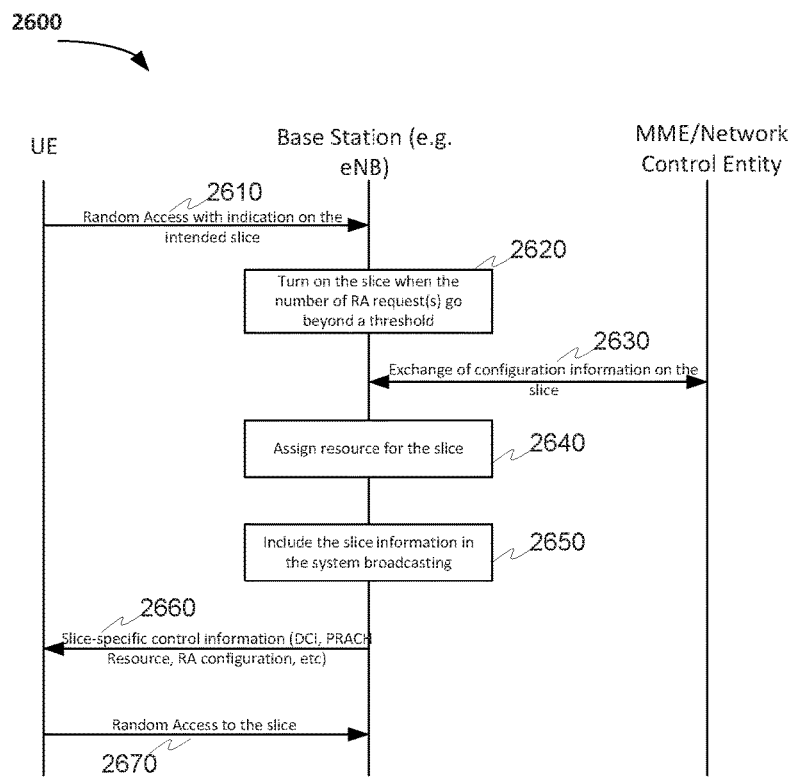
FIG. 26 shows a first example slice-on procedure by a UE based on thresholds.

Slice-on at one AP may be triggered by UE or by network. FIG. 24—FIG. 26 show the slice-on procedure by different types of triggers. When triggered by the UE, the UE may send an indication on the intended slice during random access. Depending on the types of UE triggering, i.e., due to traffic load or due to QoS requirement, the slice-on procedures may be different. In the traffic-load motivated slice-on, the BS may only turn on the slice when it sees enough traffic coming. The UE access request may not always be accepted if the BS decide not to turn on the slice. In the QoS-motivated slice on, the BS may turn on the slice when have the QoS demand. The UE access request may be accepted given the requested QoS meet certain criterion. When triggered by the peer BS/AP, the peer BS/AP may send a triggering message to request slice on at the targeted BS.

FIG. 26 shows a first example 2600 UE triggered slice on (i.e. slice turn-on). In the example of FIG. 26, the instigating parameter is that the number of UEs requesting the slice (be turned on) goes beyond a certain threshold. In FIG. 26, the example turn-on process starts by respective UEs carrying out a Random Access that includes an indication (i.e. data element) of an intended slice the UEs wish to use. This comprises a message 2610 sent from the UE(s) to the base station. When enough UEs have requested the use of the same network slice (i.e. a threshold number has been exceeded), the receiving base station may then turn-on the requested network slice 2620. As a result of the slice turn-on, messages implementing the slice turn-on may be sent from (and received by) the base station to (and from) the Mobility Management Entity (MME) or other network control entity that implements the slice management process(es), the messages being an exchange of configuration information on the slice. This is shown in FIG. 26 as the bidirectional messages arrow 2630. A result of the configuration messages exchange may be the assignment of wireless resources for the slice to be turned-on (e.g. frequencies, numerologies, etc.). The slice information may then be included 2650 in the system information messages (i.e. system broadcasting information), for ready access by all devices being served by the respective base station (and/or network control entity). This allows all the devices wishing to access the newly turned-on slice with the information to do so, e.g. by providing the slice-specific control information such as, but not limited to: the downlink control information (DCI), physical random access channel (PRACH) resource, slice random access (RA) configuration, and the like. Using this newly acquired information, the respective UE(s) may then random access the newly created network slice 2670.

Figure 27:
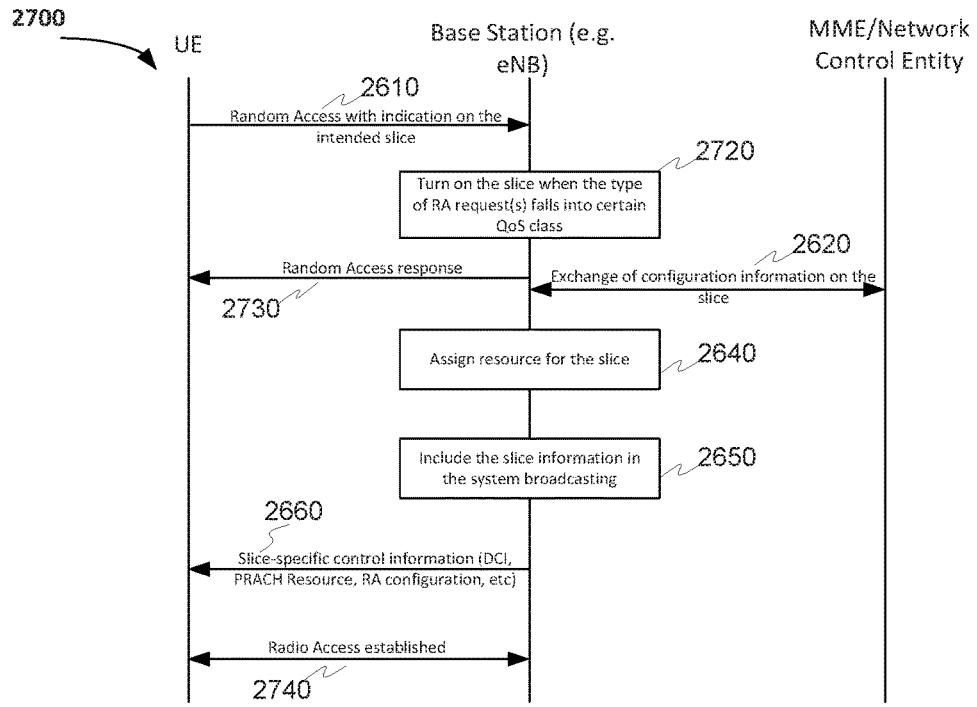
FIG. 27 shows a second example slice-on procedure by a UE based on Quality of Service class.

FIG. 27 shows a second example 2700 UE triggered slice on, in which the instigating parameter is that the type of UE request falls into certain QoS class. The process is very similar to process 2600 of FIG. 26 (like items are referenced by the same numbers). However in this case the slice is turned-on 2720 after a device sends a request (e.g. by a random access, with the respective request information therein) that falls into a given QoS class. Other classes may be provided, in some implementations. In this example, the base station provides a random access response 2730 early, which means the device requesting the slice based on QoS requirement is able to access the slice earlier, and in a simplified fashion at 2740 as at least a portion of the information is already provided to the Device in message 2730.

Figure 28:
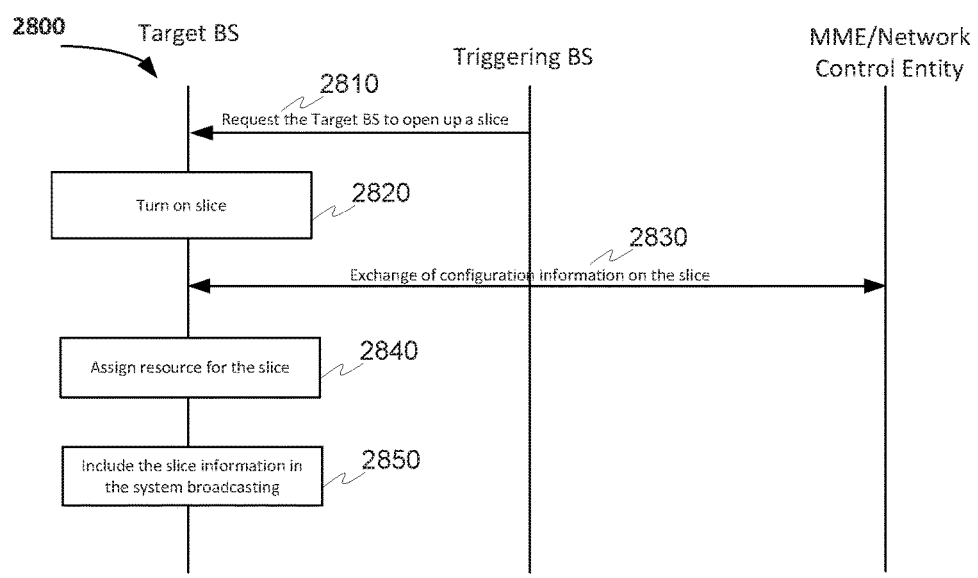
FIG. 28 shows a first example slice-on procedure by a base station.

FIG. 28 shows a first example 2800 network triggered slice turn-on. In the example of this Figure, there is a triggering base station (i.e. the base station that is requesting the turning-on of a slice, e.g. it may already have the respective slice in operation, and is about to hand over a UE to the target base station), and a target base station (i.e. a base station that is receiving the request to turn-on a respective slice, e.g. because it is about to be handed over a device making use of that respective slice). The request is sent from the triggering base station to the target base station 2810. The target base station then starts the turn-on of the respective slice 2820, which instigates the exchange of configuration information 2830 for the slice with the MME/network control entity managing the respective slice. The MME/network control entity provides the slice configuration information to the target base station 2840 (and so set up the slice accordingly), and the respective slice information can then be included in the system information broadcasted to all devices 2850, so that devices wishing to access the newly turned-on slice are able to use that broadcasted information do so.

Meanwhile, the triggers for turning-off a slice at an access point (or base station) may include:

Traffic load of a slice goes below a certain threshold;

The number of active UEs operating on a slice goes below a certain threshold.

Figure 29:
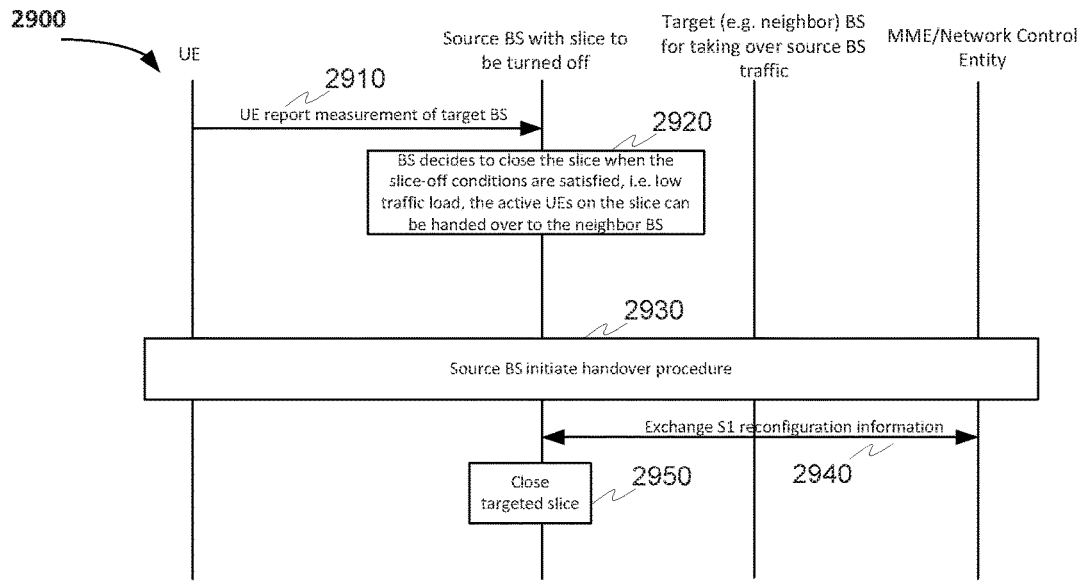
FIG. 29 shows a first example slice-off procedure by a base station.

FIG. 29 shows an example slice turning off procedure 2900 in one base station (e.g. source base station). This example is based on the UE reporting on the neighboring cell condition and the traffic load/number of connection condition on the slice, the BS (the source BS) may decide to turn off the slice. To prepare for slice turn-off, the BS may handover the active UEs camped on the BS operating on the slice to the neighbor BS (i.e. target base station) with the slice operating thereon. The process of FIG. 29 starts with a message 2910 being sent from a UE currently connected to the source Base station, to said source base station, that includes a report measurement of the target base station. On the basis of the report in message 2910, the source base station may decide to turn-off (i.e. close) the slice because the slice turn-off conditions have now been satisfied, e.g. low traffic load. The active devices (e.g. UEs) on the slice may be handed over to a neighbor base station to maintain continuality of their service. In which case, a source base station led (i.e. instigated) handover procedure 2930 may be carried out to hand over devise to the corresponding slice on the target base station. An exchange of information 2940 on the Si interface (or any other suitable base station to core network interface) may then be carried out, to exchange the information used to reconfigure the slice statuses on the target and source base stations, respectively, such that the slice on the source base station may then be closed at 2950.

As can be seen from the above-described examples, the turn-on and turn-off of a particular network slice may be instigated by any entity making use of or providing a function within the slice, and for a variety of reasons. The examples shown are merely exemplary of some of the types of slice management procedures, and what sub-processes may be employed in those management procedures, according to the present disclosure.

Slice-Based Access Control

As the RAN architecture of each slice may be different, the access control may be slice-specific as well. The access control applies when a UE tries to become radio resource control (RRC) connected and/or during handover. For UEs in an idle mode, the UE may camp on any base station and be kept in an idle mode. In this situation, the C/U-plane configurations option 1 and 2 (of FIGS. 23 and 24) discussed may be applied.

Figure 30:
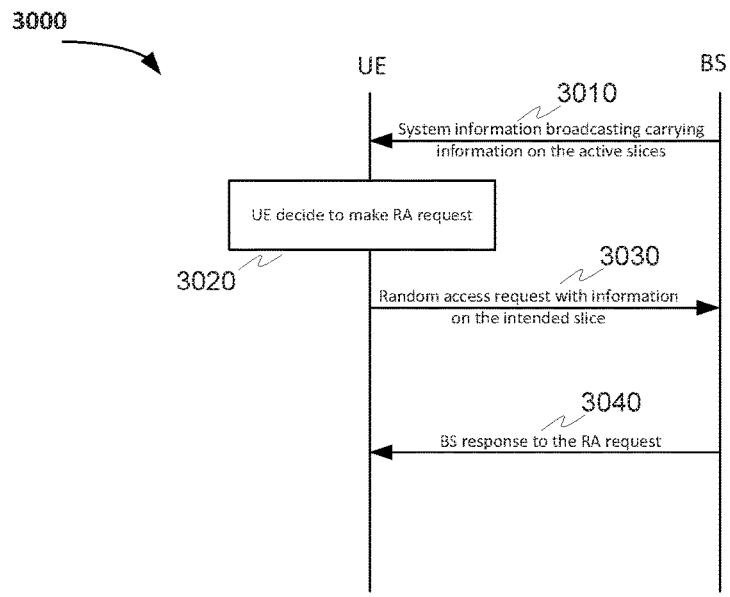
FIG. 30 shows a first example random access procedure.

FIG. 30 shows an example of the slice-specific random access procedure 3000. The base station system information (i.e. broadcasted system information) may carry information on the active slices in the BS 3010. Based on the BS system information, the UE may decide 3020 whether to do a random access with the BS. If the intended slice is active in the BS and given good channel condition, the UE may access that active slice by carrying out an RA request including information on the slice the UE would like to access 3030. Even if the intended slice is not supported by the BS, the UE may still decide to request access. In this case, factors affecting the decision may be: link condition, QoS requirement, traffic load of the neighboring cells, etc. If the UE make the access request but the slice is not currently active in the BS, the BS may have to decide whether to accept the request, and turn-on the respective slice. Signaling exchange among the BSs or between the BS and the central controller may be used to facilitate the BS decision (as shown in FIGS. 26 to 29, for example). Once the BS decides to accept the access request, the BS may turn-on the slice using the procedure discussed in the previous section. IN either case, a base station response may be made by the base station to the UE RA request (i.e. in the affirmative, or negative) 3040.

For UEs that may be simultaneously operated on multiple slices, and where the multiple slices are activate in different APs or BSs, in an example, the UE may have to keep multiple connections simultaneously. In this case, the C/U-plane configuration options as discussed in the previous section become relevant here. For example, the UE may be anchored in one C-plane and keep multiple connections on the U-planes of the different slices (as in C/U-plane configuration option 1—FIG. 23), or the UE may have one common C-plane for maintaining basic C-plane operation while having slice-specific/dedicated C-plane portions for each slice (as in C/U-plane configuration option 2—FIG. 24), or the UE may have multiple connections and multiple C-planes, each serving one slice (as in C/U-plane configuration option 3—FIG. 25).

In an example, slice-based load-balancing may be provided. Slice-base load balancing may achieve traffic shaping gain, reduce control signaling overhead and/or improve overall spectrum efficiency. The operation on slice-based load-balancing may involve coordination across slice and across APs/BSs. Signaling exchange regarding the load conditions on each of the slices among the APs/BSs may be used. Slice-based load-balancing may require joint application of the slice on/off procedure and the slice-specific access control procedure.

In an example, a slice-specific RAN architecture is provided. Depending on factors such as traffic type, traffic load, QoS requirement, the RAN architecture of each of the slices may be dynamically configured.

In an example, control-plane and user-plane configuration options may be provided in support of RAN slicing. In an example, C/U-plane may be decoupled from slice configuration (e.g., control-plane as an independent slice, decouple control-plane slice and user-plane slices). In another example, C/U-plane may not be decoupled from slice configuration (e.g., control-plane coupled with user-plane in each slice). In another example, C/U-plane may be partially decoupled from slice configuration (e.g., control-plane splitting into a common control-plane slice and slice-specific control-plane). In some examples decoupling may be provided by ensuring the decoupled portions are not co-located, or do not comprise the same logical or physical signal path. For example, when the C-plane is decoupled from the U-plane, the C-plane function is not co-located with the U-plane function, and/or, the C-plane messaging does not follow the same logical or physical signal path as the corresponding U-plane messaging. In some examples, coupling may be provided by ensuring the coupled portions are co-located, or comprise the same logical or physical signal path. For example, when the C-plane is coupled to the U-plane, the C-plane function is co-located with the U-plane function, and/or, the C-plane messaging follows the same logical or physical signal path as the corresponding U-plane messaging.

In an example, triggering factors for slice on/off at an AP or BS may include at least one of traffic load of a slice goes beyond a certain threshold at the AP/BS, the number of active UEs operating on that slice goes beyond a certain threshold, to maintain service continuity of a moving UE, or to Meet certain QoS requirement, such as low latency, ultra-reliability, etc.

In an example, slice-on at one AP may be triggered by UE or by network. When triggered by the UE, the UE may send an indication on the intended slice during random access. When triggered by the peer BS/AP, the peer BS/AP may send an triggering message to request slice on at the targeted BS. The AP/BS and the MME/network control entity may exchange signaling when turning on a slice.

In an example, depending on the types of UE triggering, (e.g., due to traffic load or due to QoS requirement) the slice-on procedures may be different. In an example, in the traffic-load motivated slice-on, the BS may only turn on the slice when it sees enough traffic coming. In an example, the UE access request may not be accepted if the BS decides not to turn on the slice. In another example, in the QoS-motivated slice on, the BS may turn on the slice responsive to QoS demand (e.g., the UE access request may be accepted given the requested QoS meet certain criterion).

In an example, the triggers for turning off a slice at an access point may include at least one of traffic load of that slice goes below a certain threshold or a number of active UEs operating on that slice goes below a certain threshold.

In an example, a BS may determine to turn off the slice based on at least one of UE report on the neighboring cell condition or the traffic load/number of connection condition on the slice.

In an example, the BS handover the active UEs on the slice to the neighboring BS when turning a slice off.

In an example, the BS system may carry information on the active slices in the BS.

In an example, the UE may decide whether to access a BS based on at least one of whether the intended slice is on at the BS, the link condition, QoS requirement, or traffic load of the neighboring cells.

In an example, signaling exchange may be among the BSs or between the BS and the central controller may be used to assist BS's decision on whether to turn on a slice or not.

In an example, for UEs that may be simultaneously operated on multiple slices and the multiple slices are activated in different APs or BSs, the UE may keep multiple connections simultaneously.

In an example, slice-based load-balancing may require coordination across slice and across APs/BSs. Signaling exchange regarding the load conditions on each of the slices among the APs/BSs may be used.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. As used herein, the terms device (being served by a RAN or network slice) and UE may be interchangeable.

Embodiments described herein may be implemented into a system using any suitably configured hardware and/or software (e.g., FIG. 12, FIG. 15, etc.).

Other methods of wireless communication are also disclosed, as discussed above with reference to FIGS. 26 to 30, for example.

Figure 31:
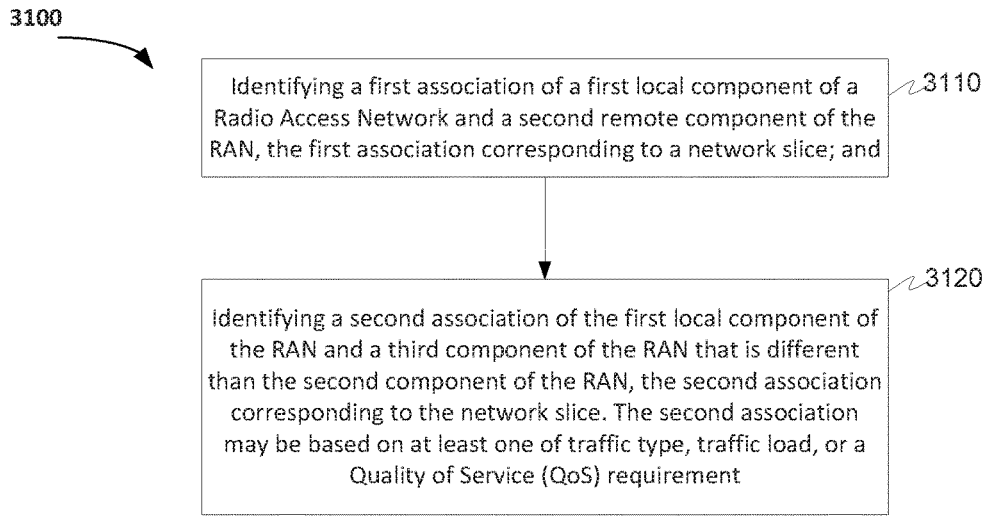
FIG. 31 shows an example implementation of an electronic device (e.g. UE or base station) according to an embodiment.

One such process is depicted in FIG. 31, for example an aspect on slice-based operation in 5G networks with end-to-end network slicing. For example, the process may include identifying a first association of a first local component of a Radio Access Network and a second remote component of the RAN, the first association corresponding to a network slice. The process may further include identifying a second association of the first local component of the RAN and a third component of the RAN that is different than the second component of the RAN, the second association corresponding to the network slice. In an example, the second association may be based on at least one of traffic type, traffic load, or a Quality of Service (QoS) requirement.

FIG. 31 shows a first example method 3100 of wireless communication for a fifth generation (5G) system, such as a wireless network. An example may include a method of wireless communication for a fifth generation (5G) system, such as a wireless network, comprising: identifying a first association of a first local component of a Radio Access Network (RAN) and a second remote component of the RAN, the first association corresponding to a network slice 3120; and identifying a second association of the first local component of the RAN and a third component of the RAN that is different than the second component of the RAN, the second association corresponding to the network slice; wherein the second association is based on at least one of traffic type, traffic load, or a Quality of Service (QoS) requirement.

Another such process is depicted in FIG. 3, for example a method of operating a UE for aspects on slice-based operation in 5G networks with end-to-end network slicing.

For example, the process may include identifying at a UE a first association of a first local component of a Radio Access Network and a second remote component of the RAN, the first association corresponding to a network slice. The process may further include identifying at a UE a second association of the first local component of the RAN and a third component of the RAN that is different than the second component of the RAN, the second association corresponding to the network slice. In an example, the second association may be based on at least one of traffic type, traffic load, or a Quality of Service (QoS) requirement.

Figure 32:
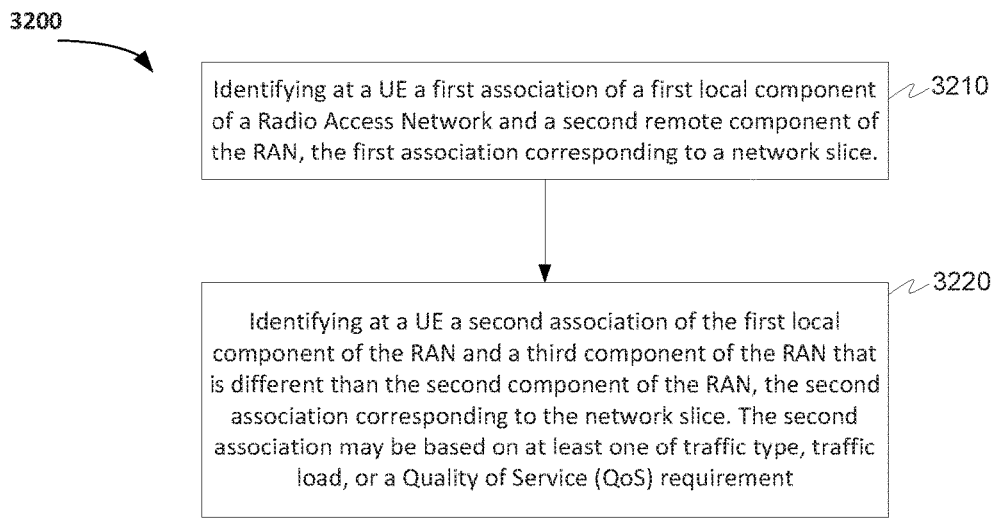
FIG. 32 shows a first example method of wireless communication for a fifth generation (5G) system according to an embodiment.

FIG. 32 shows a second example method 3200 of wireless communication for a fifth generation (5G) system, such as a wireless network. The method comprises identifying at a UE a first association of a first local component of a Radio Access Network and a second remote component of the RAN, the first association corresponding to a network slice 3210, and identifying at a UE a second association of the first local component of the RAN and a third component of the RAN that is different than the second component of the RAN, the second association corresponding to the network slice 3220. The second association may be based on at least one of traffic type, traffic load, or a Quality of Service (QoS) requirement.

Network slicing is an important technology capability of Fifth Generation (5G) wireless networks. With network slicing, one physical wireless network infrastructure can be sliced into multiple logical wireless networks, each architected and optimized for desired vertical applications or services. Such network slicing may be a least partially implemented using software defined core networks though virtualization technology and in the radio air interface through resource partition and applying tailored radio access scheme. Slicing may be implemented with virtualization technology applied across radio access networks and portable devices, and across portable devices to wearable devices. For example, the computing resources in the base station and the portable device(s) (e.g. UEs) may be horizontally sliced, and these horizontal slices may be used together with lower layer device(s) (e.g. wearable device), i.e. integrated together to form a virtual computing platform though a new 5G air interface designed to significantly augment the computing capability of future portable and wearable devices, using their respective higher layer devices (e.g. base station and portable devices, respectively). FIG. 1 illustrates this possible future network evolution trend.

The example embodiments provide architectural designs for such future horizontal network slicing, and enabling technologies. Specifically, the example embodiments may include the following: 1) horizontal slicing; 2) system architecture with horizontal slicing and computation resource sharing; and 3) procedures of implementing horizontal slicing and computation resource sharing.

Computation offloading has been developed in the past. However, the historic form of computation offloading has been part of the application program development, therefore the execution is above and/or at the operating system (OS), and such a solution is not scalable, as application programming is platform-capability dependent. Moreover, different computing partition(s) may result in different application program instances. This does not allow the dynamic or adaptive tradeoff of computation and communication for optimal platform performance in terms of power consumption. However, such benefits are possible with the disclosed horizontal slicing implementation(s).

Figure 33:
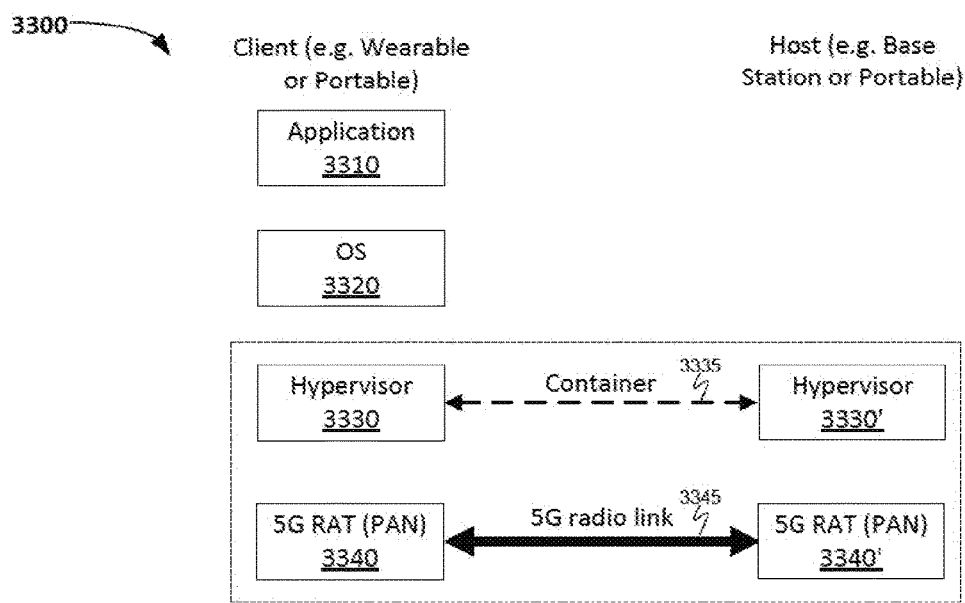
FIG. 33 shows a device system architecture implementing horizontal slicing and computation resource sharing according to an example.

FIG. 33 shows a device system architecture 3300 implementing a horizontal slicing and computation resource sharing. The main building blocks may include the hypervisor 3330, the radio access technology 3340 running on the modem and/or baseband, the data container 3335 and the radio link 3345 connecting the devices, e.g. a host and a client. The hypervisor may be a distinct entity operating below the traditional OS 3320 and application layers 3310. In the example shown in FIG. 33, the host has a corresponding hypervisor 3330' and radio access technology 3340'. The radio access technologies 3340 and 3340' may be any existing or developed wireless communication technologies, such as but not limited to wide area network (WAN) fourth generation (4G) wireless technologies, such as OFDM/CDMA, or may be a personal area network (PAN) wireless technology, either some new form developed as part of the fifth generation (5G) development process (i.e. a 5G PAN RAT), or may be a current of future development of another existing PAN wireless technology such as Bluetooth, Zigbee or the like. In any case, the disclosed horizontal slicing concept is effectively radio access technologies 3340 and 3340' agnostic, as long as they are operable to convey data between devices in data containers as described.

Hypervisor is located beneath the OS 3320. Hypervisor 3330 comprises of a host side 3330' and a client side 3330, for example resident in disjoint mobile platforms. It will be apparent that in some specific implementations, the host and client may be seen simply as first and second devices, and may be interchanged, and the requirements and directions of computational offloading are reversed, either temporarily or permanently (for the life of a particular session). The host may be located where the application is launched. When the application computing requirement is to exceed the client platform's (current) capability, or it may be more cost beneficial to offload the processing to the host side. In such a situation, the OS 3320 or optionally the application 3310 can indicate to the client hypervisor 3330 through the OS 3320 to instruct the client hypervisor 3330 for taking action. The host hypervisor 3330' may have pre-authorized the client for privilege to accommodate the client hypervisor 3330 request and allocate computing and communication resources at the host to client's requirements. This process can be set up at the platform initialization time (e.g., during the pairing process) or in real time on demand. Host hypervisor 3330' and client hypervisor 3330 may dynamically partition the computing and communication resources for the virtualized mobile computing and communication platform, according to the requirements of the particular session parameters. When there is executable software that may be shared between the host and the client, the software exchange is transported inside the data container (or a new rendition, e.g. second/newer instance, of the same sort/format of data container). The exchange may be implemented by the following procedure:

The Client packs the executable software into Container A (a first data container);

Container A is multiplexed with user traffic and exchanged over the 5G air link 3345 to the host through the modem/baseband;

The host deploys Container A and executes;

The host packs the execution outcome into Container B (a second data container) and transmits it back to the client via the radio link; and The client deploys Container B and applies the execution outcome.

The communication layer (the modem and/or baseband) may treat the data container as a block of data without processing. The interaction between the hypervisor 3330/3330' and the radio link control can apply the following two options:

The hypervisor explicitly signals to the radio link indicating the communication requirements. The air link control then allocations appropriate channel, radio access scheme to transmit the container based on the requirements; and The hypervisor cites the header of the container accordingly for the modem layer to decode and match to the channel and radio access scheme accordingly.

In various embodiments, hypervisor may direct the operation of the modem/baseband. In other embodiments, the hypervisor and the modem/baseband are peers, in which cases there may be a handshake process between the hypervisor and the modem/baseband, in order to determine the session parameters and the like.

As used herein, the term RAN control entity may be any circuit, logic or circuitry suitable for and arranged to carry out the disclosed methods and control functions. The term "logic", "circuit" and "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 34:
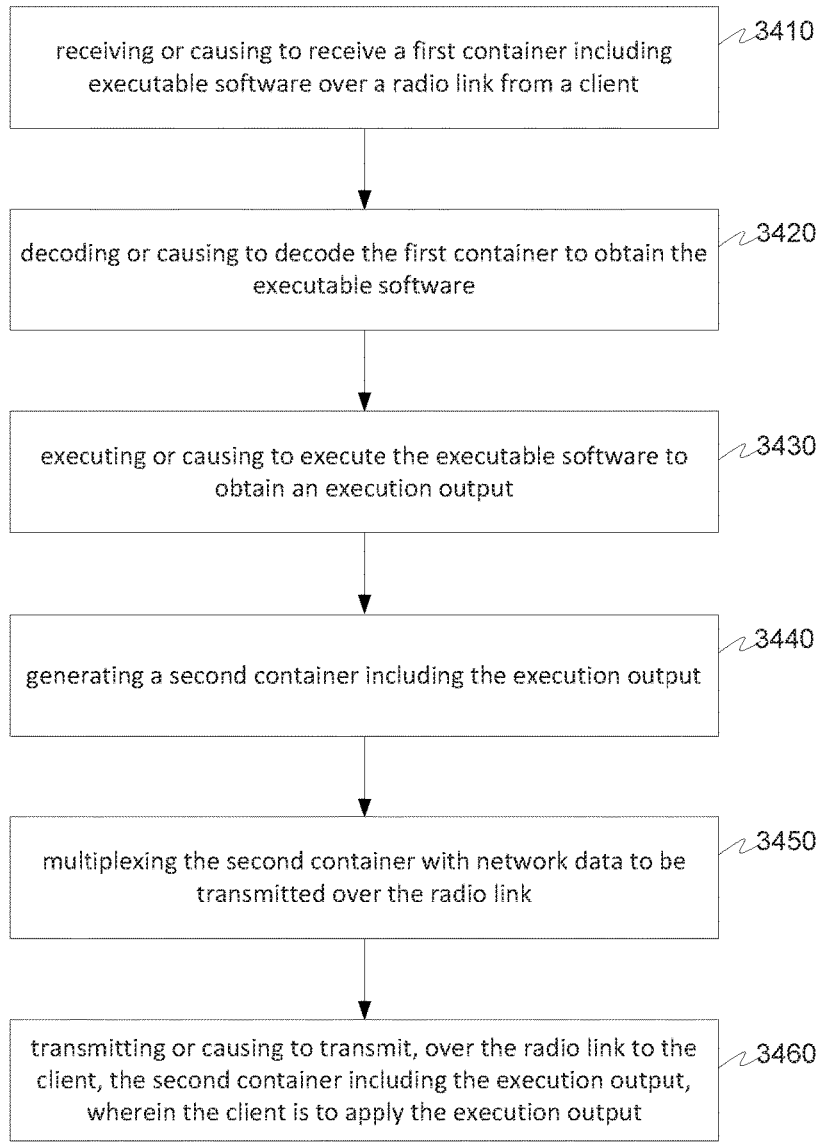
FIG. 34 shows a first example method of communication in a wireless network according to an embodiment.
Figure 35:
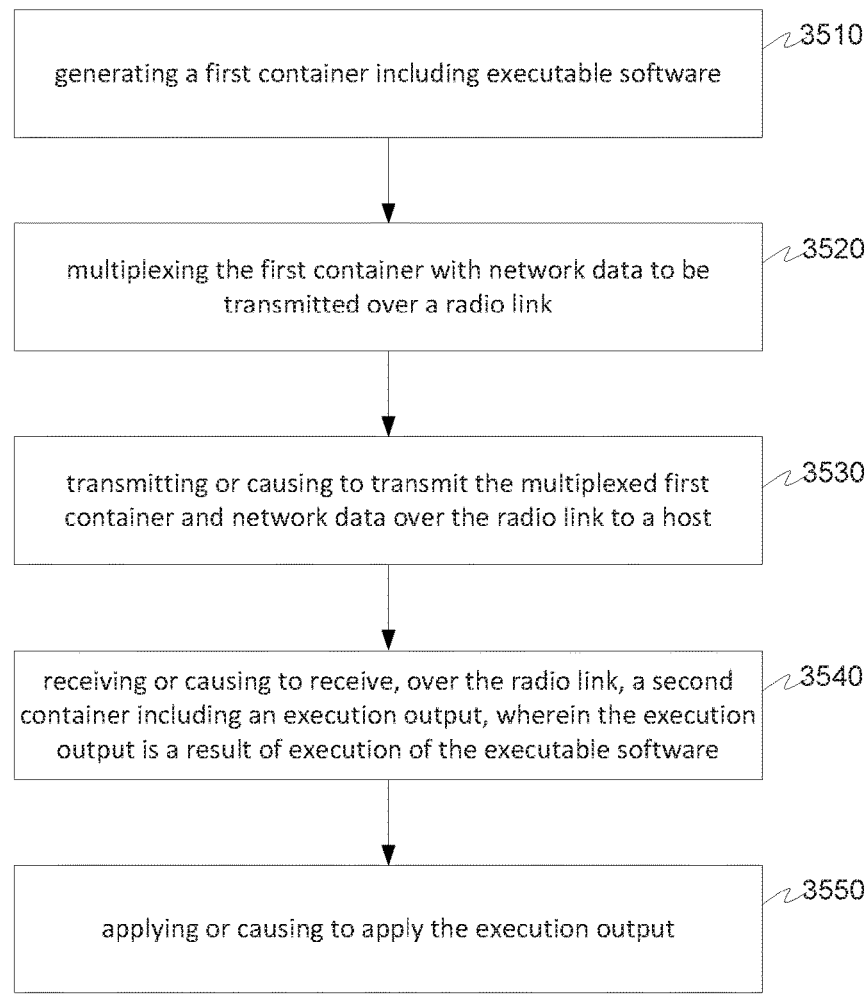
FIG. 35 shows a second example method of communication in a wireless network, corresponding to the first, according to an embodiment.

Embodiments described herein may be implemented into a system using any suitably configured hardware and/or software (e.g., FIG. 12, FIG. 15, etc.). FIGS. 34 and 35 show example methods of communication in a wireless network that may be performed according to the present disclosure, for example by a host or a client device.

The example method 3400 of FIG. 34 may comprise receiving or causing to receive a first container including executable software over a radio link from a client 3410, decoding or causing to decode the first container to obtain the executable software 3420, and executing or causing to execute the executable software to obtain an execution output 3430. The method may further comprise generating a second container, including the execution output 3440, and multiplexing the second container with network data to be transmitted over the radio link 3450. Finally, the method may further comprise transmitting or causing to transmit the second container, including the execution output, over the radio link to the client, wherein the client is to apply the execution output 3460.

The example method 3500 of FIG. 35 may comprise generating a first container including executable software 3510, and multiplexing the first container with network data to be transmitted over a radio link 3520. The method may further comprise transmitting, or causing to transmit, the multiplexed first container and network data over the radio link to a host 3530, and then receiving or causing to receive a second container, including an execution output, over the radio link, wherein the execution output is a result of execution of the executable software 3540. Finally, the method may further comprise applying or causing to apply the execution output 3550.

Figure 36:
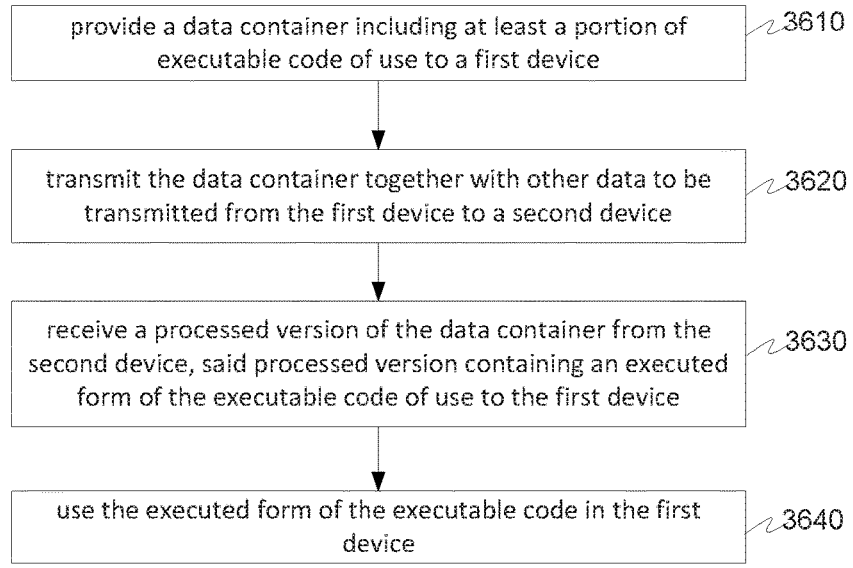
FIG. 36 shows a third example method of communication in a wireless network according to an embodiment.
Figure 37:
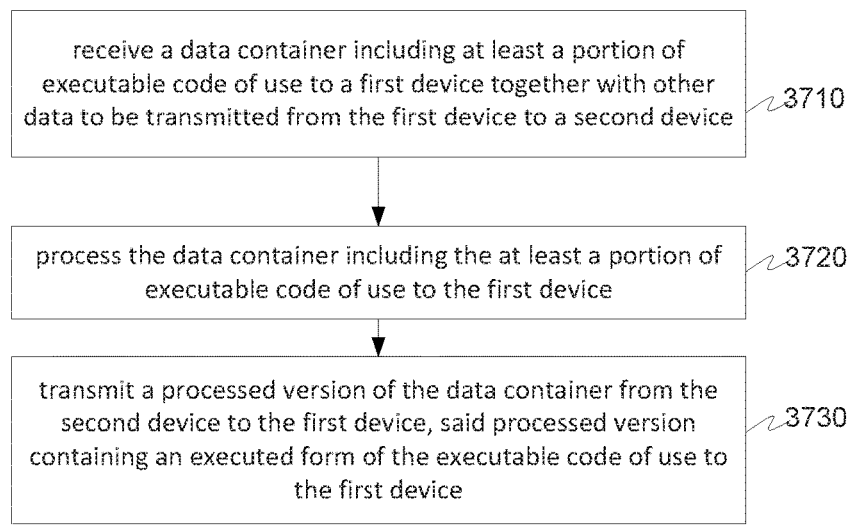
FIG. 37 shows a fourth example method of communication in a wireless network, corresponding to the third, according to an embodiment.

FIGS. 36 and 37 show example methods that a device (for example, either as a host or client) as described herein may carry out in a wireless network.

In the example method 3600 of FIG. 36, a device for use in a first wireless network device operating within a wireless network may receive at least one communication originating from a second wireless network device, or transmit at least one communication to the second wireless network device. The method may further comprise providing a data container including at least a portion of executable code of use to the first device 3610, transmitting the data container together with other data to be transmitted from the first device to the second device 3620. The method may further comprise receiving a processed version of the data container from the second device, said processed version containing an executed form of the executable code of use to the first device 3630 and using the executed form of the executable code in the first device 3640.

In the example method 3700 of FIG. 37, a device for use in a first wireless network device operating within a wireless network may receive at least one communication originating from a second wireless network device, or transmit at least one communication to the second wireless network device. The method may further comprise receiving a data container including at least a portion of executable code of use to the first device, together with other data to be transmitted from the first device to the second device 3710, processing the data container including the at least a portion of executable code of use to the first device 3720, and transmitting a processed version of the data container from the second device to the first device, said processed version containing an executed form of the executable code of use to the first device 3730.

Embodiments described above may be implemented in any combination of hardware or software (e.g., FIG. 12, FIG. 15). Embodiments can be realized according to any of the following examples taken jointly and severally in any and all permutations.

Figure 38:
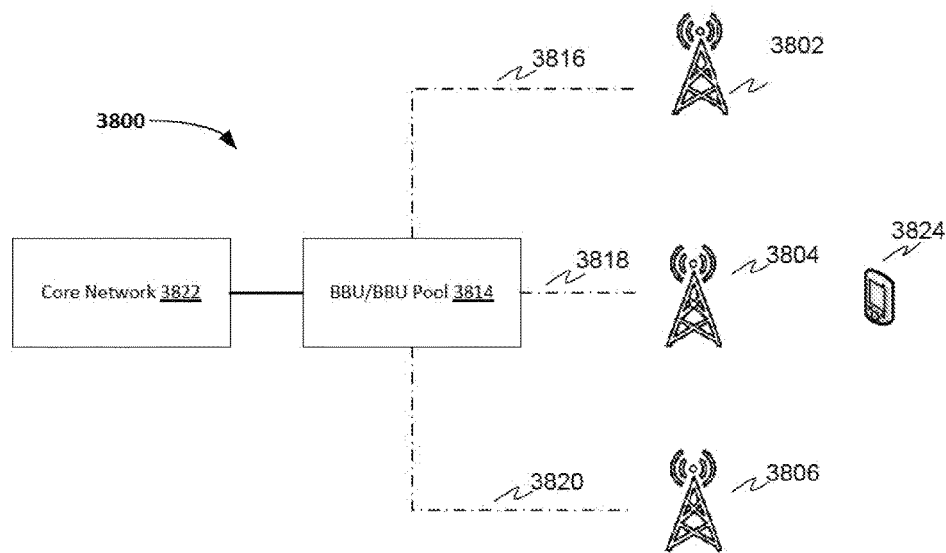
FIG. 38 shows a first example cloud-RAN (C-RAN) architecture according to an embodiment.

FIG. 38 illustrates a typical C-RAN architecture 3800. RRHs 3802, 3804, and 3806 can send and receive wireless signals from devices with wireless capabilities, such as user equipments (UEs). The RRHs 3802, 3804, and 3806 can be in communication with a BBU/BBU pool 3814 via front-haul links 3816, 3818, and 3820, respectively. Front-haul is the connection between a new network architecture of centralized baseband controllers and remote standalone radio heads at cell sites. A common public radio interface (CPRI) may be the type of interface used for connecting the RRHs 3802, 3804, and 3806 to the BBU/BBU pool 3814 via the front-haul links 3816, 3818, and 3820. The BBU/BBU pool 3814 can be in communication with a core network 3822. In one example, a communication from the core network 3822 to a wireless device 3824 that is in a coverage area device of the RRH 3802 (or the RRH 3804 or the RRH 3806) can be sent from the core network 3822 to the BBU/BBU pool 3814. The BBU/BBU pool 3814 can then send the communication to the RRH 3802 (or the RRH 3804 or the RRH 3806) via the front-haul link 3816 (or the front-haul link 3818 or the front-haul link 3820, respectively). The communication can then be sent via a radio signal from the RRH 3802 (or the RRH 3804 or the RRH 3806) to the wireless device 3824. This is typically referred to as a downlink communication.

In another example, a communication from the wireless device 3824 to the core network, referred to as an uplink communication, can be transmitted from the wireless device 3824 and received at the RRH 3802 (or the RRH 3804 or the RRH 3806) via a radio signal. The RRH 3802 (or the RRH 3804 or the RRH 3806) can send the communication to the BBU/BBU pool 3814 via the front-haul link 3816 (or the front-haul link 3818 or the front-haul link 3820, respectively). The BBU/BBU pool 3814 can then send the communication to the core network 3822 where the communication can be directed to its intended destination.

Figure 39:
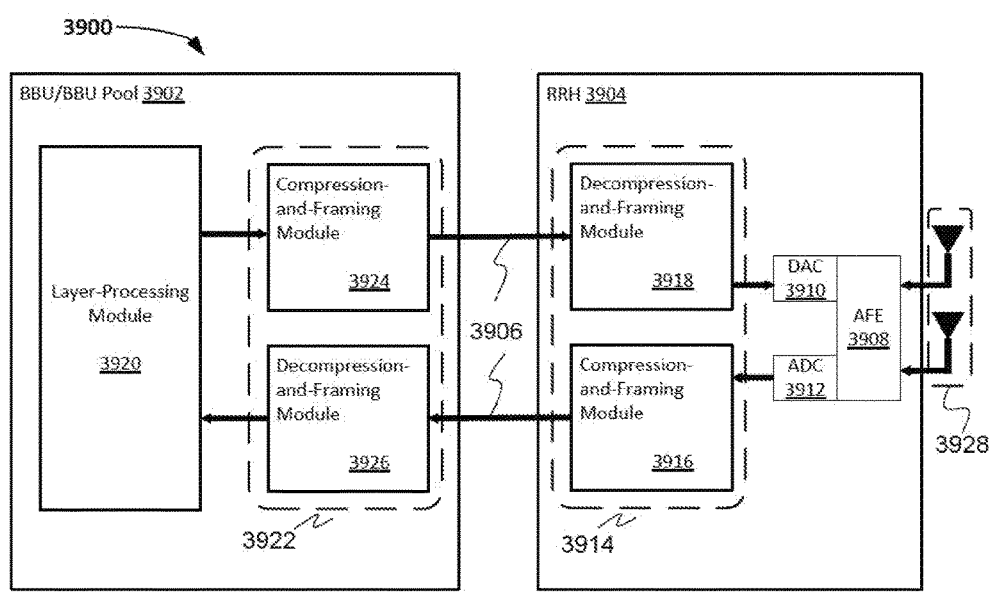
FIG. 39 shows a second example C-RAN architecture in according to an embodiment.

FIG. 39 illustrates an example of a CPRI-based C-RAN architecture 3900 in which a BBU/BBU pool 3902 is connected to an RRH 3904 by a front-haul link 3906. The RRH 3904 can comprise an Analog Front End (AFE) 3908, a Digital-to-Analog Converter (DAC) 3910, and an Analog-to-Digital Converter (ADC) 3912. The AFE 3908 may be operably connected to a plurality of antennas 3928. In addition, as shown in selection 3914, the RRH 3904 can comprise at least two modules for CPRI processing: a compression-and-framing module 3916 and a decompression-and-framing module 3918. The BBU/BBU pool 3902 can comprise a Layer-processing module 3920 that handles processing for a Packet-Data-Convergence-Protocol (PDCP) Layer, a Radio-Link-Control (RLC) Layer, a Media Access Control (MAC) Layer, and a Physical (PHY) Layer. As shown in selection 3922, the BBU/BBU pool 3902 can also comprise at least two modules for CPRI processing: a compression-and-framing module 3924 and a decompression-and-framing module 3926.

In one example, in a downlink communication, a signal can be sent from the layer-processing module 3920 of the BBU/BBU pool 3902 to the compression-and-framing module 3924 of the BBU/BBU pool 3902. The compression-and-framing module 3924 can perform time-domain compression and framing operations on the signal and send the signal to the decompression-and-framing module 3918 of the RRH 3904 via the front-haul link 3906 using CPRI protocol. The decompression-and-framing module 3918 can perform decompression and framing operations on the signal and send the signal to the DAC 3910. The DAC can convert the signal to an analog signal and send the analog signal to the AFE 3908. The AFE can communicate the analog signal to the plurality of antennas 3928. The plurality of antennas 3928 can wirelessly send the analog signal to a destination device (e.g., a UE).

In another example, in an uplink communication, the plurality of antennas 3928 can receive a radio signal and communicate the signal to the AFE 3908. The AFE 3908 can communicate the signal to the ADC 3912. The ADC 3912 can digitize the signal using phase (I) and quadrature (Q) sampling and send the digitized signal to the compression-and-framing module 3916. The compression-and-framing module 3916 can perform time-domain compression and framing operations on the signal and transfer the signal to the decompression-and-framing module 3926 of the BBU/BBU pool 3902 via the front-haul link 3906 using CPRI protocol. The decompression-and-framing module 3926 can perform decompression and framing operations on the signal and send the signal to the layer-processing module 3920. The layer-processing module 3920 can perform higher-layer base-band processing on the signal.

While the C-RAN paradigm alleviates many of the problems associated with the traditional RAN paradigm, the existing C-RAN architecture also introduces some new challenges. In particular, since existing C-RAN paradigms call for a CPRI interface to be used for connecting an RRH to a BBU/BBU pool, transfer-rate requirements for front-haul links used in a C-RAN architecture can be problematic because the expected transfer rate over the front-haul interface (i.e., the front-haul rate) can be significantly higher than the rate of data transfer over the radio interface.

For example, consider a long-term evolution (LTE) uplink (UL) system with a 10-megahertz (MHz) bandwidth, two receiving antennas at an RRH, and a sampling frequency of 15.36 MHz. If a 15-bit representation of I/Q phase digital samples is used, the I/Q data rate is 921.6 megabits per second (Mbps). If the CPRI basic frame overhead of one header byte for every 15 bytes of data and the line coding rate of 10/8 are considered, the physical line rate becomes 1.2288 gigabits per second (Gbps). In addition, the overall CPRI physical line rate increases linearly with the number of antennas and system bandwidth can quickly exceed 10 Gbps when carrier aggregation is used. These factors can therefore lead to front-haul rate requirements that are prohibitively high for practical deployments.

Other problems also affect existing C-RAN architectures. For instance, the sampling rate of CPRI is the same as the sampling rate of LTE and is independent of the user load or user activity within a cell; as a result, there is no statistical averaging gain. In addition, most of the CPRI data-rate requirement is driven by I/Q user-plane data samples. An LTE signal is inherently redundant due to the use of guard bands. In a 10 MHz LTE system, for example, only 3900 of 1024 available sub-carriers are used for data; the other sub-carriers are zeroed out to serve as guard bands. However, although the time-domain I/Q samples have a redundant signal structure, a complex non-linear scheme is required to exploit this redundancy in order to achieve a higher compression factor. In addition, front-haul compression schemes that operate on the time-domain I/Q samples cannot exploit signal-to-quantization-noise ratios (SQNRs) for different modulation and coding schemes or user-scheduling side information (e.g., user activity, sub-carrier occupancy) because this information is generally lost once a signal is split in the time domain. For at least these reasons, compression performance is relatively poor in the existing C-RAN architecture.

Systems and methods in accordance with the present disclosure present an alternative flexible C-RAN architecture framework that can operate in a radio access network where network slicing is implemented.

Radio access network (RAN) re-architecture has been under discussion for cloud-RAN (CRAN) and third generation partnership project (3GPP) fourth generation (4G) long term evolution (LTE). The main motivation for RAN re-architecture is to reduce the front-haul rate requirements while maintaining the benefits according to the CRAN technology premise. Various RAN re-architecture options have been proposed, including a simple split physical Layer (PHY) option (only the fast Fourier transform (FFT) function is moved to the front end), an advanced split PHY option where multiple input and multiple output (MIMO) processing is moved to front end (appropriate for massive MIMO applications where the number of antenna elements is much larger than a number of data streams), and a remote PHY option (wherein the whole PHY functionality is moved to the front end). Other proposals include compression techniques based on the PHY split option to further reduce the front-haul rate.

The aforementioned proposals are symmetric options, wherein a same functional split is applied to both downlink (DL) and uplink (UL). An asymmetric option, based on coordinated multipoint (CoMP) observations that joint reception in the UL brings more benefit than joint transmission in the DL. The asymmetric re-architecture enables joint reception in the UL, but only techniques such as coordinated scheduling/coordinated beamforming (CS/CB) in the DL provides suitable joint reception in the DL.

In the fifth generation (5G) LTE era, new requirements are imposed on the RAN re-architecture work. New network slicing techniques applied to the basic new 5G radio access technology (RAT), or a number of different RATs, may be used to support diverse applications and very different requirements. These may be the above mentioned vertical markets that drive the (vertical) network slicing concept. For example, enhanced mobile broadband (eMBB) may provide high bandwidth and a high date rate, which may benefit from advanced MIMO transmission such as beam aggregation and cell-less operation. On the other hand, mission critical Internet of Things (IoT) applications may benefit from extremely low delay, which may be provided by a low latency frame structure. An example of a low latency frame structure is a self-contained subframe structure, which may enable near immediate acknowledgement/negative acknowledgement (ACK/NACK) feedback, fast hybrid automatic repeat request (HARQ) retransmission, and natural extension to unlicensed or shared band transmission. However, the abovementioned different applications and different technologies pose conflicting requirements of (and options for) the RAN re-architecture using C-RANs.

Mission critical services are being developed for use on LTE and future wireless networks, for example the third generation partnership project (3GPP) has a standards group (SA6—Mission-critical applications) set up to develop these types of services. An example of a mission-critical service may include a mission critical push to talk (MCPTT) service, meanwhile an example of a mission-critical IoT service may be vehicle to vehicle (V2V) communications, or vehicle to infrastructure (V2I) communications that may, for example allow, or enable self-driving cars, automated emergency response services, and the like. By their very nature, mission-critical services are ones that may benefit from preferential handling compared to normal telecommunication services e.g. in support of police or fire brigade including the handling of prioritized messages and/or calls (e.g. MCPTT calls) for emergency and imminent threats, delivery of real-time telemetry or control messages that may enable automated control, especially of fast moving vehicles and the like. The example MCPTT service may be used for public safety applications and also for general commercial applications e.g. utility companies and railways. Other mission critical services may include emergency services, non-interruptible enterprise services, etc. Services that are mission-critical may also be massive (i.e. a very large number of users of that type are being served, or to be served by the wireless network)—e.g. V2V or V2I. A 'very large number' may range from hundreds, to millions or more, and may also be defined by the number per base station or the like. Alternatively, or additionally, a very large number may comprise a high percentage of the available (processing/computational, or wireless) resources at or available to a serving or controlling entity in the wireless network. Non-mission-critical services may also be massive (e.g. smart meters—a form of machine type communications). The terms "mission-critical" and "massive" may be typically user, system designer, and/or standards (e.g. 3GPP) defined, and their definition may change over time. The present disclosure is intended to cover all current and future definitions of these terms as found in the relevant current or new, standards, e.g. 3GPP standards.

Example embodiments provide a flexible RAN re-architecture framework for network slicing/services. Example embodiments may be based on the concept of a software defined RAN (soft-RAN), where each RAN function can be virtualized. For example, in a Soft-RAN architecture, every network service in use or useable by the wireless network may be specified as a software application running on a more generic hardware platform (e.g., FIG. 12, FIG. 15, etc.). The generic hardware platform may be provided using commodity hardware, such as data servers, network switches, generic radio frequency (RF) circuitry and the like. Therefore, in a soft-RAN, wireless network operators/owners are able to simply specify a suitable data plane and control plane processing regime for any (new) service that they desire to deploy one the wireless network. This may even be done using high level languages. This approach reduces time to market and deployment costs, for example by reducing hardware replacement and/or set up costs. This reduction in time and cost in turn increases the ability of the soft RAN based wireless network disclosed herein to implement the evolutional and revolution new technologies being and to be developed. This so called agile development processes may be used to maximize return on investment to the network operators.

A Soft-RAN operating system (OS) may be deployed to manage all of the complexity behind implementing and deploying the network service(s) across the generic/commodity hardware. The generic/commodity hardware may be located in the central office and/or at remote cell sites, depending on a deployment profile in use on any given wireless network implementing the disclosed soft-RAN provided network slice aware C-RAN.

In scenarios where some of the RAN functions cannot be virtualized, dedicated hardware accelerator(s) may be used as well or instead.

Example embodiments provide a flexible RAN re-architecture framework for network slicing/services. The framework of the example embodiments may use base station (for example an evolved nodeB (eNB)) scheduling information and may perform RAN re-architecture dynamically based on different network slices/services that are to be supported by the (re-architected/re-architectable) RAN.

The above discussed previous RAN re-architecture using C-RANs was ignorant of network slicing, and was work mainly just considering the front-haul data rate and delay tradeoff. Whereas, the flexible RAN re-architecture of the example embodiments supports different 5G services (i.e. use-cases/vertical markets, e.g. vertical network slices) and technologies or architectures (e.g. computational slicing, e.g. horizontal network slices), on top of the front-haul bandwidth (BW) and delay, the network profile of any particular service/slice in use, quality of service (QoS), computational considerations and/or capabilities at each node, and the like.

Example embodiments provide a 5G air interface that supports flexible multiplexing of different network services by enabling flexible choice of waveform (e.g. orthogonal frequency division multiplexing (OFDM)/code division multiple access (CDMA)/etc.) and numerology. For example, massive internet of things (IoT) may use a narrower subcarrier spacing, or even code division multiple access (CDMA) waveform over a certain time/frequency grid, while mobile broadband services may use an orthogonal frequency division multiplexing (OFDM) waveform with larger subcarrier spacing. This is to say, the provision of wireless communications services to a first set (e.g. massive number, with particular latency requirements) of devices with one type of communications parameters can have very different needs to a second set (e.g. not so massive, but more data hungry) of devices with a second type of communication parameters, and this can be difficult to reconcile in a single homogenous network. Accordingly, the present disclosure provides for network slicing, e.g. in the C-RAN, thereby providing means to provide the different sets of devise with different communications parameters/performances. For example, according to embodiments, when performing scheduling, the base station (e.g. eNB) may be aware of the different resources used for each different network services or slices (e.g. served by each logically separated radio access network) in use on the same single physical radio access network.

Different services may also require different 5G technologies, such as Radio Access Technologies (RATs). For example, mobile broadband services may require high throughput and, thus, massive MIMO/beam aggregation technologies are expected to be very useful to meet the high throughput requirements. However, for mission critical services, the peak throughput may not be necessarily high, but the delay requirement may be very stringent. Also, in some implementations, the (or one of the) 5G RAT(s) in use may be designed for wide area network (WAN) communications, whereas in others, the (or one of the) 5G RAT(s) in use may be designed for personal area network (PAN) communications. These latter RATs may be replacements (or alternatives) to Bluetooth, Zigbee or the like communications standards.

Therefore, the flexible RAN re-architecture of the example embodiments may support different 5G services and technologies. Also, the front-haul bandwidth (BW), which is considered the primary decision point for the 4G RAN re-architecture work, may be used to drive key decisions on the preferred RAN architecture options that include the concept of network slicing.

Figure 40:
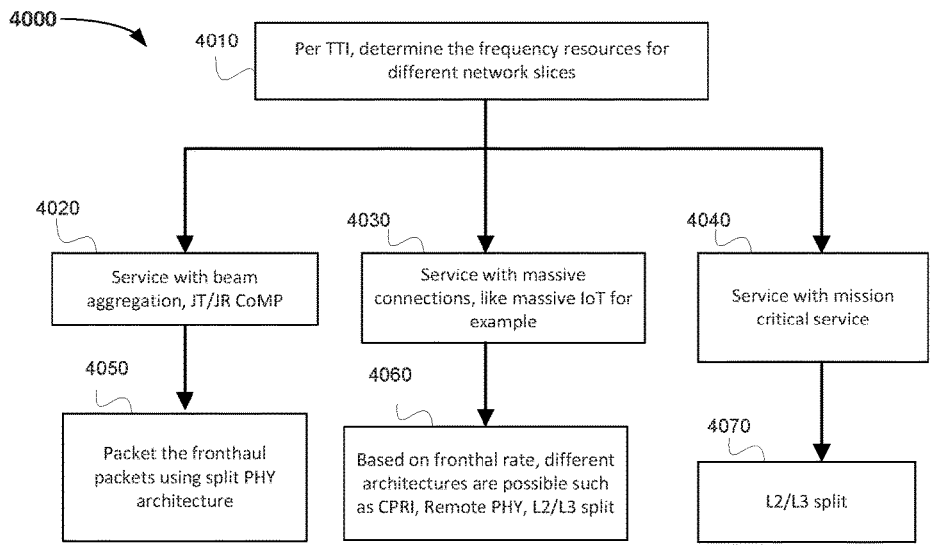
FIG. 40 shows a first example procedure for flexible RAN re-architecture according to an embodiment.

FIG. 40 shows the overall procedure 4000 for flexible RAN re-architecture according to a first example. The procedure may operate on a per transmission time interval (TTI) time period based frequency of operation (also regarded as granularity of operation), e.g. every 1 ms. However the disclosure is not limited to any specific frequency/rate of operation. Within each time period, the frequency resources for the different operational (or about to be operated—e.g. when a slice is about to be turned-on) network slices are determined 4010. The frequency resources may be time slots or Frequencies (see FIG. 3), or numerologies in use or the like. The disclosed procedure can then determine which form or type of operation may be used in the RAN/C-RAN, i.e. the type of RAN architecture used. As used herein, a RAN architecture may be thought of as any form of specific techniques, technology(ies), implementation detail, improvement in or type of operation of the same, of a wireless network, particularly in the RAN. Architectures are typically introduced, maintained and updated in the standards documents for the respective wireless network technologies in use.

A first example option may be to service wireless device(s) being served by the network slices/RAN using joint transmission (JT) CoMP and/or joint reception (JR) CoMP, potentially with beam aggregation 4020. This may be used, for example, when a high throughput mobile broadband (MBB) service is provided in dense environment. Meanwhile, Beam aggregation and JT/JR may be particularly useful in mmWave band for high throughput and robust link. In some examples, the packet front-haul may provide front-haul packetization that uses a split physical Layer (PHY) arrangement 4050, where, for example, the split-PHY processing (SPP) architecture is an arrangement of a C-RAN that splits the base stations (BS) functions between wireless channel coding/decoding and wireless modulation/demodulation, and where CoMP joint transmission and reception schemes are able to be provided.

A second example option may be to service wireless device(s) being served by the network slices/RAN using massive (i.e. a lot of) number of connections, for example as may be used in IoT deployments. This may be used, for example, when the devices are used on a large scale for data gathering/report—e.g. smart power girds/power meters, and other (massive scale) machine to machine type communications.

In this case, different front-haul architectures may be provided 4060 dependent on, for example, the front-haul data rate suitable for (or required by) the respective particular form of massive/IoT deployment in use. Other determining factors may influence the choice of front-haul architectures, such as latency, or the like. Examples of the different front-haul architectures that may be deployed may include any of: common public radio interface (CPRI), or CPRI-like/advanced type architectures (e.g. CPRI compression and CPRI over Ethernet), Remote PHY, or Layer 2 (L2)/Layer 3 (L3) split type architectures, and/or, for example, a split physical Layer (PHY)/media access control Layer (MAC) in the remote radio head (RRH).

A third example option may be to service wireless device(s) being served by the network slices/RAN using mission critical type service standards 4040 (which may also include a massive number of connections, e.g. for V2X), for example where the devices are used in time critical (e.g. V2X), or delivery critical (e.g. emergency services) use-cases, or the like.

In this case, other, different front-haul architectures may be provided 4070 dependent on, for example, on the specific needs of the mission critical type service type. For example, a Layer 2 (L2)/Layer 3 (L3) split type architecture 4070 may be used (e.g., as above to include PHY/MAC split in RRH).

Interface and packet formats between baseband unit (BBU) and remote radio head (RRH) can be either proprietary, or standardized in 3GPP.

Figure 41:
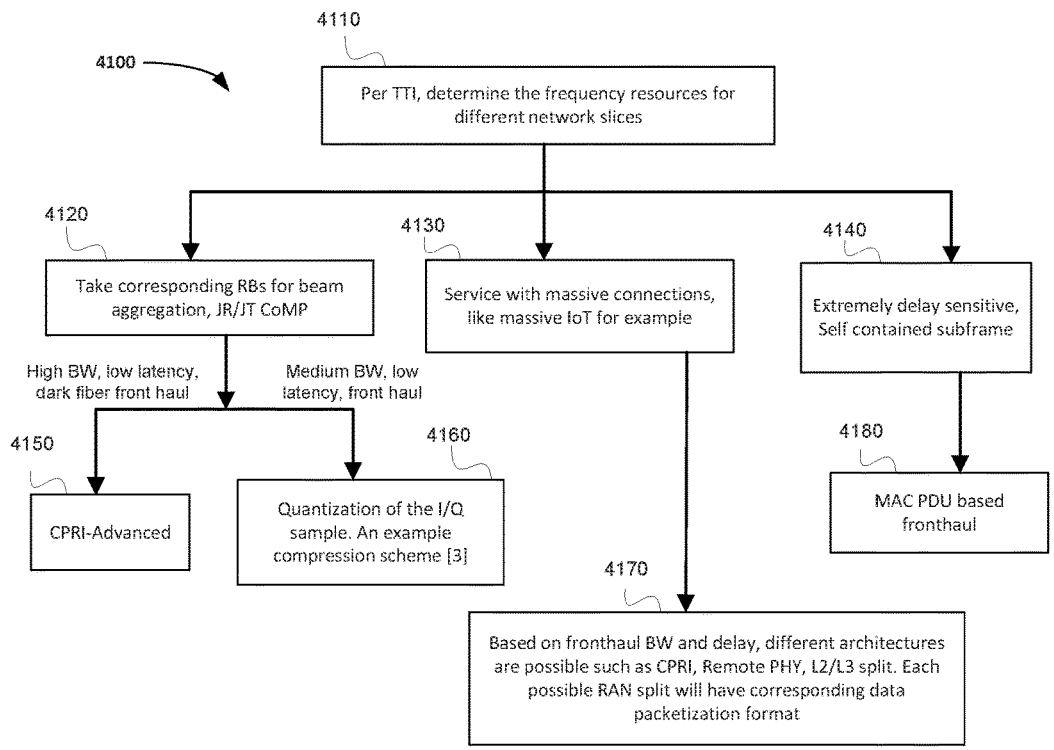
FIG. 41 shows a second example procedure for flexible RAN re-architecture according to an embodiment.

FIG. 41 shows a second, more detailed/specific, example overall procedure 4100 for flexible RAN re-architecture, in particular an example packetization arrangement. This example is also shown based on determining frequency resources for the network slices based on a per-TTI time period granularity, and has an example three options, as per FIG. 40.

A first example option 4120 is to take corresponding resource blocks (RBs) for beam aggregation, and/or JT/JR CoMP, in which case, the procedure either uses CPRI-Advanced techniques 4150 for any cases of (or needing) high bandwidth, low latency, or the availability of dark fiber front-haul (e.g., if there is some spare capacity of fiber (i.e. currently dark, not lit) to the RRHs. This may be relevant where additional bandwidth is useful, but JT/JR is not supported, at least before this point in time), or the procedure uses quantization of the I/Q sample, for example dependent on compression scheme in use on the RAT, for example, to provide any of: a certain amount of bandwidth (e.g. low, medium, high), low latency front-haul, or the like. Other methods such as fixed uniform quantization, non-linear quantization etc. are also possible. A particular standard in use would typically specify such quantization scheme, for example, to allow multi-vendor implementations.

A second example option 4130 may be the servicing of massive (i.e. a lot of) devices, using a massive number of connections, for example as may be used in IoT deployments. In this case, like above, different front-haul architectures may be provided 4170, but this time dependent on, for example, front-haul bandwidth and delay parameters. Other determining factors may influence the choice of front-haul architectures, such as latency, or the like. Examples of the different front-haul architectures that may be deployed may include any of: common public radio interface (CPRI), or CPRI-like/advanced type architectures (e.g. CPRI compression and CPRI over Ethernet), Remote PHY, or Layer 2 (L2)/Layer 3 (L3) split type architectures (e.g., as above to include PHY/MAC split in RRH). Each possible type of RAN split may have a corresponding data packetization format.

A third example option 4140 may be for extremely delay sensitive data based devices, in which case a self-contained sub-frame format may be used. In such an example scenario, a media access control (MAC) Protocol Data Unit (PDU), MAC PDU, based front-haul architecture may be used 4180. In some examples, the procedure may include cell-less operation.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. As used herein, the terms device (being served by a RAN or network slice) and UE may be interchangeable.

Figure 42:
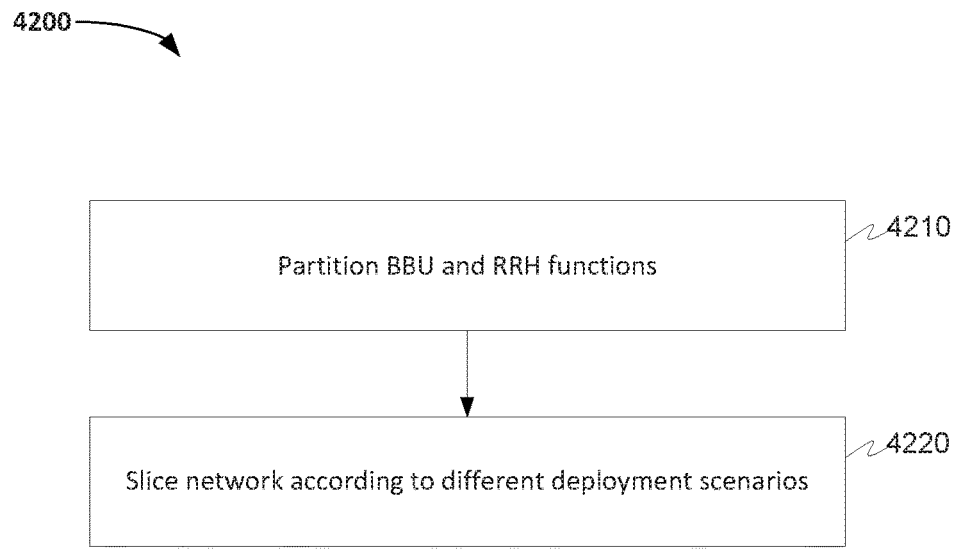
FIG. 42 shows a first example method of RAN re-architecture according to an embodiment.
Figure 43:
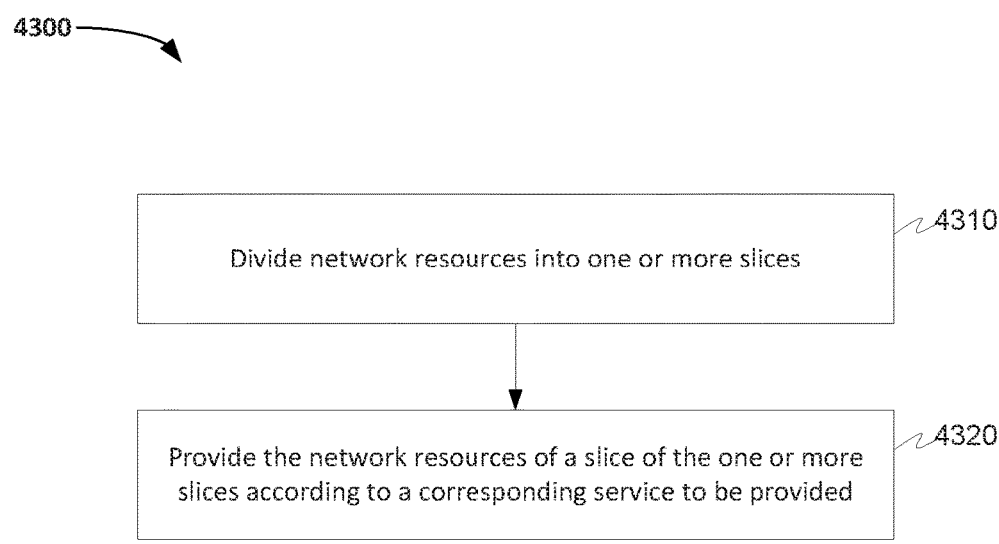
FIG. 43 shows a second example method of RAN re-architecture according to an embodiment.

Embodiments described herein may be implemented into a system using any suitably configured hardware and/or software (e.g., FIG. 12, FIG. 15, etc.). An example method of such a process is depicted in FIG. 42. For example, the process may include partitioning baseband unit (BBU) and remote radio head (RRH) functions 4210 to enable network slicing according to different deployment scenarios 4220. A second example method is shown in FIG. 43. For example, the process may include dividing network resources 4310 into one or more slices. Each of the one or more slices may correspond to a service to be provided by a radio access network (RAN). The process may include providing 4320 the network resources of a slice of the one or more slices according to a corresponding service to be provided. Both these example methods dynamically (re) configure the RAN architecture in use on the RAN or C-RAN according to the needs of the RAN and/or network slices operating the RAN at any given point in time.

FIG. 12 is a block diagram illustrating components, according to some example embodiments, able to read instructions from a machine-readable or computer-readable medium (e.g., a machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which are communicatively coupled via a bus 1240.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214. The memory/storage devices 1220 may include main memory, disk storage, or any suitable combination thereof.

The communication resources 1230 may include interconnection and/or network interface components or other suitable devices to communicate with one or more peripheral devices 1204 and/or one or more databases 1206 via a network 1208. For example, the communication resources 1230 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 and/or the databases 1206. Accordingly, the memory of processors 1210, the memory/storage devices 1220, the peripheral devices 1204, and the databases 1206 are examples of computer-readable and machine-readable media.

The following examples relate to all examples discussed herein, including all figures filed herewith.

Example 1 may include a system supporting mobile broadband (MBB) access and dedicated access for vertical markets or underlay networks.

Example 2 may include a user equipment (UE) configured to have both MBB access and dedicated accesses. Example 2 may be incorporated into example 1 and/or any other example disclosed herein.

Example 3 may include a method for slicing the network with each piece of the slice configured to support one dedicated access. Example 3 may be incorporated into any of examples 1-2 and/or any other example disclosed herein.

Example 4 may include a method of network slicing that contains core network slicing and air interface slicing. Example 4 may be incorporated into any of examples 1-3 and/or any other example disclosed herein.

Example 5 may include a method for mapping physical radio resource to logical radio resources. Example 5 may be incorporated into any of examples 1-4 and/or any other example disclosed herein.

Example 6 may include a media access control (MAC) operation based on one or more logical radio resources. Example 6 may be incorporated into any of examples 1-5 and/or any other example disclosed herein.

Example 7 may include a method of performing two level MAC, wherein Level-1 MAC supports radio resource scheduling across network slices and Level-2 MAC supports radio resource scheduling within the network slice. Example 7 may be incorporated into any of examples 1-6 and/or any other example disclosed herein.

Example 8 may include a dedicated Level-2 MAC entity for each of the network slice. Example 8 may be incorporated into any of examples 1-7 and/or any other example disclosed herein.

Example 9 may include a logical transmission time interval (TTI) unit defined based on the logical radio resource. Example 9 may be incorporated into any of examples 1-8 and/or any other example disclosed herein.

Example 10 may include a hybrid automatic repeat request (HARM) operation on the logical subframes defined by the logical TTI. Example 10 may be incorporated into any of examples 1-9 and/or any other example disclosed herein.

Example 11 may include a network slice is identified by the variable sNetID. Example 11 may be incorporated into any of examples 1-10 and/or any other example disclosed herein.

Example 12 may include the sNetID of a network slice that is known to the devices accessing the network slice. Example 12 may be incorporated into any of examples 1-11 and/or any other example disclosed herein.

Example 13 may include the sNetIDs of active network slices of a cell being broadcasted in system broadcasting information or a system information block (SIB). Example 13 may be incorporated into any of examples 1-12 and/or any other example disclosed herein.

Example 14 may include a random access (RA) procedure to access a network slice, wherein the RA procedure may use a common RA resource used for all devices in the operator network and/or a dedicated RA resource dedicated to the network slice. Example 14 may be incorporated into any of examples 1-13 and/or any other example disclosed herein.

Example 15 may include a method performed by a user equipment (UE) to derive the dedicated RA resource location from system broadcasting or a SIB. Example 15 may be incorporated into any of examples 1-14 and/or any other example disclosed herein.

Example 16 may include a RA sequence that carries the sNetID, which can be used for slice-specific contention resolution. Example 16 may be incorporated into any of examples 1-15 and/or any other example disclosed herein.

Example 17 may include a method for performing a slice-specific contention resolution and a UE configured to perform the slice-specific contention resolution. Example 17 may be incorporated into any of examples 1-16 and/or any other example disclosed herein.

Example 18 may include a method to turn a network slice into a dormant state or an idle state when no traffic is determined to be present within the network slice for a desired (e.g. specified) period of time. Example 18 may be incorporated into any of examples 1-17 and/or any other example disclosed herein.

Example 19 may include the method of example 18 and/or any other example disclosed herein, wherein when turned into dormant state, a radio resource assigned to the network slice is to be released.

Example 20 may include the method of example 18-19 and/or any other example disclosed herein, wherein activation of a dormant network slice is to be triggered by downlink traffic arrival or performance of an uplink random access procedure.

Example 21 may include a system comprising a common physical downlink control channel (cPDCCH) and a dedicated physical downlink control channel (dPDCCH), wherein the cPDCCH is to be used for signaling across network slices; and the dPDCCH is to be used for signaling in each of the network slices. Example 21 may be incorporated into any of examples 1-20 and/or any other example disclosed herein.

Example 22 may include a system comprising a common physical uplink control channel (cPUCCH) and a dedicated physical uplink control channel (dPUCCH), wherein, the cPUCCH is to be used by all the devices accessing the mobile operator network; the dPUCCH is to be dedicated to devices accessing a network slice, wherein a device with both MBB access and network slice access is to aggregate uplink control information associated with the MBB access and the network slice access to at least one control unit and transmit the at least one control unit in the cPUCCH. Example 22 may be incorporated into any of examples 1-21 and/or any other example disclosed herein.

Example 23 may include an apparatus to be implemented in an evolved node B (eNB), the apparatus comprising one or more computer-readable storage media having instructions; and one or more processors coupled with the one or more computer-readable storage media to execute the instructions to: slice a physical radio resource into a plurality of network slices; and map each of the plurality of network slices to a contiguous logical radio resource.

Example 24 may include the apparatus of example 23 and/or any other example disclosed herein, wherein a Level-1 media access control (MAC) is to slice the physical radio resource into the plurality of network slices and a Level-2 MAC is to map the plurality of network slices to the contiguous logical radio resource wherein the Level-2 MAC is to schedule the physical radio resources within the network slice.

Example 25 may include the apparatus of example 23 and/or any other example disclosed herein, wherein the plurality of network slices are to be mapped to the contiguous logical radio resource according to a predefined logical transmission time interval (TTI) unit.

Example 26 may include the apparatus of example 23 and/or any other example disclosed herein, wherein the one or more processors are to execute the instructions to assign a network slice identifier (sNetID) to a corresponding network slice of the plurality of network slices; and broadcast each sNetID to each device being served by the eNB.

Example 27 may include the apparatus of example 23 and/or any other example disclosed herein, wherein each of the plurality of network slices are assigned to dedicated physical random access channel (PRACH) such that a user equipment (UE) is to access at least one of the plurality of network slices by performing a random access procedure over the dedicated PRACH.

Example 28 may include the apparatus of example 27 and/or any other example disclosed herein, wherein each of the plurality of network slices are to be in an active state in order to utilize the dedicated PRACH, and wherein when a network slice of the plurality of network slices is in a dormant state or an idle state, the UE is to perform a random access procedure over a common PRACH, and the one or more processors are to execute the instructions to trigger the network slice to enter the active state in response to reception of a message indicative that the UE performed the random access procedure over the common PRACH, wherein the message is to include an sNetID of the network slice to be triggered.

Example 29 may include the apparatus of example 27 and/or any other example disclosed herein, wherein the one or more processors are to execute the instructions to broadcast a location of the dedicated PRACH within a subframe to each device being served by the eNB in system broadcasting information message and/or in a system information block (SIB).

Example 30 may include the apparatus of example 23 and/or any other example disclosed herein, wherein the one or more processors are to execute the instructions to determine whether traffic is present within each of the plurality of network slices for a desired (e.g. specified) period of time; transition each network slice of the plurality of network slices to a dormant state when no traffic is determined to be present for the desired period of time; and release resources allocated to network slices that are in the dormant state.

Example 31 may include the apparatus of example 23 and/or any other example disclosed herein, wherein the one or more processors are to execute the instructions to transition at least one network slice of the plurality of network slices from a dormant state to an active state when downlink traffic occurs in the at least one network slice, wherein the at least one network slice is to be triggered by a network element.

Example 32 may include the apparatus of example 23 and/or any other example disclosed herein, wherein the one or more processors are to execute the instructions to transition at least one network slice of the plurality of network slices from a dormant state to an active state when uplink traffic occurs in the at least one network slice, wherein the at least one network slice is to be triggered by a UE during a random access procedure.

Example 33 may include the apparatus of example 23 and/or any other example disclosed herein, wherein the one or more processors are to execute the instructions to provide common physical downlink control channel (cPDCCH) information and dedicated physical downlink control channel (dPDCCH) information.

Example 34 may include the apparatus of example 33 and/or any other example disclosed herein, wherein the cPDCCH information is to be used by a UE to locate fixed symbols of each subframe, wherein the cPDCCH is to carry resource allocation information for UEs accessing a mobile broadband (MBB) network and resource allocation information for the network slices, wherein each UE is to use an sNetID to detect the cPDCCH information addressed to a corresponding UE, Example 35 may include the apparatus of example 33 and/or any other example disclosed herein, wherein the dPDCCH information associated with one of the plurality of network slices is located in the radio resources assigned to one of the plurality of network slices, wherein the dPDCCH information is to be assigned to two or more continuous resource blocks of the one of the plurality of network slices or is to be distributed in the resource blocks associated with the one of the plurality of network slices, and wherein the dPDCCH is to carry scheduling information for a UE operating under the one of the plurality of network slices.

Example 36 may include the apparatus of example 23 and/or any other example disclosed herein, wherein the one or more processors are to execute the instructions to receive a common physical uplink control channel (cPUCCH) transmission and a dedicated physical uplink control channel (dPUCCH) transmission within one radio subframe, wherein the cPUCCH is to be used by one or more UEs that desire to access a mobile broadband (MBB) network, wherein the dPUCCH is to be used by one or more UEs that desire to access at least one network slice of the plurality of network slices.

Example 37 may include the apparatus of example 36 and/or any other example disclosed herein, wherein a UE configured to access both the MBB and the network slice is to aggregate associated uplink control information for accessing the MBB and accessing the network slice to a single control unit and the UE is to transmit the control unit in the cPUCCH.

Example 38 may include the apparatus of example 23 and/or any other example disclosed herein, wherein the one or more processors are to execute the instructions to determine a minimum amount of transmission latency for a traffic type of a data stream, and allocate the data stream in a number of continuous physical subframes to achieve the minimum amount of transmission latency.

Example 39 may include the apparatus of example 23 and/or any other example disclosed herein, wherein a hybrid automatic repeat request (HARM) operation is performed on logical subframes defined by the logical TTI.

Example 40 may include may include an apparatus to be implemented in a user equipment (UE), the apparatus comprising one or more computer-readable storage media having instructions; and one or more processors coupled with the one or more computer-readable storage media to execute the instructions to: determine, based on a communication from an evolved Node B (eNB), a common physical downlink control channel (cPDCCH) information that indicates one or more radio resources to locate one or more fixed symbols of each subframe of a plurality of subframes; and determine, based on the communication from the eNB or another communication from the eNB, a dedicated physical downlink control channel (dPDCCH) information that is to indicate scheduling information for transmitting data using a network slice of a plurality of network slices.

Example 41 may include the apparatus of example 40 and/or any other example disclosed herein, wherein the cPDCCH is to carry resource allocation information for UEs accessing a mobile broadband (MBB) network and resource allocation information for accessing one of a plurality of network slices, and wherein the UE is to use an sNetID to detect the cPDCCH information addressed the UE.

Example 42 may include the apparatus of example 40 and/or any other example disclosed herein, wherein the dPDCCH information associated with the network slice is located in the radio resources assigned to the network slice, and wherein the dPDCCH information is to be assigned to two or more continuous resource blocks of the network slice or is to be distributed in the resource blocks associated with the network slice.

Example 43 may include the apparatus of example 40 and/or any other example disclosed herein, wherein the one or more processors are to execute the instructions to transmit a common physical uplink control channel (cPUCCH) transmission and a dedicated physical uplink control channel (dPUCCH) transmission within one radio subframe, wherein the cPUCCH is to be used by the UE to access a mobile broadband (MBB) network and the dPUCCH is to be used by the UE to access the network slice.

Example 44 may include the apparatus of example 43 and/or any other example disclosed herein, wherein when the UE is configured to access both the MBB and the network slice, the one or more processors are to execute the instructions to aggregate uplink control information for accessing the MBB and uplink control information for accessing the network slice to a single control unit; and transmit the control unit in the cPUCCH.

Example 45 may include a method to be performed by an evolved node B (eNB), the method comprising: slicing a physical radio resource into a plurality of network slices; and mapping each of the plurality of network slices to a contiguous logical radio resource.

Example 46 may include the method of example 45 and/or any other example disclosed herein, wherein a Level-1 media access control (MAC) is to slice the physical radio resource into the plurality of network slices and a Level-2 MAC is to map the plurality of network slices to the contiguous logical radio resource wherein the Level-2 MAC is to schedule the physical radio resources within the network slice.

Example 47 may include the method of example 45 and/or any other example disclosed herein, wherein the plurality of network slices are to be mapped to the contiguous logical radio resource according to a predefined logical transmission time interval (TTI) unit.

Example 48 may include the method of example 45 and/or any other example disclosed herein, further comprising: assigning a network slice identifier (sNetID) to a corresponding network slice of the plurality of network slices; and broadcasting each sNetID to each device being served by the eNB.

Example 49 may include the method of example 45 and/or any other example disclosed herein, wherein each of the plurality of network slices are assigned to dedicated physical random access channel (PRACH) such that a user equipment (UE) is to access at least one of the plurality of network slices by performing a random access procedure over the dedicated PRACH.

Example 50 may include the method of example 49 and/or any other example disclosed herein, wherein each of the plurality of network slices are to be in an active state in order to utilize the dedicated PRACH, and wherein when a network slice of the plurality of network slices is in a dormant state or an idle state, the UE is to perform a random access procedure over a common PRACH.

Example 51 may include the method of example 50 and/or any other example disclosed herein, further comprising triggering the network slice to enter the active state in response to reception of a message indicative that the UE performed the random access procedure over the common PRACH, wherein the message is to include an sNetID of the network slice to be triggered.

Example 52 may include the method of example 49 and/or any other example disclosed herein, further comprising: broadcasting a location of the dedicated PRACH within a subframe to each device being served by the eNB in system broadcasting information message and/or in a system information block (SIB).

Example 53 may include the method of example 45 and/or any other example disclosed herein, further comprising: determining whether traffic is present within each of the plurality of network slices for a desired period of time; transitioning each network slice of the plurality of network slices to a dormant state when no traffic is determined to be present for the desired period of time; and releasing resources allocated to network slices that are in the dormant state.

Example 54 may include the method of example 45 and/or any other example disclosed herein, further comprising: transitioning at least one network slice of the plurality of network slices from a dormant state to an active state when downlink traffic occurs in the at least one network slice, wherein the at least one network slice is to be triggered by a network element.

Example 55 may include the method of example 45 and/or any other example disclosed herein, further comprising: transitioning at least one network slice of the plurality of network slices from a dormant state to an active state when uplink traffic occurs in the at least one network slice, wherein the at least one network slice is to be triggered by a UE during a random access procedure.

Example 56 may include the method of example 45 and/or any other example disclosed herein, further comprising: providing common physical downlink control channel (cPDCCH) information and dedicated physical downlink control channel (dPDCCH) information.

Example 57 may include the method of example 56 and/or any other example disclosed herein, wherein the cPDCCH information is to be used by a UE to locate fixed symbols of each subframe, wherein the cPDCCH is to carry resource allocation information for UEs accessing a mobile broadband (MBB) network and resource allocation information for the network slices, wherein each UE is to use an sNetID to detect the cPDCCH information addressed to a corresponding UE, Example 58 may include the method of example 56 and/or any other example disclosed herein, wherein the dPDCCH information associated with one of the plurality of network slices is located in the radio resources assigned to one of the plurality of network slices, wherein the dPDCCH information is to be assigned to two or more continuous resource blocks of the one of the plurality of network slices or is to be distributed in the resource blocks associated with the one of the plurality of network slices, and wherein the dPDCCH is to carry scheduling information for a UE operating under the one of the plurality of network slices.

Example 59 may include the method of example 45 and/or any other example disclosed herein, further comprising: receiving a common physical uplink control channel (cPUCCH) transmission and a dedicated physical uplink control channel (dPUCCH) transmission within one radio subframe, wherein the cPUCCH is to be used by one or more UEs that desire to access a mobile broadband (MBB) network, wherein the dPUCCH is to be used by one or more UEs that desire to access at least one network slice of the plurality of network slices.

Example 60 may include the method of example 59 and/or any other example disclosed herein, wherein a UE configured to access both the MBB and the network slice is to aggregate associated uplink control information for accessing the MBB and accessing the network slice to a single control unit and the UE is to transmit the control unit in the cPUCCH.

Example 61 may include the method of example 45 and/or any other example disclosed herein, further comprising: determining a minimum amount of transmission latency for a traffic type of a data stream, and allocating the data stream to a number of continuous physical subframes to achieve the minimum amount of transmission latency.

Example 62 may include the method of example 45 and/or any other example disclosed herein, further comprising: performing a hybrid automatic repeat request (HARD) operation on logical subframes defined by the logical TTI.

Example 63 may include a method to be performed by a user equipment (UE), the method comprising: determining, based on a communication from an evolved Node B (eNB), a common physical downlink control channel (cPDCCH) information that indicates one or more radio resources to locate one or more fixed symbols of each subframe of a plurality of subframes; and determining, based on the communication from the eNB or another communication from the eNB, dedicated physical downlink control channel (dPDCCH) information that is to indicate scheduling information for transmitting data using a network slice of a plurality of network slices.

Example 64 may include the method of example 63 and/or any other example disclosed herein, wherein the cPDCCH is to carry resource allocation information for UEs accessing a mobile broadband (MBB) network and resource allocation information for accessing one of a plurality of network slices, and wherein the UE is to use an sNetID to detect the cPDCCH information addressed the UE, Example 65 may include the method of example 63 and/or any other example disclosed herein, wherein the dPDCCH information associated with the network slice is located in the radio resources assigned to the network slice, and wherein the dPDCCH information is to be assigned to two or more continuous resource blocks of the network slice or is to be distributed in the resource blocks associated with the network slice.

Example 66 may include the method of example 63 and/or any other example disclosed herein, further comprising: transmitting a common physical uplink control channel (cPUCCH) transmission and a dedicated physical uplink control channel (dPUCCH) transmission within one radio subframe, wherein the cPUCCH is to be used by the UE to access a mobile broadband (MBB) network and the dPUCCH is to be used by the UE to access the network slice.

Example 67 may include the method of example 66 and/or any other example disclosed herein, wherein when the UE is configured to access both the MBB and the network slice, the method further comprises: aggregating uplink control information for accessing the MBB and uplink control information for accessing the network slice to a single control unit; and transmitting the control unit in the cPUCCH.

Example 68 may include an apparatus operable in a wireless communication network, the apparatus comprising radio frequency (RF) circuitry to receive or transmit at least one communication to another device in the wireless communication network, and circuitry to provide a first, Level-1, media access control function operable to control resource scheduling across all network slices of a wireless network, and provide a first, Level-2, media access control function operable to control resource scheduling within a network slice of the wireless network.

Example 69 may include the apparatus of example 68 and/or any other example disclosed herein, further comprising a plurality of Level-2 media access control functions per single Level-1 media access control function.

Example 70 may include the apparatus of examples 68-69 and/or any other example disclosed herein, wherein each Level-2 media access control function applies different numerologies to radio subframes used in the network slice, and wherein a numerology applied is dependent on a use-case of the network slice or type of data communicated over the network slice.

Example 71 may include the apparatus of examples 68-70 and/or any other example disclosed herein, wherein the Level-2 media access control function is dedicated to a single network slice.

Example 72 may include the apparatus of examples 68-71 and/or any other example disclosed herein, wherein each network slice has a slice-specific transmission time interval (TTI), and a hybrid automatic repeat request (HARD) operates on data of the network slice according to the slice-specific TTI.

Example 73 may include the apparatus of examples 68-72 and/or any other example disclosed herein, wherein a slice is identified using a dedicated slice identification.

Example 74 may include the apparatus of examples 68 to 73 and/or any other example disclosed herein, wherein the slice identification is broadcast in a system information block.

Example 75 may include the apparatus of examples 68-74 and/or any other example disclosed herein, wherein the wireless network comprises a core network portion and/or an air interface portion Example 76 may include a method comprising controlling resource scheduling across all network slices of a wireless network using a first, Level-1, media access control function, and controlling resource scheduling within a network slice of the wireless network using a first, Level-2, media access control function.

Example 77 may include the method of example 76 and/or any other example disclosed herein, further comprising providing a plurality of Level-2 media access control functions per single Level-1 media access control function.

Example 78 may include the method of examples 76-77 and/or any other example disclosed herein, further comprising applying different numerologies to radio subframes used in the network slice by each Level-2 media access control function, wherein a numerology applied is dependent on a use-case of the network slice or type of data communicated over the network slice.

Example 79 may include the method of examples 76-78 and/or any other example disclosed herein, further comprising dedicating the Level-2 media access control function to a single network slice.

Example 80 may include the method of examples 76-79 and/or any other example disclosed herein, wherein each network slice has a slice-specific transmission time interval (TTI), the method further comprising operating on data of the network slice according to the slice-specific TTI using a hybrid automatic repeat request (HARD).

Example 81 may include the method of examples 76-80 and/or any other example disclosed herein, further comprising identifying a slice using a dedicated slice identification.

Example 82 may include the method of examples 76-81 and/or any other example disclosed herein, further comprising broadcasting the slice identification in a system information block.

Example 83 may include the method of examples 76-82 and/or any other example disclosed herein, further comprising providing a core network portion and/or an air interface portion in the wireless network.

Example 84 may include an apparatus operable in a wireless communication network, the apparatus comprising radio frequency (RF) circuitry to receive or transmit at least one communication to another device in the wireless communication network, and circuitry to provide a slice specific dedicated slice identification, wherein the dedicated slice identification is broadcast to devices operable to access the wireless communication network during use.

Example 85 may include the apparatus of example 84 and/or any other example disclosed herein, wherein the dedicated slice identification is broadcast in a system information of the wireless communication network.

Example 86 may include a method comprising providing, to a network slice, a slice specific dedicated slice identification, and broadcasting the dedicated slice identification to devices operable to access the wireless communication network during use.

Example 87 may include the method of example 86 and/or any other example disclosed herein, wherein the dedicated slice identification is broadcast in a system information of the wireless communication network.

Example 88 may include an apparatus operable in a wireless communication network, the apparatus comprising radio frequency (RF) circuitry to receive or transmit at least one communication to another device in the wireless communication network, and circuitry to provide random access to a network slice using a common random access resource, and slice a wireless network, wherein to slice comprises configuring each slice or portion thereof to support transmission or delivery of a type of communications.

Example 89 may include the apparatus of example 88 and/or any other example disclosed herein, wherein a type of communications comprises a single use-case of the communications.

Example 90 may include the apparatus of examples 88-89 and/or any other example disclosed herein, wherein the common random access resource is accessible to all devices in the wireless communication network Example 91 may include the apparatus of examples 88-90 and/or any other example disclosed herein, wherein the circuitry is further to dedicate random access to a network slice using a dedicated random access resource of the network slice being accessed.

Example 92 may include the apparatus of examples 88-91 and/or any other example disclosed herein, wherein the common random access resource is the common physical random access channel (PRACH).

Example 93 may include the apparatus of examples 88-92 and/or any other example disclosed herein, wherein the dedicated random access resource is the dedicated physical random access channel (dPRACH), and wherein the dPRACH is network slice specific.

Example 94 may include a method comprising providing random access to a network slice using a common random access resource, and slicing a wireless network, wherein slicing comprises configuring each slice or portion thereof to support transmission or delivery of a type of communications.

Example 95 may include the method of example 94 wherein a type of communications comprises a single use-case of the communications.

Example 96 may include the method of examples 94-95 and/or any other example disclosed herein, further comprising providing accessibility to the common random access resource by all devices in the wireless communication network Example 97 may include the method of examples 94-96 and/or any other example disclosed herein, further comprising dedicating random access to a network slice using a dedicated random access resource of the network slice being accessed.

Example 98 may include the method of examples 94-97 and/or any other example disclosed herein, wherein the common random access resource is the common physical random access channel (PRACH).

Example 99 may include the method of examples 94-98 and/or any other example disclosed herein, wherein the dedicated random access resource is the dedicated physical random access channel (dPRACH), and wherein the dPRACH is network slice specific.

Example 100 may include an apparatus operable in a wireless communication network, the apparatus comprising radio frequency (RF) circuitry to receive or transmit at least one communication to another device in the wireless communication network, and circuitry to control status of a network slice of the wireless communication network, said circuitry to switch a network slice from an active state to a dormant state when no traffic or only traffic below a first predetermined threshold is available to use on the respective network slice, or switch on a network slice from a dormant state to an active state when traffic or only traffic above a second predetermined threshold is available to use on the respective network slice.

Example 101 may include the apparatus of example 100 and/or any other example disclosed herein, wherein to switch a network slice from an active state to a dormant state comprises releasing the wireless network resources assigned to the slice.

Example 102 may include the apparatus of examples 100-101 and/or any other example disclosed herein, wherein to switch on a network slice from a dormant state to an active state comprises triggering an activation of the network slice during a random access or scheduling request.

Example 103 may include the apparatus of examples 100-102 and/or any other example disclosed herein, wherein the first and second threshold are different or the same.

Example 104 may include the apparatus of examples 100-103 and/or any other example disclosed herein, wherein the first and second threshold are slice specific.

Example 105 may include a method comprising switching a network slice from an active state to a dormant state when no traffic or only traffic below a first predetermined threshold is available to use on the respective network slice, or switching on a network slice from a dormant state to an active state when traffic or only traffic above a second predetermined threshold is available to use on the respective network slice.

Example 106 may include the method of example 105 and/or any other example disclosed herein, further comprising releasing the wireless network resources assigned to the slice when switching a network slice from an active state to a dormant state.

Example 107 may include the method of examples 105-106 and/or any other example disclosed herein, further comprising triggering an activation of the network slice during a random access or scheduling request.

Example 108 may include the method of examples 105-107 and/or any other example disclosed herein, wherein the first and second threshold are different or the same.

Example 109 may include the method of examples 105-108 and/or any other example disclosed herein, wherein the first and second threshold are slice specific.

Example 110 may include an apparatus comprising means to perform one or more elements of a method described in or related to any of examples 3-20, 45-67, 76-83, 86-87, 94-99, 106-109, or any other method or process described herein.

Example 111 may include one or more computer-readable media comprising instructions to cause an electronic device, upon execution of the instructions by one or more processors of the electronic device, to perform one or more elements of a method described in or related to any of examples 3-20, 45-67, 76-83, 86-87, 94-99, 106-109, or any other method or process described herein, or to provide the functionality of the apparatus or device according to any of examples 1, 2, 21-22, 23-39, 40-44, 68-75, 84-85, or 88-93 and/or any other example disclosed herein.

Example 112 may include an apparatus comprising logic, modules, and/or circuitry to perform one or more elements of a method described in or related to any of examples 3-20, 45-67, 76-83, 86-87, 94-99, 106-109, or any other method or process described herein.

Example 113 may include an apparatus comprising one or more processors and one or more computer readable media comprising instructions that, when executed by the one or more processors, cause the one or more processors to perform the method of any of examples 3-20, 45-67, 76-83, 86-87, 94-99, 106-109, or any other method or process described herein.

Example 114 may include a method of communicating in a wireless network as shown and described herein.

Example 115 may include a system for providing wireless communication as shown and described herein.

Example 116 may include a device for providing wireless communication as shown and described herein.

Example 117 may include a device to enable network slicing in a radio access network comprising any combination of the devices, entities or methods described herein, or portions of the devices, entities or methods described herein.

Example 118 may include a radio access network comprising any combination of the devices, entities or methods described herein, or portions of the devices, entities or methods described herein.

Example 119 may include a device for use in a radio access network comprising any combination of the devices, entities or methods described herein, or portions of the devices, entities or methods described herein.

Example 120 may relate to a method of slicing a radio access network into vertical and horizontal network slices. Example 120 may further include any of the other examples herein.

Example 121 may relate to a sliceable radio access network (RAN) architecture with a RAN control entity managing the c-plane and u-plane of the underlay RAN slices. Example 121 may further include any of the other examples herein.

Example 122 may include the sliceable radio access network architecture of Example 121 or some other example herein, wherein the RAN control entity is physically distributed or in a central location. Example 122 may further include any of the other examples herein.

Example 123 may include the sliceable radio access network architecture of Example 122 or some other example herein, wherein, in the distributed case, the RAN control entity is co-located with a macro BS, and is to only manage vertical and/or horizontal slices, or portions thereof, that are under the coverage of the macro BS. Example 123 may further include any of the other examples herein.

Example 124 may include the sliceable radio access network architecture of Example 3 or some other example herein, wherein, in the centralized case, the RAN control entity is to manage the slice portion across multiple BSs which are under a coverage of the RAN control entity. Example 5 may further include any of the other examples herein.

Example 125 may include the sliceable radio access network architecture of Examples 121-124 or some other example herein, further comprising a Layer 1 (L1) control function and a Layer 2 (L2) control function, wherein the L1 control function and a L2 control function it to apply a flat control architecture or a hierarchical control architecture. Example 125 may further include any of the other examples herein.

Example 126 may include the sliceable radio access network architecture of Example 125 or some other example herein, wherein, in the case of a flat control architecture, all the horizontal and vertical slices are managed by the L1 and L2 control functions in the RAN control entity, or wherein, in the case of the hierarchical control architecture, the RAN control entity is to only control one kind of slice, vertical or horizontal, and wherein the one kind of slice is to control the other kind of slice, horizontal or vertical. Example 126 may further include any of the other examples herein.

Example 127 may include a method comprising: identifying, by a radio access network (RAN) control entity, one or more vertical slices of a RAN, the vertical slices related to vertical market segments of the RAN; identifying, by the RAN control entity, one or more horizontal slices of the RAN, the horizontal slices related to network hierarchy segments of the RAN; and slicing, by the RAN control entity, the RAN into the one or more vertical and/or horizontal slices. Example 127 may further include any of the other examples herein.

Example 128 may include the method of Example 8 or some other example herein, further comprising managing, by the RAN control entity, c-plane and u-plane components of one or more vertical and/or horizontal slices. Example 128 may further include any of the other examples herein.

Example 129 may include the method of Examples 127 or 128 or some other example herein, further comprising only managing, by the RAN control entity when the RAN control entity is co-located with a macro base station (BS), vertical and/or horizontal slices, or portions thereof that are under coverage of the macro BS. Example 129 may further include any of the other examples herein.

Example 130 may include the method of Examples 127 or 128 or some other example herein, further comprising managing, by the RAN control entity, vertical and/or horizontal slices that are under coverage of a plurality of base stations (BSs). Example 130 may further include any of the other examples herein Example 131 may include the method of any of Examples 127-130 or some other example herein, further comprising providing a Layer 1 (L1) and/or Layer 2 (L2) control function in the RAN control entity. Example 137 may further include any of the other examples herein.

Example 132 may include the method of Example 130 or some other example herein, further comprising managing vertical and/or horizontal slices, or portions thereof with the L1 and L2 control functions. Example 132 may further include any of the other examples herein.

Example 133 may include the method of Examples 130-132 or some other example herein, further comprising physically distributing the RAN control entity across the RAN or portion thereof, or centralizing the RAN control entity in a central location. Example 133 may further include any of the other examples herein.

Example 134 may include the method of Examples 131-133 or some other example herein, wherein managing one type of the vertical or horizontal slices, using the L1 and/or L2 control function, and in turn managing the other type of the vertical or horizontal slices with the other slice. Example 134 may further include any of the other examples herein.

Example 135 may include the method of Examples 127-137 or some other example herein, wherein the one or more horizontal slices are related to a macro network slice, a micro network slice, a device to device (D2D) slice, a Personal Area Network, a non-standalone mode, an anchor-booster architecture. Example 135 may further include any of the other examples herein.

Example 136 may include an electronic device to implement a radio access network (RAN) control entity, the electronic device comprising: baseband circuitry to: identify one or more vertical slices of a RAN, the vertical slices related to vertical market segments of the RAN; identify one or more horizontal slices of the RAN, the horizontal slices related to network hierarchy segments of the RAN; and slice the RAN into the one or more vertical and/or horizontal slices; and radio frequency (RF) circuitry coupled with the baseband circuitry, the RF circuitry to send and/or receive one or more signals in accordance with the vertical and/or horizontal slices, or portions thereof. Example 136 may further include any of the other examples herein.

Example 137 may include the electronic device of Examples 136 or some other example herein, wherein the RAN control entity is to provide an m-plane control function that controls the network slices of a sliced RAN. Example 137 may further include any of the other examples herein.

Example 138 may include the electronic device of Examples 136-137 or some other example herein, wherein the baseband circuitry is further to manage c-plane and u-plane components of one or more vertical and/or horizontal slices. Example 138 may further include any of the other examples herein.

Example 139 may include the electronic device of Examples 136-138 or some other example herein, wherein the RAN control entity is co-located with a macro base station (BS), and the RAN control entity is to only manage vertical and/or horizontal slices, or portions thereof, that are under coverage of the macro BS. Example 139 may further include any of the other examples herein.

Example 140 may include the electronic device of Examples 136-139 or some other example herein, wherein the RAN control entity is to manage vertical and/or horizontal slices that are under coverage of a plurality of base stations (BSs). Example 140 may further include any of the other examples herein.

Example 141 may include the electronic device of Examples 136-140 or some other example herein, wherein the RAN control entity further comprises a Layer 1 (L1) and/or Layer 2 (L2) control function, and wherein the L1 control function is the physical (PHY) Layer and wherein the L2 control function is the medium access control (MAC) Layer and/or above Layers. These L2 Layer(s) may comprise the RRC functions. Example 141 may further include any of the other examples herein.

Example 142 may include the electronic device of Example 131 or some other example herein, wherein L1 and L2 control function is hierarchical, such that a lower Layer portion (or portions) control an operation of each slice, and a higher Layer portion(s) coordinates the MAC operation across the slices. Example 142 may further include any of the other examples herein.

Example 143 may include the electronic device of Examples 136-142 or some other example herein, wherein the L1 and L2 control functions are to manage vertical and/or horizontal slices. Example 143 may further include any of the other examples herein.

Example 144 may include the electronic device of Examples 136-143 or some other example herein, wherein the L1 and/or L2 control function are to manage one type of the vertical or horizontal slices, which in turn manages the other type of the vertical or horizontal slices.

Example 145 may include the electronic device of Examples 136-144 or some other example herein, wherein the one or more vertical slices are related to a mobile broadband (MBB) slice, a machine type communication (MTC) slice, a vehicle to anywhere (V2X) communication slice. Example 145 may further include any of the other examples herein.

Example 146 may include the electronic device of Examples 136-145 or some other example herein, wherein the one or more horizontal slices are related to a macro network slice, a micro network slice, a device to device (D2D) slice, a Personal Area Network, a non-standalone mode, an anchor-booster architecture. Example 146 may further include any of the other examples herein.

Example 147 may include an electronic device to implement a radio access network (RAN) control entity, the electronic device comprising: baseband circuitry to: identify one or more vertical slices of a RAN, the vertical slices relating to use-case of communications of the RAN; identify one or more horizontal slices of the RAN, wherein a horizontal slice comprises definable network hierarchy portion capable of function offloading between entities forming the horizontal slice; and slice the RAN into the one or more vertical and/or horizontal slices; and radio frequency (RF) circuitry coupled with the baseband circuitry, the RF circuitry to send and/or receive one or more signals in accordance with the vertical and/or horizontal slices. Example 147 may further include any of the other examples herein.

Example 148 may include the electronic device of Example 147 or some other example herein, wherein the baseband circuitry is further to manage c-plane and u-plane components of one or more vertical and/or horizontal slices, or portions thereof. Example 148 may further include any of the other examples herein.

Example 149 may include the electronic device of Examples 147-148 or some other example herein, wherein the one or more vertical slices are related to separable use-cases of communications to be transmitted or received over the RAN, including one or more of: a mobile broadband (MBB) use-case, a machine type communication (MTC) use-case, a vehicle to anywhere (V2X) communication use-case, a health network use-case, an industrial control use-case. Example 149 may further include any of the other examples herein.

Example 150 may include a radio access network (RAN) control entity to logically slice a RAN into one or more horizontal or vertical slices; wherein a vertical slice comprises a predetermined type of communication; and wherein a horizontal slice comprises a predetermined layer of the RAN or a system definable network hierarchy portion capable of function offloading between entities forming the horizontal slice; wherein the RAN control entity comprises at least a portion controlling allocation of RAN resources according to a need of the one or more horizontal or vertical slices. Example 150 may further include any of the other examples herein.

Example 151 may include the radio access network (RAN) control entity of Example 151 or some other example herein, wherein the RAN comprises at least two vertical slices and at least two horizontal slices. Example 32 may further include any of the other examples herein.

Example 152 may include the radio access network (RAN) control entity of Examples 150-151 or some other example herein, wherein the predetermined type of communication relates to a market segment using the RAN for communications or specific type of communication. Example 152 may further include any of the other examples herein.

Example 153 may include the radio access network (RAN) control entity of Examples 150-152 or some other example herein, wherein the radio access network (RAN) control entity is distributed across portions of the RAN. Example 153 may further include any of the other examples herein.

Example 154 may include the radio access network (RAN) control entity of Examples 150-153 or some other example herein, wherein the portions of RAN are the eNBs of the RAN. Example 154 may further include any of the other examples herein.

Example 155 may include the radio access network (RAN) control entity of Examples 150-154 or some other example herein, wherein a predetermined layer of the RAN comprises a macro BS layer, a smaller BS layer, a device-to-device layer, a wearable layer or PAN layer. Example 155 may further include any of the other examples herein.

Example 156 may include the radio access network (RAN) control entity of Example 155 or some other example herein, wherein a smaller base station comprises any of a micro BS, pico BS, femto BS or smaller BS. Example 156 may further include any of the other examples herein.

Example 157 may include a device comprising: means for identifying, by a radio access network (RAN) control entity, one or more vertical slices of a RAN, the vertical slices related to vertical market segments of the RAN; means for identifying, by the RAN control entity, one or more horizontal slices of the RAN, the horizontal slices related to network hierarchy segments of the RAN; and means for slicing, by the RAN control entity, the RAN into the one or more vertical and/or horizontal slices. Example 157 may further include any of the other examples herein.

Example 158 may include the device of Example 157 or some other example herein, further comprising means for managing, by the RAN control entity, c-plane and u-plane components of one or more vertical and/or horizontal slices. Example 158 may further include any of the other examples herein.

Example 159 may include the device of Examples 157 or 158 or some other example herein, further comprising means for only managing, by the RAN control entity when the RAN control entity is co-located with a macro base station (BS), vertical and/or horizontal slices, or portions thereof that are under coverage of the macro BS. Example 159 may further include any of the other examples herein.

Example 160 may include the device of any of Examples 157-158 or some other example herein, further comprising means for managing, by the RAN control entity, vertical and/or horizontal slices that are under coverage of a plurality of base stations (BSs). Example 160 may further include any of the other examples herein.

Example 161 may include the device of any of Examples 157-160 or some other example herein, further comprising means for providing a Layer 1 (L1) and/or Layer 2 (L2) control function in the RAN control entity. The L1 control function may be the physical (PHY) Layer and the L2 control function may be the medium access control (MAC) Layer and/or above Layers. These L2 Layer(s) may comprise the RRC functions. Example 161 may further include any of the other examples herein.

Example 162 may include the device of Example 161 or some other example herein, further comprising means for managing vertical and/or horizontal slices, or portions thereof with the L1 and L2 control functions. Example 162 may further include any of the other examples herein.

Example 163 may include the device of Examples 157-162 or some other example herein, further comprising means for physically distributing the RAN control entity across the RAN or portion thereof, or centralizing the RAN control entity in a central location. Example 163 may further include any of the other examples herein.

Example 164 may include the device of Examples 161-163 or some other example herein, wherein means for managing one type of the vertical or horizontal slices, using the L1 and/or L2 control function, and in turn managing the other type of the vertical or horizontal slices with the other slice. Example 164 may further include any of the other examples herein.

Example 165 may include the device of Examples 38-45 or some other example herein, wherein the one or more horizontal slices are related to a macro network slice, a micro network slice, a device to device (D2D) or ProSe slice, a Personal Area Network, a non-standalone mode, an anchor-booster architecture. Example 165 may further include any of the other examples herein.

Example 166 may include a computer readable medium comprising executable instructions, which, when executed by one or more processors causes the one or more processors to: identify, by a radio access network (RAN) control entity, one or more vertical slices of a RAN, the vertical slices related to vertical market segments of the RAN; identifying, by the RAN control entity, one or more horizontal slices of the RAN, the horizontal slices related to network layers of the RAN or a system definable network hierarchy portion capable of function offloading between entities forming the horizontal slice; and slicing, by the RAN control entity, the RAN into the one or more vertical and/or horizontal slices. Example 166 may further include any of the other examples herein.

Example 167 may include the computer readable medium of Example 166 or some other example herein, further comprising managing, by the RAN control entity, an m-plane functionality of the RAN. Example 167 may further include any of the other examples herein.

Example 168 may include the computer readable medium of Examples 166-167 or some other example herein, further comprising managing, by the RAN control entity, c-plane and u-plane components of one or more vertical and/or horizontal slices, or portions thereof. Example 168 may further include any of the other examples herein.

Example 169 may include the computer readable medium of any of Examples 166-168 or some other example herein, wherein the RAN control entity is collocated with a macro base station (BS), and the RAN control entity only manages vertical and/or horizontal slices, or portions thereof, that are under coverage of the macro BS. Example 169 may further include any of the other examples herein.

Example 170 may include the computer readable medium of any of Examples 166-169 or some other example herein, wherein the RAN control entity manages vertical and/or horizontal slices that are under coverage of a plurality of base stations (BSs). Example 170 may further include any of the other examples herein.

Example 171 may include the computer readable medium of any of Examples 166-170 or some other example herein, wherein the RAN control entity includes an L1 and/or L2 control function. Example 171 may further include any of the other examples herein.

Examples 172 may include the computer readable medium of any of Examples 169-171 or some other example herein, wherein the L1 and L2 control functions are to manage vertical and/or horizontal slices. Example 172 may further include any of the other examples herein.

Example 173 may include the computer readable medium of any of Examples 166-171 or some other example herein, wherein the L1 and/or L2 control function are to manage one type of the vertical or horizontal slices, which in turn manages the other type of the vertical or horizontal slices. Example 173 may further include any of the other examples herein.

Example 174 may include the computer readable medium of any of Examples 166-171 or some other example herein, wherein the one or more vertical slices are related to a mobile broadband (MBB) slice, a machine type communication (MTC) slice, a vehicle to anywhere (V2X) communication slice, an industrial control slice. Example 174 may further include any of the other examples herein.

Example 175 may include the computer readable medium of any of Examples 156-171 or some other example herein, wherein the one or more horizontal slices are related to a macro network slice, a micro network slice, a device to device (D2D) slice, a Personal Area Network, a non-standalone mode, an anchor-booster architecture. Example 56 may further include any of the other examples herein.

Example 176 may include a method comprising: identifying one or more vertical slices of a RAN, the vertical slices relating to use-case of communications of the RAN; identifying one or more horizontal slices of the RAN, wherein a horizontal slice comprises definable network hierarchy portion capable of function offloading between entities forming the horizontal slice; and slicing the RAN into the one or more vertical and/or horizontal slices; and the method further comprising: sending and/or receiving one or more signals in accordance with the vertical and/or horizontal slices using radio frequency (RF) circuitry coupled with the baseband circuitry. Example 176 may further include any of the other examples herein.

Example 177 may include the method of Example 176 or some other example herein, further comprising managing c-plane and u-plane components of one or more vertical and/or horizontal slices, or portions thereof. Example 177 may further include any of the other examples herein.

Example 178 may include the method of Examples 176-177 or some other example herein, wherein the one or more vertical slices are related to separable use-cases of communications to be transmitted or received over the RAN, including one or more of: a mobile broadband (MBB) use-case, a machine type communication (MTC) use-case, a vehicle to anywhere (V2X) communication use-case, a health network use-case, an industrial control use-case. Example 178 may further include any of the other examples herein.

Example 179 may include a method of logically slicing a RAN into one or more horizontal or vertical slices, comprising: providing a vertical slice comprising a predetermined type of communication; and providing a horizontal slice comprising a predetermined layer of the RAN or a system definable network hierarchy portion capable of function offloading between entities forming the horizontal slice; and controlling allocation of at least a portion of RAN resources according to a need of the one or more horizontal or vertical slices using a RAN control entity. Example 179 may further include any of the other examples herein.

Example 180 may include the method of Example 60 or some other example herein, wherein the RAN comprises at least two vertical slices and at least two horizontal slices. Example 180 may further include any of the other examples herein.

Example 181 may include the method of Examples 179-180 or some other example herein, wherein the predetermined type of communication relates to a market segment using the RAN for communications or specific type of communication. Example 181 may further include any of the other examples herein.

Example 182 may include the method of Examples 179-181 or some other example herein, further comprising distributing the radio access network (RAN) control entity across portions of the RAN. Example 182 may further include any of the other examples herein.

Examples 183 may include the method of Examples 179-182 or some other example herein, wherein the portions of the RAN are base stations of the RAN. Example 183 may further include any of the other examples herein.

Example 184 may include the method of Examples 179-183 or some other example herein, wherein a predetermined layer of the RAN comprises a macro BS layer, a smaller BS layer, a device-to-device layer, a wearable layer or PAN layer. Example 184 may further include any of the other examples herein.

Example 185 may include the method of Example 184 or some other example herein, wherein a smaller base station comprises any of a micro BS, pico BS, femto BS or smaller BS. Example 185 may further include any of the other examples herein.

Example 186 may include a base station (BS) apparatus operable in a wireless communication network, the apparatus comprising: radio frequency (RF) circuitry to receive at least one communication originating from a wireless network device or transmit at least one communication to a wireless network device; and a radio access network control entity according to any example herein.

Example 187 may include a user equipment (UE) apparatus operable in a wireless communication network, the apparatus comprising: radio frequency (RF) circuitry to receive or transmit at least one communication to another device in the wireless communication network; and a radio access network control entity according to any examples herein.

Example 188 may include an apparatus comprising means to perform one or more elements of a method described in or related to any the other examples herein.

Example 189 may include one or more computer-readable media comprising instructions to cause an electronic device, upon execution of the instructions by one or more processors of the electronic device, to perform one or more elements of a method described in or related to any example herein. Example 189 may further include any of the other examples herein.

Example 190 may include an apparatus comprising logic, modules, and/or circuitry to perform one or more elements of a method described in or related to other example herein. Example 190 may further include any of the other examples herein.

Example 191 may include an apparatus comprising: one or more processors and one or more computer readable media comprising instructions that, when executed by the one or more processors, cause the one or more processors to perform the method of any example herein. Example 191 may further include any of the other examples herein.

Example 192 may include a method of communicating in a wireless network as shown and described herein. Example 192 may further include any of the other examples herein.

Example 193 may include a system for providing wireless communication as shown and described herein. Example 193 may further include any of the other examples herein.

Example 194 may include a device for providing wireless communication as shown and described herein. Example 194 may further include any of the other examples herein.

Example 195 may include a device to enable network slicing in a radio access network comprising any combination of the devices, entities or methods described herein, or portions of the devices, entities or methods described herein. Example 195 may further include any of the other examples herein.

Example 196 may include a radio access network comprising any combination of the devices, entities or methods described herein, or portions of the devices, entities or methods described herein. Example 196 may further include any of the other examples herein.

Example 197 may include a device for use in a radio access network comprising any combination of the devices, entities or methods described herein, or portions of the devices, entities or methods described herein. Example 197 may further include any of the other examples herein.

Example 198 may include a method, technique, or process as described in or related to any examples portions or parts thereof. Example 198 may further include any of the other examples herein.

In some examples, if the RAN control entity is physically distributed, the RAN control entity can be collocated with the macro BS, and only manage the slice portions that under the coverage of the macro BS. In some examples, if the RAN control entity is in a central location, the RAN control entity can manage a slice portion across multiple BSs which are under the coverage of the RAN control entity.

In some examples, the Level-1 and Level-2 control functions can apply a flat control architecture or a hierarchical control architecture, wherein, in a case of a flat control architecture, all the horizontal and vertical slices are managed by the Level-1 and Level-2 control functions in the RAN control entity. Alternatively, in the case of a hierarchical control architecture, the RAN control entity can only control one kind of slice, horizontal or vertical, and wherein the controlled slice further controls another kind of slice, horizontal or vertical.

In some examples, the RAN comprises at least two vertical slices and at least two horizontal slices.

In some examples, the predetermined type of communication relates to a market segment using the RAN for communications.

In some examples, the radio access network (RAN) control entity is distributed across portions of the RAN. In some examples, the portions of RAN are the base stations (e.g. eNBs) of the RAN.

In some examples, the RAN control entity provides an m-plane control function that may control the network slices of a sliced RAN. The m-plane control function may control any one or more of: the identification of vertical markets (or at least one vertical market) applicable to, or desired to be served by, the RAN, wherein each identified vertical market has a vertical slice logically assigned thereto; the identification of horizontal slices (e.g. the network layers, or applicable portions thereof) for serving the identified vertical slice(s) that are applicable to, or desired to be served by, the RAN; slicing of the RAN into the identified one or more slices (horizontal and/or vertical); the coordination of the operation of the slices, including setup and teardown of the slices. The m-plane functionality may control the c-plane and/or u-plane of respective ones of, or the totality of the identified network slices of the RAN.

In the foregoing, reference to 'layer' may be a reference to a predefined (or definable) portion of the infrastructure, whereas reference to 'Layer' may be a reference to a network protocol Layer in operation on/in the network infrastructure, or portion thereof.

Example 199 may include the example of FIG. 31, FIG. 32 or some other example herein. Example 200 may include the example of example 199 further comprising: identifying an association of a control-plane slice of the network slice; and identifying an association of a user-plane slice of a plurality of user-plane slices and the control-plane slice.

Example 201 may include the example of example 199 or some other example herein, further comprising: identifying an association of a control-plane slice of the network slice; and identifying an association of a single user-plane slice and the control-plane slice.

Example 202 may include the example of example 199 or some other example herein, further comprising: identifying an association of a common control-plane slice of the network slice; and identifying an association of a user-plane slice of a plurality of user-plane slices and the common control-plane slice; and identifying an association of a splice-specific control-plane of a plurality of slice-specific control-planes and the common control-plane slice.

Example 203 may include the example of example 199 or some other example herein, further comprising: determining whether to change a power state of the first component or the second component based on at least one of a traffic load associated with the network slice exceeding or dropping below a threshold, a number of active UEs operating on the network slice exceeding or dropping below a threshold, to maintain service continuity of a moving UE, or to meet a particular QoS requirement (e.g., low latency, ultra-reliability, or the like, or combinations thereof).

Example 204 may include the example of example 203 or some other example herein, further comprising: determining whether to change a power state of the first component or the second component based on a received control signal; wherein the control signal originates from at least one of a UE (and includes an indication on an intended slice during a random access) or a peer base station/access point (BS/AP) (and includes a triggering message to request slice power state change at the targeted BS).

Example 205 may include the example of example 204 or some other example herein, further comprising: transmitting a signal to at least one of a remote AP/BS or the Mobility Management Entity (MME)/network control entity to exchange signaling responsive to determining to change the power state of the first component or the second component.

Example 206 may include the example of example 6 or some other example herein, wherein the control signal is received over an UE interface (e.g. the control signal originates from the UE), and the method further comprises: determining whether to maintain a power state of the first component or the second component based on traffic monitoring responsive to receiving the control signal.

Example 207 may include the example of FIG. 31, FIG. 32, or some other example herein. Example 208 may include the example of example 207 or some other example herein, wherein the control signal is received over an UE interface, and the method further comprises: determining whether to maintain a power state of the first component or the second component based on a QoS criterion responsive to receiving the control signal.

Example 209 may include the example of example 199 or some other example herein, further comprising: determining whether to change a power state of the first component or the second component based on at least one of a UE report on the neighboring cell condition or the traffic load/number of connection condition on the network slice.

Example 210 may include the example of example 204 or 209 or some other example herein, further comprising: handing over an active UE on the slice to a neighboring BS in response to determining to change the power state of the first component or the second component.

Example 210 may include the example of example 194 or 195 or some other example herein, further comprising: transmitting or receiving system information carrying information on active slices in a BS.

Example 211 may include the example of example 199 or some other example herein, further comprising: determining whether to change a power state of the first component or the second component based a signal exchange among a plurality of BS or between a BS of the plurality of a central controller of the plurality of BSs.

Example 212 may include the example of example 211 or some other example herein, further comprising, transmitting or receiving signaling indicating load conditions on each of a plurality of network slices including the network slice to or from an AP or BS.

Example 213 may include the example of FIG. 32 or some other example herein, further comprising: determining whether to access a BS based on at least one of a power state of a BS of an intended slice, the link condition, QoS requirement, or traffic load of neighboring cells.

Example 214 may include the example of example 213 or some other example herein, further comprising: maintaining a connection to the network slice and another network slice of a different AP or BS than the network slice at a same time.

Example 215 may include an apparatus, (e.g. an electronic device of any network device including but not limited to an eNB) operable in a wireless communication for a fifth generation (5G) system, such as a wireless network, the apparatus comprising: radio frequency (RF) circuitry to receive at least one communication originating from a network virtualization component and/or software defined network; and baseband circuitry to: identify based on information from the communication a first association of a first local component of a Radio Access Network (RAN) and a second remote component of the RAN, the first association corresponding to a network slice; and identify based on information of the same or a different communication of the at least one communication a second association of the first local component of the RAN and a third component of the RAN that is different than the second component of the RAN, the second association corresponding to the network slice; wherein the second association is based on at least one of traffic type, traffic load, or a Quality of Service (QoS) requirement.

Example 216 may include the example of example 215 or some other example herein, wherein the baseband circuitry is to: identify an association of a control-plane slice of the network slice; and identify an association of a user-plane slice of a plurality of user-plane slices and the control-plane slice.

Example 217 may include the example of example 216 or some other example herein, wherein the baseband circuitry is to: identify an association of a control-plane slice of the network slice; and identify an association of a single user-plane slice and the control-plane slice.

Example 218 may include the example of example 217 or some other example herein, wherein the baseband circuitry is to: identify an association of a common control-plane slice of the network slice; and identify an association of a user-plane slice of a plurality of user-plane slices and the common control-plane slice; and identify an association of a splice-specific control-plane of a plurality of slice-specific control-planes and the common control-plane slice.

Example 219 may include the example of example 215 or some other example herein, wherein the baseband circuitry is to: determine whether to change a power state of the first component or the second component based on at least one of a traffic load associated with the network slice exceeding or dropping below a threshold, a number of active UEs operating on the network slice exceeding or dropping below a threshold, to maintain service continuity of a moving UE, or to meet a particular QoS requirement (e.g., low latency, ultra-reliability, or the like, or combinations thereof).

Example 220 may include the example of example 219 or some other example herein, wherein the baseband circuitry is to: determine whether to change a power state of the first component or the second component based on control signal received by the RF circuitry; wherein the control signal originates from at least one of a UE (and includes an indication on an intended slice during a random access) or a peer BS/AP (and includes a triggering message to request slice power state change at the targeted BS).

Example 221 may include the example of example 219 or some other example herein, wherein the baseband circuitry is to: transmit a signal to at least one of a remote AP/BS or the MME/network control entity to exchange signaling responsive to determining to change the power state of the first component or the second component.

Example 222 may include the example of example 220 or some other example herein, wherein the control signal is received over an UE interface, and wherein the baseband circuitry is to: determine whether to maintain a power state of the first component or the second component based on traffic monitoring responsive to receiving the control signal.

Example 223 may include the example of example 220 or some other example herein, wherein the control signal is received over an UE interface, and wherein the baseband circuitry is to: determine whether to maintain a power state of the first component or the second component based on a QoS criterion responsive to receiving the control signal.

Example 224 may include the example of example 215 or some other example herein, wherein the baseband circuitry is to: determine whether to change a power state of the first component or the second component based on at least one of a UE report on the neighboring cell condition or the traffic load/number of connection condition on the network slice.

Example 225 may include the example of example 219 or 224 or some other example herein, wherein the baseband circuitry is to: handover an active UE on the slice to a neighboring BS in response to determining to change the power state of the first component or the second component.

Example 226 may include the example of example 219 or 224 or some other example herein, wherein the baseband circuitry is to cause the RF circuitry to transmit system information carrying information on active slices in a BS or the RF circuitry is to receive system information carrying information on active slices in a BS.

Example 227 may include the example of example 18 or some other example herein, wherein the baseband circuitry is to: determine whether to change a power state of the first component or the second component based a signal exchange among a plurality of BS or between a BS of the plurality of a central controller of the plurality of BSs.

Example 228 may include the example of example 227 or some other example herein, wherein the baseband circuitry is to cause the RF circuitry to, transmit signaling indicating load conditions on each of a plurality of network slices including the network slice to or from an AP or BS, or the RF circuitry is to receive signaling indicating load conditions on each of a plurality of network slices including the network slice to or from an AP or BS.

Example 229 may include an apparatus (e.g. an electronic device of user equipment operable in a wireless communication for a fifth generation (5G) system), the apparatus comprising: radio frequency (RF) circuitry to receive from at least one communication originating from a network virtualization component and/or software defined network; and baseband circuitry to: identify based on information from the communication a first association of a first local component of a radio access network (RAN) and a second remote component of the RAN, the first association corresponding to a network slice; and identify based on information from the communication a second association of the first local component of the RAN and a third component of the RAN that is different than the second component of the RAN, the second association corresponding to the network slice; wherein the second association is based on at least one of traffic type, traffic load, or a Quality of Service (QoS) requirement.

Example 230 may include the example of example 229 or some other example herein, wherein the baseband circuitry is to: determine whether to access a BS based on at least one of a power state of a BS of an intended slice, the link condition, QoS requirement, or traffic load of neighboring cells.

Example 231 may include the example of example 229 or some other example herein, wherein the baseband circuitry is to: maintain a connection to the network slice and another network slice of a different AP or BS than the network slice at a same time.

Example 232 may include the example of any example herein, wherein a network slice comprises any one or more of: a logical partition of a physical radio access network infrastructure for or in exclusive use of a single type of communication; a logical partition of a physical radio access network infrastructure for or in exclusive use by communications of a specific use-case of communication; a logical partition of a physical radio access network infrastructure having self-contained operation and traffic flow independent of operation and traffic flow on any other logical partition of the physical radio access network infrastructure. An advantage of this example, and other examples described herein, is a more efficient wireless network, for example because, it allows a given amount of (e.g. a single) physical radio access network infrastructure to be used by multiple use-cases, thereby resulting in less hardware/infrastructure than would otherwise be used (e.g. double, or more, hardware, for example to provide separate physical radio access network infrastructure for each use case).

Example 233 may include the example of any other example herein, wherein a network slice is an end-to-end network slice, wherein end-to-end comprises logical separation of both a physical radio access network infrastructure and a physical core network infrastructure in use to provide the network slice.

Example 234 may include the example of any example herein, wherein a specific use-case of communication includes any readily definable/distinguishable type of communication that can be carried out over a wireless network.

Example 235 may include the example of any of example herein, wherein a network slice comprises a logically separate radio access network carried over a shared physical radio access network (RAN).

Example 236 may include the example of any example herein, wherein the network slices comprises a vertical slice per use-case and/or a horizontal slice per shared resource, wherein a shared resource is a shared layer of the radio access network or a resources shared between select ones of entities in different layers of the wireless network.

Example 237 may include a radio access network (RAN) control entity comprising circuitry to: logically separate a physical infrastructure of the radio access network into two or more logically separated virtual radio access networks, wherein a logically separated virtual radio access network comprises a radio access network optimized for a predefined type of communication and wherein the logically separated virtual access network comprises self-contained operation and traffic flow independent of operation and traffic flow on any other logically separated virtual access network;

wherein each of the two or more logically separated virtual access networks are dynamically configured, according to at least one parameter associated with the predefined type of communication to be used for each of the two or more logically separated virtual access networks; wherein the at least one parameter associated with the predefined type of communication is at least one of: a traffic type of the predefined type of communication, a traffic load of the predefined type of communication, a quality of service requirement of the predefined type of communication.

Example 238 may include the example of example 237, or some other example herein, wherein to logically separate a physical infrastructure of the radio access network into two or more logically separated virtual radio access networks comprises to turn-on or activate a logically separated virtual access network.

Example 239 may include the example of examples 237 or 238, or some other example herein, wherein a turn-on or activation of a logically separated virtual access network comprises any one or more of: when triggered by a device served by the wireless network, the device transmits an indication of an intended logically separated virtual access network to use in an initial random access (RA); when triggered by a peer access point (AP) or base station (BS), the peer access point (AP) or base station (BS) transmits a triggering message to a target access point (AP) or base station (BS), said triggering message including a request for turn-on or activation of a specified logically separated virtual access network; a signaling exchange between an access point (AP) or base station (BS), and a Mobility Management Entity (MME) or network control entity associated with the physical radio access network, to determine configuration parameters of a logically separated virtual access network to use, turn-on or activate.

Example 240 may include the example of examples 237-239, or some other example herein, wherein the traffic load of the predefined type of communication comprises any one or more of: exceeding a predefined threshold level of traffic at an access point (AP) or base station (BS); exceeding a predefined number of active devices operating on an already existing logically separated virtual access network Example 241 may include the example of examples 40-43, or some other example herein, wherein the quality of service requirement of the predefined type of communication comprises or is based upon any one or more of: maintaining a service continuity of a moving device served by a radio access network and wherein the device is active in using the predefined type of communication; providing a predetermined maximum latency of the predefined type of communication; providing a predetermined minimum reliability of communication of the predefined type of communication; providing a predetermined minimum data rate for the predefined type of communication.

Example 242 may include the example of examples 237-241, or some other example herein, wherein the circuitry is further to: turn off, or logically de-separate, a logically separated virtual access network based upon at least one further parameter associated with the predefined type of communication, wherein the at least one further parameter is based on at least one of: a level of traffic at an access point (AP) or base station (BS) falling below a predefined threshold; a number of active devices operating on an already existing logically separated virtual access network falling below a predefined threshold; a data report on a or the logically separated virtual access network, or a condition of a neighboring cell, base station or access point.

Example 243 may include the example of example 242, or some other example herein, wherein a data report comprises a system information block or portions thereof.

Example 244 may include the example of examples 242-243, or some other example herein, wherein a data report comprises a system information block, or portions thereof, carrying information on active logically separated virtual access network(s).

Example 245 may include the example of examples 237-244, or some other example herein, wherein, when a logically separated virtual access network is de-separated or turned off, the circuitry is further to: handover any devices remaining on the logically separated virtual access network to another different logically separated virtual access network operating on a same base station or access point; or handover any devices remaining on the logically separated virtual access network to another base station or access point maintaining operation of a same logically separated virtual access network to be turned-off.

Example 246 may include the example of examples 237-245, or some other example herein, wherein a device to be served by a radio access network comprises a user equipment (UE).

Example 247 may include the example of examples 237-246, or some other example herein, wherein the device to be served or UE is to determine whether and how to access a logically separated virtual access network based on any one or more of: an indication that a selected logically separated virtual access network is currently active on a serving access point (AP) or base station (BS) currently serving the UE; a link condition of a wireless link between the UE and the serving access point (AP) or base station (BS) currently serving the UE; a QoS requirement of a wireless communication provided to the UE; or a traffic load between neighboring access points (APs) or base stations (BSs) to the access points (APs) or base stations (BSs) currently serving the UE.

Example 248 may include the example of examples 237-247, or some other example herein, wherein signaling between devices being served by, or the serving access points (APs) or base stations (BSs) serving the device is operable to assist a one of the access points (APs) or base stations (BSs) to determine whether to instigate a logically separated virtual access network turn-on procedure or a logically separated virtual access network turn-off procedure.

Example 249 may include the example of examples 237-248, or some other examples herein, wherein the signaling comprises signaling of load conditions on each active logically separated virtual access network between the access points (APs) or base stations (BSs) serving the devices, to provide the respective logically separated virtual access network(s).

Example 250 may include the example of examples 237-249, or some other examples herein, wherein a device served by the radio access network is operable to maintain active connections to multiple logically separated virtual access networks and/or to multiple access points (APs) or base stations (BSs) serving the devices to provide the logically separated virtual access network(s).

Example 251 may include the example of examples 237-250, or some other examples herein, wherein to logically separate the physical infrastructure of the radio access network into two or more logically separated virtual access networks comprises providing two or more network slices, and wherein the control entity provides control plane and user plane configurations for the two or more network slices, wherein the control plane and user plane configurations comprise any one of: a network-slice-specific user plane for each operational network slice and a single common control plane for use by all operational network slices, wherein the control plane and user plane functions of a particular network slice are decoupled from one another; or a network-slice-specific user plane for each operational network slice and a network-slice-specific control plane, wherein the control plane and user plane functions of a particular network slice are coupled to one another; or a network-slice-specific control plane for each operational network slice, and a control plane for each operational network slice comprising: a first, common, control plane portion; and a second, network-slice-specific, control plane portion; wherein the control plane and user plane functions of a particular network slice are partially decoupled from one another and partially coupled to one another.

Example 252 may include machine executable instructions arranged, when executed by one or more than one processor, to implement a method in a wireless communications network comprising: logically separating a physical infrastructure of the radio access network into two or more logically separated virtual radio access networks, wherein a logically separated virtual radio access network comprises a radio access network optimized for a predefined type of communication and wherein the logically separated virtual access network comprises self-contained operation and traffic flow independent of operation and traffic flow on any other logically separated virtual access network; dynamically configuring each of the two or more logically separated virtual access networks according to at least one parameter associated with the predefined type of communication to be used for each of the two or more logically separated virtual access networks; wherein the at least one parameter associated with the predefined type of communication is at least one of: a traffic type of the predefined type of communication, a traffic load of the predefined type of communication, a quality of service requirement of the predefined type of communication.

Example 253 may include the example of example 252, or some other example herein, wherein logically separating a physical infrastructure of the radio access network into two or more logically separated virtual radio access networks comprises turning-on a logically separated virtual access network.

Example 254 may include the example of examples 252 or 253, or some other example herein, wherein turning-on of a logically separated virtual access network comprises any one or more of: transmitting an indication of an intended logically separated virtual access network to use in an initial random access (RA), when triggered by a device served by the wireless network; transmitting a triggering message to a target access point (AP) or base station (BS) from a peer access point (AP) or base station (BS), when triggered by a peer access point (AP) or base station (BS), said triggering message including a request for turning-on of a specified logically separated virtual access network; exchanging signaling between an access point (AP) or base station (BS), and a Mobility Management Entity (MME) or network control entity associated with the physical radio access network, to determine configuration parameters of a logically separated virtual access network to use, turn-on or activate.

Example 255 may include the example of examples 252-254, or some other example herein, wherein the traffic load of the predefined type of communication comprises any one or more of: exceeding a predefined threshold level of traffic at an access point (AP) or base station (BS); exceeding a predefined number of active devices operating on an already existing logically separated virtual access network.

Example 256 may include the example of examples 252-255, or some other example herein, wherein the quality of service requirement of the predefined type of communication comprises or is based upon any one or more of: maintaining a service continuity of a moving device served by a radio access network and wherein the device is active in using the predefined type of communication; providing a predetermined maximum latency of the predefined type of communication; providing a predetermined minimum reliability of communication of the predefined type of communication; providing a predetermined minimum data rate for the predefined type of communication.

Example 257 may include the example of examples 252-256, or some other example herein, further comprising: turning off, or logically de-separating a logically separated virtual access network based upon at least one further parameter associated with the predefined type of communication, wherein the at least one further parameter is based on at least one of: a level of traffic at an access point (AP) or base station (BS) falling below a predefined threshold; a number of active devices operating on an already existing logically separated virtual access network falling below a predefined threshold; a data report on a or the logically separated virtual access network, or a condition of a neighboring cell, base station or access point.

Example 258 may include the example of example 257, or some other example herein, wherein a data report comprises a system information block or portions thereof.

Example 259 may include the example of examples 257 or 258, or some other example herein, wherein a data report comprises a system information block, or portions thereof, carrying information on active logically separated virtual access network(s).

Example 260 may include the example of examples 252-259, or some other example herein, wherein, when a logically separated virtual access network is de-separated or turned off, the method further comprises: handing over any devices remaining on the logically separated virtual access network to another different logically separated virtual access network operating on a same or different base station or access point; or handing over any devices remaining on the logically separated virtual access network to another base station or access point maintaining operation of a same logically separated virtual access network to be turned-off at current base station.

Example 261 may include the example of examples 252-260, or some other example herein, wherein a device to be served by a radio access network comprises a user equipment (UE).

Example 262 may include the example of examples 252-261, or some other example herein, further comprising the device to be served or UE determining whether and how to access a logically separated virtual access network based on any one or more of: an indication that a selected logically separated virtual access network is currently active on a serving access point (AP) or base station (BS) currently serving the UE; a link condition of a wireless link between the UE and the serving access point (AP) or base station (BS) currently serving the UE; a QoS requirement of a wireless communication provided to the UE; or a traffic load between neighboring access points (APs) or base stations (BSs) to the access points (APs) or base stations (BSs) currently serving the UE.

Example 263 may include the example of examples 253-262, or some other example herein, wherein signaling between devices being served by, or the serving access points (APs) or base stations (BSs) serving the device is operable to assist a one of the access points (APs) or base stations (BSs) to determine whether to instigate a logically separated virtual access network turn-on procedure or a logically separated virtual access network turn-off procedure.

Example 264 may include the example of examples 252-263, or some other example herein, wherein the signaling comprises signaling of load conditions on each active logically separated virtual access network between the access points (APs) or base stations (BSs) serving the devices, to provide the respective logically separated virtual access network(s).

Example 265 may include the example of examples 252-264, or some other example herein, further comprising the device served by the radio access network(s) maintaining active connections to multiple logically separated virtual access networks and/or to multiple access points (APs) or base stations (BSs) serving the devices to provide the logically separated virtual access network(s).

Example 266 may include the example of examples 252-265, or some other example herein, wherein logically separating the physical infrastructure of the radio access network into two or more logically separated virtual access networks comprises providing two or more network slices, and the method further comprises providing control plane and user plane configurations for the two or more network slices, wherein the control plane and user plane configurations comprise any one of: a network-slice-specific user plane for each operational network slice and a single common control plane for use by all operational network slices, wherein the control plane and user plane functions of a particular network slice are decoupled from one another; or a network-slice-specific user plane for each operational network slice and a network-slice-specific control plane, wherein the control plane and user plane functions of a particular network slice are coupled to one another; or a network-slice-specific control plane for each operational network slice, and a control plane for each operational network slice comprising: a first, common, control plane portion; and a second, network-slice-specific, control plane portion; wherein the control plane and user plane functions of a particular network slice are partially decoupled from one another and partially coupled to one another.

Example 267 may include a device to trigger network slicing in a radio access network comprising: circuitry to trigger turn on or turn off of a network slice in accordance with any one or more of: traffic load of a radio access network or a traffic load of a network slice of the radio access network crossing a threshold traffic load, optionally wherein the threshold traffic load is the traffic load at an access point (AP) or base station (BS) in the radio access network (RAN); and/or a number of active user equipments (UEs) operating on a radio access network or a network slice of the radio access network crossing a threshold number of active UEs; in accordance with maintaining a service continuality requirement of a moving UE in use on the radio access network or in use on a network slice of the radio access network; in accordance with meeting or maintaining a quality of service (QoS) requirement of a device in use on the radio access network or in use on a network slice of the radio access network, optionally wherein the QoS requirement includes but is not limited to an amount of latency of a wireless connection of the radio access network or network slice or a level of reliability of a wireless connection of the radio access network or network slice.

Advantages of example 267, or the other examples described herein, may include improved radio access network performance, efficiency, reliability, maintaining of service and quality of service, for all devices operating across the RAN, and within each slice of the RAN.

Example 268 may include the example of examples 267, or some other example herein, wherein a network slice is turned on at the access point (AP) or base station (BS), and wherein a trigger for turn-on of the network slice comprises: receiving a UE trigger signal from a UE, said UE trigger signal including an indication of an intended network slice for use by the UE, optionally wherein the UE trigger signal is included in a random access of the UE; or receiving, by a target access point (AP) or target base station (BS), a trigger signal from a peer access point (AP) or peer base station (BS), said trigger signal including a request for a network slice turn on at the target access point (AP) or base station (BS).

Example 269 may include the example of examples 267 or 268, or some other example herein, wherein turn-on of a network slice comprises an exchange of signaling between the access point (AP) or base station (BS) and a mobility management entity (MME) or network control entity, in order to turn-on the network slice.

Example 270 may include the example of examples 267-269, or some other example herein, wherein, in a traffic-load motivated network slice turn-on, an access point (AP) or base station (BS) only turns on a network slice when the access point (AP) or base station (BS) receives a sufficient amount of traffic to make the network slice turn-on worthwhile, wherein a sufficient amount of traffic is a predetermined value.

Example 271 may include the example of examples 267-270, or some other example herein, wherein if the amount of traffic is insufficient, the access point (AP) or base station (BS) refuses a random access (RA) request from a requesting entity.

Example 272 may include the example of examples 267-271, or some other example herein, wherein, in a QoS motivated network slice turn-on, an access point (AP) or base station (BS) only turns on a network slice when the access point (AP) or base station (BS) receives a QoS service request meeting a predefined criterion.

Example 273 may include a base station (BS) apparatus operable in a wireless communication network, the apparatus comprising: radio frequency (RF) circuitry to receive at least one communication originating from a wireless network device or transmit at least one communication to a wireless network device; and a radio access network control entity according to any of example herein; or a device comprising means for, or modules to carry out, any example herein; or the device of any example herein.

Example 274 may include a user equipment (UE) apparatus operable in a wireless communication network, the apparatus comprising: radio frequency (RF) circuitry to receive or transmit at least one communication to another device in the wireless communication network; and a radio access network control entity according to any example herein.

Example 275 may include an apparatus comprising means to perform one or more elements of a method described in or related to any method or process described herein.

Example 276 may include one or more non-transitory computer-readable media comprising instructions to cause an electronic device, upon execution of the instructions by one or more processors of the electronic device, to perform one or more elements of a method described in or related to any example herein.

Example 277 may include an apparatus comprising logic, modules, means for and/or circuitry to perform one or more elements of a method described in or related to any method or process described herein.

Example 278 may include an apparatus comprising: one or more processors and one or more computer readable media comprising instructions that, when executed by the one or more processors, cause the one or more processors to perform the method, techniques, or process as described in or related to any method or process described herein.

Example 279 may include a method of communicating in a wireless network as shown and described herein.

Example 280 may include a system for providing wireless communication as shown and described herein.

Example 281 may include a device for providing wireless communication as shown and described herein.

Example 282 may include a device to enable network slicing in a radio access network comprising any combination of the devices, entities or methods described herein, or portions of the devices, entities or methods described herein.

Example 283 may include a radio access network comprising any combination of the devices, entities or methods described herein, or portions of the devices, entities or methods described herein.

Example 284 may include a device for use in a radio access network comprising any combination of the devices, entities or methods described herein, or portions of the devices, entities or methods described herein.

Example 285 may include a system for horizontal computation resource slicing for sharing and computation offloading.

Example 286 may include the system of example 285 and/or some other examples herein, wherein a hypervisor runs on a computation platform, a radio access technology (RAT) runs on a modem circuitry, a radio link connects the modem circuitry at a client and a host, and a container connects the computation platform at the client and the host.

Example 287 may include the system of any one or more of examples 285-286 and/or some other examples herein, wherein the hypervisor is located beneath the operating system (OS).

Example 288 may include the system of any one or more of examples 285-287 and/or some other examples herein, wherein the hypervisor comprises the host and the client resident in disjoint mobile platforms.

Example 289 may include the system of any one or more of examples 285-288 and/or some other examples herein, wherein the host is located where an application is launched.

Example 290 may include the system of any one or more of examples 285-289 and/or some other examples herein, wherein, when an application computing requirement is exceeds a platform capability of the client, or a desired offload threshold is exceeded, the OS or optionally the application indicate to the client within the hypervisor, through the OS, to instruct the client within the hypervisor to take a desired action.

Example 291 may include the system of any one or more of examples 285-290 and/or some other examples herein, wherein the host hypervisor has a pre-authorized privilege to accommodate the client within the hypervisor to request and allocate computing and communication resources, wherein a process for requesting and allocating the computing and communication resources is set up at a platform initialization time, such as during a pairing process, or in real time on demand.

Example 292 may include the system of any one or more of examples 285-291 and/or some other examples herein, wherein the host within the hypervisor and the client within the hypervisor dynamically partition the computing and communication resources for a virtualized mobile computing and communication platform.

Example 293 may include the system of any one or more of examples 285-292 and/or some other examples herein, wherein, when there is executable software that is to be shared between the host and the client, an exchange of the executable software takes place or is transported inside the container.

Example 294 may include the system of any one or more of examples 285-293 and/or some other examples herein, wherein the exchange is implemented by: packing, by the client, the executable software into a first container; multiplexing, by the client, the first container with user traffic; exchanging, by the client, the multiplexed first container and user traffic over a radio link to the host through the modem circuitry; deploying and executing, by the host, the first container; packing, by the host, an execution outcome into a second container; transmitting, by the host, the execution outcome to the client via the radio link; and deploying, by the client, the second container to apply the execution outcome.

Example 295 may include the system of any one or more of examples 285-294 and/or some other examples herein, wherein the communication layer including the modem circuitry treats the first container as a block of data without processing and treats the second container as a block of data without processing.

Example 296 may include the system of any one or more of examples 285-295 and/or some other examples herein, wherein an interaction between the hypervisor and the radio link control may include one or more of: providing, by the hypervisor, explicit signals to the radio link indicating communication requirements, wherein a radio link control allocations appropriate channel and radio access scheme to transmit the first container and/or the second container based on the communication requirements; and/or providing, by the hypervisor, a header of the first container and/or the second container for the modem circuitry to decode and match the first container and/or the second container to the channel and radio access scheme accordingly.

Example 297 may include the system of example 296 and/or some other examples herein, wherein the hypervisor is to direct the operation of the modem circuitry.

Example 298 may include the system of example 296 and/or some other examples herein, wherein the hypervisor and the modem circuitry are peers, and wherein a handshake process between the hypervisor and the modem circuitry is to take place.

Example 299 may include a method to be performed by a client, the method comprising: generating a first container including executable software; multiplexing the first container with network data to be transmitted over a radio link; transmitting or causing to transmit the multiplexed first container and network data over the radio link to a host, receiving or causing to receive, over the radio link, a second container including an execution output, wherein the execution output is a result of execution of the executable software; applying or causing to apply the execution output.

Example 300 may include the method of example 299 and/or some other examples herein, wherein the host is to obtain the executable software from the first container, execute the executable software to obtain the execution output, and generate the second container including the execution output.

Example 301 may include the method of any one of examples 299-300 and/or some other examples herein, wherein the client and the host are located in a hypervisor, wherein the hypervisor is resident in disjoint mobile platforms.

Example 302 may include the method of any one of examples 299-301 and/or some other examples herein, wherein the host is located where an application is launched.

Example 303 may include the method of any one of examples 299-302 and/or some other examples herein, further comprising: receiving or causing to receive, via a hypervisor of the client ("client hypervisor"), an instruction to take a desired (e.g. specified) action when computing requirements of the application are exceed a platform capability of the client or based on one or more other criteria.

Example 304 may include the method of any one of examples 299-303 and/or some other examples herein, further comprising: transmitting or causing to transmit, by the hypervisor of the client, a request for allocation of computing and communication resources, wherein a portion of the hypervisor including the host has authorization to accommodate the client hypervisor request for allocation of computing and communication resources.

Example 305 may include the method of example 304 and/or some other examples herein, wherein a process including the request for allocation and the allocation of the computing and communication resources is set up during platform initialization or in real time per demand.

Example 306 may include the method of example 305 and/or some other examples herein, wherein the client is disposed in a wearable user equipment (UE) and the host is disposed in a portable UE, and wherein the platform initialization is to take place during a pairing process between the wearable UE and the portable UE.

Example 307 may include the method of any one or more of examples 304-306 and/or some other examples herein, wherein the host hypervisor and client hypervisor dynamically partition the computing and communication resources for a virtualized mobile computing and communication platform.

Example 308 may include the method of any one or more of examples 304-307 and/or some other examples herein, wherein the hypervisor is to explicitly signal to baseband circuitry and/or radio frequency (RF) circuitry indicating communication requirements, wherein the baseband circuitry and/or RF circuitry is to control allocation of appropriate channel and radio access schemes to transmit the first container.

Example 309 may include the method of any one or more of examples 304-307 and/or some other examples herein, wherein the hypervisor is to provide a header of the first container for baseband circuitry to decode and match the first container to a corresponding channel and radio access scheme.

Example 310 may include the method of any one or more of examples 299-309 and/or some other examples herein, wherein the hypervisor is to direct one or more operations of the baseband circuitry.

Example 311 may include the method of any one or more of examples 299-309 and/or some other examples herein, wherein the hypervisor and the baseband circuitry are peers that are to perform handshake processes for transmitting the first container and/or receiving the second container.

Example 312 may include the method of any one of examples 299-305 and 307-311 and/or some other examples herein, wherein the client is disposed in a portable UE and the host is disposed in an evolved nodeB (eNB) or wherein the client is disposed in a wearable user equipment (UE) and the host is disposed in a portable UE.

Example 313 may include a method to be performed by a host, the method comprising: receiving or causing to receive a first container including executable software over a radio link from a client; decoding or causing to decode the first container to obtain the executable software; executing or causing to execute the executable software to obtain an execution output; generating a second container including the execution output; multiplexing the second container with network data to be transmitted over the radio link; transmitting or causing to transmit, over the radio link to the client, the second container including the execution output, wherein the client is to apply the execution output.

Example 314 may include the method of example 313 and/or some other examples herein, wherein, wherein the client is to generate the first container, and multiplex the first container with other network data to be transmitted over the radio link.

Example 315 may include the method of any one of examples 313-314 and/or some other examples herein, wherein the client and the host are located in a hypervisor, wherein the hypervisor is resident in disjoint mobile platforms.

Example 316 may include the method of any one of examples 313-315 and/or some other examples herein, wherein the host is located where an application is launched.

Example 317 may include the method of any one of examples 313-316 and/or some other examples herein, wherein an application of the client or an operating system (OS) is to provide, to a hypervisor of the client ("client hypervisor"), an instruction to take a desired (e.g. specified) action when computing requirements of the application are exceed a platform capability of the client or based on one or more other criteria.

Example 318 may include the method of any one of examples 313-317 and/or some other examples herein, further comprising: receiving or causing to receive, from the client hypervisor, a request for allocation of computing and communication resources, wherein a portion of the hypervisor including the host ("host hypervisor") includes authorization to accommodate the client hypervisor request for allocation of computing and communication resources; and allocating the computing and communication resources according to the request.

Example 319 may include the method of example 318 and/or some other examples herein, wherein a process including the request for allocation and the allocation of the computing and communication resources is set up during platform initialization or in real time on demand.

Example 320 may include the method of example 319 and/or some other examples herein, wherein the client is disposed in a wearable user equipment (UE) and the host is disposed in a portable UE, and wherein the platform initialization is to take place during a pairing process between the wearable UE and the portable UE.

Example 321 may include the method of any one or more of examples 313-320 and/or some other examples herein, wherein the host hypervisor and client hypervisor dynamically partition the computing and communication resources for a virtualized mobile computing and communication platform.

Example 322 may include the method of any one or more of examples 313-320 and/or some other examples herein, wherein the hypervisor is to explicitly signal to baseband circuitry and/or radio frequency (RF) circuitry indicating communication requirements, wherein the baseband circuitry and/or RF circuitry is to control allocation of appropriate channel and radio access schemes to transmit the first container.

Example 323 may include the method of any one or more of examples 313-320 and/or some other examples herein, wherein the hypervisor is to provide a header of the first container for baseband circuitry to decode and match the first container to a corresponding channel and radio access scheme.

Example 324 may include the method of any one or more of examples 313-323 and/or some other examples herein, wherein the hypervisor is to direct one or more operations of the baseband circuitry.

Example 325 may include the method of any one or more of examples 313-323 and/or some other examples herein, wherein the hypervisor and the baseband circuitry are peers that are to perform handshake processes for transmitting the first container and/or receiving the second container.

Example 326 may include the method of any one of examples 313-319 and 321-325 and/or some other examples herein, wherein the client is disposed in a portable UE and the host is disposed in an evolved nodeB (eNB) or wherein the client is disposed in a wearable user equipment (UE) and the host is disposed in a portable UE.

Example 327 may include an apparatus to be implemented in or by a client, the apparatus comprising: application circuitry to generate a first container including executable software; and multiplex the first container with network data to be transmitted over a radio link; baseband circuitry to control radio frequency (RF) circuitry to transmit the multiplexed first container and network data over the radio link to a host; and receive, over the radio link, a second container including an execution output, wherein the execution output is a result of execution of the executable software, and wherein the application circuitry is to apply the execution output.

Example 328 may include the apparatus of example 327 and/or some other examples herein, wherein the host is to obtain the executable software from the first container, execute the executable software to obtain the execution output, and generate the second container including the execution output.

Example 329 may include the apparatus of any one of examples 327-328 and/or some other examples herein, wherein the client and the host are located in a hypervisor, wherein the hypervisor is resident in disjoint mobile platforms.

Example 330 may include the apparatus of any one of examples 327-329 and/or some other examples herein, wherein the host is located where an application is launched.

Example 331 may include the apparatus of any one of examples 327-330 and/or some other examples herein, wherein the baseband circuitry is to control the RF circuitry and/or the application circuitry is to receive an instruction to take a desired action when computing requirements of the application are exceed a platform capability of the client or based on one or more other criteria.

Example 332 may include the apparatus of any one of examples 327-331 and/or some other examples herein, wherein the client hypervisor is to provide a request for allocation of computing and communication resources, wherein the hypervisor of the host ("host hypervisor") has authorization to accommodate the client hypervisor request for allocation of computing and communication resources.

Example 333 may include the apparatus of example 332 and/or some other examples herein, wherein a process including the request for allocation and the allocation of the computing and communication resources is set up during platform initialization or in real time on demand.

Example 334 may include the apparatus of example 333 and/or some other examples herein, wherein the client is disposed in a wearable user equipment (UE) and the host is disposed in a portable UE, and wherein the platform initialization is to take place during a pairing process between the wearable UE and the portable UE.

Example 335 may include the apparatus of any one or more of examples 327-334 and/or some other examples herein, wherein the host hypervisor and client hypervisor dynamically partition the computing and communication resources for a virtualized mobile computing and communication platform.

Example 336 may include the apparatus of any one or more of examples 327-335 and/or some other examples herein, wherein the hypervisor is to explicitly signal the baseband circuitry and/or the RF circuitry to indicate communication requirements, wherein the baseband circuitry and/or the RF circuitry is to control allocation of appropriate channel and radio access schemes to transmit the first container.

Example 337 may include the apparatus of any one or more of examples 327-335 and/or some other examples herein, wherein the hypervisor is to provide a header of the first container for baseband circuitry to decode and match the first container to a corresponding channel and radio access scheme.

Example 338 may include the apparatus of any one or more of examples 327-338 and/or some other examples herein, wherein the hypervisor is to direct one or more operations of the baseband circuitry.

Example 339 may include the apparatus of any one or more of examples 43-53 and/or some other examples herein, wherein the hypervisor and the baseband circuitry are peers that are to perform handshake processes for transmitting the first container and/or receiving the second container.

Example 340 may include the apparatus of any one of examples 327-333 and 335-339 and/or some other examples herein, wherein the client is disposed in a portable UE and the host is disposed in an evolved nodeB (eNB) or wherein the client is disposed in a wearable user equipment (UE) and the host is disposed in a portable UE.

Example 341 may include an apparatus to be implemented in or by a host, the apparatus comprising: radio frequency (RF) circuitry to receive a first container including executable software over a radio link from a client; baseband circuitry to decode the first container to obtain the executable software; and application circuitry or the baseband circuitry to execute the executable software to obtain an execution output; generate a second container including the execution output; and multiplex the second container with network data to be transmitted over the radio link, wherein the RF circuitry is to transmit, over the radio link to the client, the second container including the execution output, wherein the client is to apply the execution output.

Example 342 may include the apparatus of example 341 and/or some other examples herein, wherein the client is to generate the first container, and multiplex the first container with other network data to be transmitted over the radio link.

Example 343 may include the apparatus of any one of examples 341-342 and/or some other examples herein, wherein the client and the host are located in a hypervisor, wherein the hypervisor is resident in disjoint mobile platforms.

Example 344 may include the apparatus of any one of examples 341-343 and/or some other examples herein, wherein the host is located where an application is launched.

Example 345 may include the apparatus of any one of examples 341-344 and/or some other examples herein, wherein an application or an operating system (OS) including a portion of the hypervisor including the client ("client hypervisor") is to provide an instruction to take a desired action when computing requirements of the application are exceed a platform capability of the client or based on one or more other criteria.

Example 346 may include the apparatus of any one of examples 341-345 and/or some other examples herein, further comprising: receiving or causing to receive, from the client hypervisor, a request for allocation of computing and communication resources, wherein a portion of the hypervisor including the host ("host hypervisor") includes authorization to accommodate the client hypervisor request for allocation of computing and communication resources; and allocating the computing and communication resources according to the request.

Example 347 may include the apparatus of example 346 and/or some other examples herein, wherein a process including the request for allocation and the allocation of the computing and communication resources is set up during platform initialization or in real time on demand.

Example 348 may include the apparatus of example 347 and/or some other examples herein, wherein the client is disposed in a wearable user equipment (UE) and the host is disposed in a portable UE, and wherein platform initialization is to take place during a pairing process between the wearable UE and the portable UE.

Example 349 may include the apparatus of any one or more of examples 341-348 and/or some other examples herein, wherein the host hypervisor and client hypervisor dynamically partition the computing and communication resources for a virtualized mobile computing and communication platform.

Example 350 may include the apparatus of any one or more of examples 341-349 and/or some other examples herein, wherein the hypervisor is to explicitly signal to baseband circuitry and/or radio frequency (RF) circuitry indicating communication requirements, wherein the baseband circuitry and/or RF circuitry is to control allocation of appropriate channel and radio access schemes to transmit the first container.

Example 351 may include the apparatus of any one or more of examples 341-349 and/or some other examples herein, wherein the hypervisor is to provide a header of the first container for baseband circuitry to decode and match the first container to a corresponding channel and radio access scheme.

Example 352 may include the apparatus of any one or more of examples 341-351 and/or some other examples herein, wherein the hypervisor is to direct one or more operations of the baseband circuitry.

Example 353 may include the apparatus of any one or more of examples 341-351 and/or some other examples herein, wherein the hypervisor and the baseband circuitry are peers that are to perform handshake processes for transmitting the first container and/or receiving the second container.

Example 354 may include the apparatus of any one of examples 341-347 and 349-353 and/or some other examples herein, wherein the client is disposed in a portable UE and the host is disposed in an evolved nodeB (eNB) or wherein the client is disposed in a wearable user equipment (UE) and the host is disposed in a portable UE.

Example 355 may include a device for use in a first wireless network device operating within a wireless network, comprising: radio frequency (RF) circuitry to receive at least one communication originating from a second wireless network device or transmit at least one communication to the second wireless network device; and circuitry to: provide a data container including at least a portion of executable code of use to the first device; transmit the data container together with other data to be transmitted from the first device to the second device; receive a processed version of the data container from the second device, said processed version containing an executed form of the executable code of use to the first device; use the executed form of the executable code in the first device.

Example 356 may include a device for use in a first wireless network device operating within a wireless network, comprising: radio frequency (RF) circuitry to receive at least one communication originating from a second wireless network device or transmit at least one communication to the second wireless network device; and circuitry to: receive a data container including at least a portion of executable code of use to the first device together with other data to be transmitted from the first device to the second device; process the data container including the at least a portion of executable code of use to the first device; transmit a processed version of the data container from the second device to the first device, said processed version containing an executed form of the executable code of use to the first device.

Example 357 may include the device of any one or more of examples 355-356 and/or some other examples herein, wherein to provide the data container, transmit the data container or receive the processed version of the data container are transparent processes that treat the data container as a block of data to be transmitted or received.

Example 358 may include the device of any one or more of examples 355-357 and/or some other examples herein, wherein the circuitry is further to: indicate a communication requirement to the first or second device.

Example 359 may include the device of any one or more of examples 355-358 and/or some other examples herein, wherein the first device and the second device are peers using a handshaking protocol to direct actions carried out by each of the first device and the second device.

Example 360 may include the device of any one or more of examples 355-359 and/or some other examples herein, wherein the circuitry comprises a hypervisor.

Example 361 may include the device of any one or more of examples 355-360 and/or some other examples herein, wherein the hypervisor is to direct the actions of a modem to transmit or receive the data container, and/or transmit or receive the processed data container.

Example 362 may include the device of any one or more of examples 355-361 and/or some other examples herein, wherein the hypervisor is to provide a header on the data container, wherein the header is decodable by the modem and contains data indicative to the modem of which channel and radio access scheme are in use or to be used for the transmit and/or receive of the data container, or processed data container.

Example 363 may include the device of any one or more of examples 355-362 and/or some other examples herein, wherein the hypervisor is to signal a radio link indicating a communications requirement before transmitting or receiving the data container or transmitting or receiving the processed data container.

Example 364 may include the device of example 363 and/or some other examples herein, wherein an air link control entity is to allocate a channel, a radio access scheme, or another wireless communications parameter that is appropriate to transmit or receive the data container or processed data container based upon the communications requirement.

Example 365 may include the device of any one or more of examples 355-364 or some other examples herein, wherein to transmit or receive the data container together with other data to be transmitted or received from the first device to the second device further comprises multiplexing the data with the other data to be transmitted from the first device to the second device.

Example 366 may include the device of any one or more of examples 355-365 or some other examples herein, wherein the circuitry is to provide a header on the data container, wherein the header is decodable by the modem and contains data indicative to the modem of which channel and radio access scheme are in use or to be used.

Example 367 may include the device of any one or more of examples 355-366 or some other examples herein, wherein the executable code of use to the first device is data that has been sensed by the first device or data that is useable by the first device but wherein the first device does not have, or currently have, sufficient processing resources to process the data or to process the data within a time period in which the data is relevant to the first device.

Example 368 may include the device of any one or more of examples 355-367 or some other examples herein, wherein the data container is a packetized data structure transmittable between devices in the wireless network.

Example 369 may include the device of any one or more of examples 355-368 or some other examples herein, wherein the first device and the second device are resident in, or comprise, apparatus having processing resources of disparate processing capabilities.

Example 370 may include the device of any one or more of examples 355-369 or some other examples herein, wherein the first device and the second device are resident in, or comprise, apparatus having processing resources of substantially equal processing capabilities.

Example 371 may include the device of any one or more of examples 359-370 or some other examples herein, wherein the hypervisor is a function logically located below an Operating System (OS) of a respective first or second device.

Example 372 may include the device of any one or more of examples 355-371 or some other examples herein, wherein the first device is definable as a device operating in the wireless network, and in which an application that is to make use of the data container is first launched or is currently executing.

Example 373 may include the device of any one or more of examples 355-372 or some other examples herein, wherein an OS instigates a use of the data container between devices when the application making use of the data container requires data processing resources that exceeds the current capabilities of the first device in which an application making use of the data container is first launched or is currently executing.

Example 374 may include the device of any one or more of examples 359-373 or some other examples herein, wherein the hypervisor has pre-authorized access to the processing resources of the second device.

Example 375 may include the device of example 374 or some other examples herein, wherein the pre-authorization occurs at wireless network setup, wireless network power-on, device setup, device power-on, device pairing to the wireless network, or at any point in time prior to the use of the pre-authorization.

Example 376 may include the device of any one or more of examples 360-374 or some other examples herein, wherein the hypervisor is to request authorization to access the processing resources of the second device as part of each transmit of data container.

Example 377 may include the device of any one or more of examples 355-376 or some other examples herein, wherein the first device comprises a host device and the second device comprises a client device, or the first device comprises a client device and the second device comprises a host device.

Example 378 may include the device of any one or more of examples 355-377 or some other examples herein, wherein a hypervisor in the first device and a hypervisor in the second device negotiate and dynamically partition computing resources available in the first and second device respectively, and provide the partitioned computing resources of the first and second devices to a horizontal network slice.

Example 379 may include the device of any one or more of examples 355-378 or some other examples herein, wherein the first or second device is operable to provide horizontal network slicing of the wireless network.

Example 380 may include the device of any one or more of examples 355-379 or some other examples herein, wherein the data container is a first data container and the processed data container is a second data container, wherein the first data container is similar in format to the first data container, but wherein a data contained in the first data container is executable code before execution and a data contained in the second data container is an executed form of the executable data, after execution.

Example 381 may include a base station (BS) apparatus operable in a wireless communication network, the apparatus comprising: radio frequency (RF) circuitry to receive at least one communication originating from a wireless network device or transmit at least one communication to a wireless network device; and a device comprising means for, or modules to carry out, any method or process described herein; or the device described herein.

Example 382 may include a user equipment (UE) apparatus operable in a wireless communication network, the apparatus comprising: radio frequency (RF) circuitry to receive or transmit at least one communication to another device in the wireless communication network; and a device comprising means for, or modules to carry out, any one or more method or process described herein; or the device of any device described herein.

Example 383 may include an apparatus comprising means to perform one or more elements of a method described in or related to any method or process described herein.

Example 384 may include one or more computer-readable media comprising instructions to cause an electronic device, upon execution of the instructions by one or more processors of the electronic device, to perform one or more elements of a method described in or related to any method or process described herein, or to provide the functionality of any other device described herein.

Example 385 may include an apparatus comprising logic, modules, and/or circuitry to perform one or more elements of a method described in or related to any method or process described herein.

Example 386 may include an apparatus comprising: one or more processors and one or more computer readable media comprising instructions that, when executed by the one or more processors, cause the one or more processors to perform the method of any method or process described herein.

Example 387 may include a method of communicating in a wireless network as shown and described herein.

Example 388 may include a system for providing wireless communication as shown and described herein.

Example 389 may include a device for providing wireless communication as shown and described herein.

Example 390 may include a device to enable network slicing in a radio access network comprising any combination of the devices, entities or methods described herein, or portions of the devices, entities or methods described herein.

Example 391 may include a radio access network comprising any combination of the devices, entities or methods described herein, or portions of the devices, entities or methods described herein.

Example 392 may include a device for use in a radio access network comprising any combination of the devices, entities or methods described herein, or portions of the devices, entities or methods described herein.

Example 393 may include a method of baseband unit (BBU) and remote radio head (RRH) function partition to enable network slicing with different deployment scenarios.

Example 394 may include the method of example 393 or some other example herein, wherein an evolved nodeB (eNB) will perform the BBU and RRH function partition using scheduling information for each network slice. The eNB is merely one example of a base station.

Example 395 may include the method of example 394 or some other example herein, wherein the eNB performs common public radio interface (CPRI)-like and/or CPRI-advanced or physical Layer (PHY) split BBU and RRH function partition to frequency/time resources scheduled for mobile broadband services with advanced multiple input and multiple output (MIMO) scheme and medium/high bandwidth (BW) front-haul.

Example 396 may include the method of example 394 or some other example herein, wherein the eNB will perform Layer-2 (L2)/Layer-3 (L3) BBU and RRH function partition to frequency/time resources scheduled for low latency service such as mission critical internet of things (IoT) applications and/or devices.

Example 397 may include the method of example 394 or some other example herein, wherein the eNB performs a CPRI-like, PHY split, remote PHY, or L2/L3 split BBU and RRH functional split to frequency/time resources scheduled for massive machine type communications (MTC) service or mobile broadband service.

Example 398 may include the method of example 393 or some other example herein, wherein the eNB performs front-haul packetization using scheduling information for each network slice.

Example 399 may include the method of example 398 or some other example herein, wherein the eNB performs front-haul packetization procedure defined for CPRI-like or PHY split BBU and RRH partition, to the frequency/time resource scheduled to support advanced MIMO scheme like coordinated multipoint (CoMP), beam aggregation, cell-less operation, etc.

Example 400 may include the method of example 398 or some other example herein, wherein the eNB performs front-haul packetization procedure defined for L2/L3 BBU and RRH partition, to the frequency/time resource scheduled for extreme delay sensitive application such as mission critical IoT applications or mission critical IoT devices.

Example 401 may include the method of example 398 or some other example herein, wherein the eNB performs front-haul packetization procedure including CPRI-like, PHY split, remote PHY, L2/L3 split, etc., based on front-haul BW and delay to the frequency/time resource scheduled for massive IoT and mobile broad band service.

Example 402 may include a method comprising: dividing network resources into one or more slices wherein each of the one or more slices correspond to a service to be provided by a radio access network (RAN); and providing the network resources of a slice of the one or more slices according to a corresponding service to be provided.

Example 403 may include the method of example 402 or some other example herein, wherein the dividing includes defining a first slice of the one or more slices is associated with massive internet of things (IoT) applications and/or IoT devices and defining a second slice of the one or more slices is associated with mobile broadband services, and wherein the providing includes allocating a narrow subcarrier spacing or code division multiple access (CDMA) waveform over a desired time/frequency grid to services associated with the first slice, and allocating an orthogonal frequency division multiplexing (OFDM) waveform with a larger subcarrier spacing to services associated with the second slice.

Example 404 may include the method of example 403 or some other example herein, wherein the providing includes allocating network resources for high throughput requirement to the services associated with second slice and allocating low latency resource to services associated with the first slice.

Example 405 may include the method of example 402 or some other example herein, further comprising: determining, for a transmission time interval (TTI), frequency resources for each of the one or more slices; determining whether a service associated with the TTI is a service with massive connections; and selecting a radio access network (RAN) split when it is determined that the service associated with the TTI is a service with massive connections and based on a front-haul rate.

Example 406 may include the method of example 402 or some other example herein, wherein the RAN split includes one of a common public radio interface (CPRI)-like, PHY split, remote PHY, or L2/L3 split, baseband unit (BBU) and remote radio head (RRH) functional split to frequency/time resources Example 407 may include the method of example 405 or some other example herein, further comprising: determining whether the service associated with the TTI is a service beam aggregation; and packetizing front-haul packets using a split PHY architecture when the service associated with the TTI is a service using beam aggregation.

Example 408 may include the method of example 407 or some other example herein, further comprising: determining whether the service associated with the TTI is a mission critical service; and using the L2/L3 split when the when the service associated with the TTI is a mission critical service.

Example 409 may include the method of example 406 or some other example herein, wherein the selecting comprises selecting the RAN split when it is determined that the service associated with the TTI is a service with massive connections and based on a front-haul bandwidth (BW) and front-haul delay, and wherein each RAN split includes a corresponding data packetization format.

Example 410 may include the method of example 406 or some other example herein, wherein further comprising: determining whether the service associated with the TTI is a service beam aggregation; using corresponding resource blocks (RBs) for the beam aggregation; selecting a CPRI-advanced RAN split when the front-haul includes a high BW and low latency; and selecting an I/Q quantization and/or a compression scheme RAN split when the front-haul includes a medium BW and low latency.

Example 411 may include the method of example 409 or some other example herein, wherein further comprising: determining whether the service associated with the TTI is a delay sensitive service; and selecting a media access control (MAC) protocol data unit (PDU) front-haul.

Example 412 may include an apparatus comprising: network interface controller (NIC) circuitry to divide network resources into one or more slices wherein each of the one or more slices correspond to a service to be provided by a radio access network (RAN); and network interface circuitry to provide the network resources of a slice of the one or more slices according to a corresponding service to be provided.

Example 413 may include the apparatus of example 412 or some other example herein, wherein to divide network resources, the NIC circuitry is to define a first slice of the one or more slices is associated with massive internet of things (IoT) applications and/or IoT devices and define a second slice of the one or more slices is associated with mobile broadband services, and wherein to provide the network resources, the network interface circuitry is to allocate a narrow subcarrier spacing or code division multiple access (CDMA) waveform over a desired time/frequency grid to services associated with the first slice, and allocate an orthogonal frequency division multiplexing (OFDM) waveform with a larger subcarrier spacing to services associated with the second slice.

Example 414 may include the apparatus of example 413 or some other example herein, wherein to provide the network resources, the network interface circuitry is to allocate network resources for high throughput requirement to the services associated with second slice and allocate low latency resource to services associated with the first slice.

Example 415 may include the apparatus of example 412 or some other example herein, wherein the NIC circuitry is to determine, for a transmission time interval (TTI), frequency resources for each of the one or more slices; determine whether a service associated with the TTI is a service with massive connections; and select a radio access network (RAN) split when it is determined that the service associated with the TTI is a service with massive connections and based on a front-haul rate.

Example 416 may include the apparatus of example 412 or some other example herein, wherein the RAN split includes one of a common public radio interface (CPRI)-like, PHY split, remote PHY, or L2/L3 split, baseband unit (BBU) and remote radio head (RRH) functional split to frequency/time resources.

Example 417 may include the apparatus of example 415 or some other example herein, the NIC circuitry is to determine whether the service associated with the TTI is a service beam aggregation; and packetize front-haul packets using a split PHY architecture when the service associated with the TTI is a service using beam aggregation.

Example 418 may include the apparatus of example 417 or some other example herein, the NIC circuitry is to determine whether the service associated with the TTI is a mission critical service; and use the L2/L3 split when the when the service associated with the TTI is a mission critical service.

Example 419 may include the apparatus of example 416 or some other example herein, wherein to select, the NIC circuitry is to select the RAN split when it is determined that the service associated with the TTI is a service with massive connections and based on a front-haul bandwidth (BW) and front-haul delay, and wherein each RAN split includes a corresponding data packetization format.

Example 420 may include the apparatus of example 419 or some other example herein, the NIC circuitry is to determine whether the service associated with the TTI is a service beam aggregation; use corresponding resource blocks (RBs) for the beam aggregation; selecting a CPRI-advanced RAN split when the front-haul includes a high BW and low latency; and select an I/Q quantization and/or a compression scheme RAN split when the front-haul includes a medium BW and low latency.

Example 421 may include the apparatus of example 419 or some other example herein, the NIC circuitry is to determine whether the service associated with the TTI is a delay sensitive service; and select a media access control (MAC) protocol data unit (PDU) front-haul.

Example 422 may include the apparatus of examples 412-421 or some other example herein, wherein the services are to be provided by the RAN and the apparatus is to be implemented in an electronic device associated with the RAN and the network resource allocation according to examples 412-421 is to be provided to one or more evolved nodeBs (eNBs) via the network interface circuitry.

Example 423 may include an apparatus comprising: network interface circuitry to receive a division of network resources into one or more slices wherein each of the one or more slices correspond to a service to be provided by a radio access network (RAN); and baseband circuitry to allocate the network resources of a slice of the one or more slices according to the division.

Example 424 may include the apparatus of example 423 or some other example herein, wherein the apparatus is to be implemented in an evolved nodeB (eNB).

Example 425 may include the apparatus of example 423 or some other example herein, wherein the apparatus is to be implemented in a device served by the wireless network, such as a User Equipment (UE).

Example 426 may include a radio access network (RAN) control entity apparatus operable in a wireless communication network, the apparatus comprising: radio frequency (RF) circuitry to receive at least one communication originating from a wireless network device or transmit at least one communication to a wireless network device; wherein the RAN control entity is coupled to a baseband unit (BBU) and remote radio head (RRH); and circuitry to: partition a physical RAN infrastructure or C-RAN into one or more network slices; and partition the BBU and/or RRH according to a deployment scenario of the one or more network slices.

Example 427 may include the apparatus of example 426 or some other example herein, wherein the circuitry is further to partition the BBU and/or RRH according to a deployment scenario of the one or more network slices using scheduling information of each of the one or more networks slice in, or to be in, operation on the physical radio access network, or C-RAN.

Example 428 may include the apparatus of examples 426-427 or some other example herein, wherein the circuitry is further to partition the BBU and/or RRH according to a deployment scenario of the one or more network slices using any one or more of: a common public radio interface (CPRI)-like/CPRI-advanced technique; a physical Layer (PHY) split technique across the BBU and RRH.

Example 429 may include the apparatus of examples 426-428 or some other example herein, wherein the circuitry is to partition the BBU and/or RRH to partition the wireless network resources of the wireless network, where the wireless resources include frequency/time resources and/or physical resource block (PRBs).

Example 430 may include the apparatus of examples 426-429 or some other example herein, wherein the wireless network resources are partitioned according to a vertical slice or horizontal slice.

Example 431 may include the apparatus of examples 426-430 or some other example herein, wherein a vertical slice is mobile broadband service using an advanced multiple in multiple out (MIMO) scheme and a medium to high bandwidth front-haul.

Example 432 may include the apparatus of examples 426-431 or some other example herein, wherein the circuitry is to partition the BBU and/or RRH according to parameters of the vertical or horizontal network slice.

Example 433 may include the apparatus of examples 421-432 or some other example herein, wherein the parameters of the vertical or horizontal network slice include any one or more of: a data rate; a data bandwidth; a number of devices to be served; a latency; a mission criticality; a delay; a quality of service (QoS); a network profile of a service.

Example 434 may include the apparatus of examples 421-432 or some other example herein, wherein the circuitry is further to determine or carry out front-haul packetization using scheduling information for or of each network slice.

Example 435 may include the apparatus of example 434 or some other example herein, wherein is further to determine or carry out front-haul packetization procedure defined by any of: a common public radio interface (CPRI)-like/CPRI-advanced technique; and a physical Layer (PHY) split technique across the BBU and RRH.

Example 436 may include the apparatus of example 435 or some other example herein, wherein the circuitry is further to determine or carry out front-haul packetization procedure defined by a frequency/time resource schedule that supports an advanced MIMO technique, wherein the technique may include any one or more of CoMP, beam aggregation or cell-less operation.

Example 437 may include the apparatus of example 435 or some other example herein, wherein the circuitry is further to determine or carry out front-haul packetization procedure defined by a frequency/time resource schedule or technique that supports any of: a mission criticality, delay or bandwidth.

Example 438 may include the apparatus of example 437 or some other example herein, wherein mission criticality applies to a delay sensitive application.

Example 439 may include the apparatus of example 437 or some other example herein, wherein the apparatus comprises a base station.

Example 440 may include the apparatus of example 449 or some other example herein, wherein the base station comprises an enhanced-Node B (eNB).

Example 441 may include the apparatus of examples 426 to 440 or some other example herein, wherein a vertical network slice comprises any one or more of: a logical partition of a physical radio access network infrastructure for or in exclusive use of a single type of communication; a logical partition of a physical radio access network infrastructure for or in exclusive use by communications of a specific use-case of communication; a logical partition of a physical radio access network infrastructure having self-contained operation and traffic flow independent of operation and traffic flow on any other logical partition of the physical radio access network infrastructure; and wherein a horizontal network slice comprises a logical partition of a computational resource of at least one device operating in the RAN, wherein the at least one device comprises a base station, a controller, or a device being served by the RAN.

Example 442 may include a user equipment for use with a radio access network (RAN) control entity apparatus operable in a wireless communication network, the apparatus comprising: radio frequency (RF) circuitry to receive at least one communication originating from a wireless network device under control of the RAN control entity or transmit at least one communication to a wireless network device under control of the RAN control entity; wherein the RAN control entity comprises the apparatus of any of examples 426 to 441 or some other example herein.

Example 443 may include one or more computer-readable media comprising instructions to cause an electronic device, upon execution of the instructions by one or more processors of the electronic device, to perform one or more elements of a method in a radio access network (RAN) of a wireless communication network, the method comprising: partitioning a physical RAN infrastructure or C-RAN into one or more network slices; and partitioning the BBU and/or RRH according to a deployment scenario of the one or more network slices.

Example 444 may include the method of example 443 or some other example herein, wherein the method further comprises partitioning the BBU and/or RRH according to a deployment scenario of the one or more network slices using scheduling information of each of the one or more networks slice in, or to be in, operation on the physical radio access network, or C-RAN.

Example 445 may include the method of examples 443-444 or some other example herein, wherein the method further comprises partitioning the BBU and/or RRH according to a deployment scenario of the one or more network slices using any one or more of: a common public radio interface (CPRI)-like/CPRI-advanced technique; a physical Layer (PHY) split technique across the BBU and RRH.

Example 446 may include the method of examples 443-445 or some other example herein, wherein the method further comprises partitioning n the BBU and/or RRH to partition the wireless network resources of the wireless network, where the wireless resources include frequency/time resources and/or physical resource block (PRBs).

Example 447 may include the method of examples 443-446 or some other example herein, wherein the wireless network resources are partitioned according to a vertical slice or horizontal slice.

Example 448 may include the method of examples 443-447 or some other example herein, wherein a vertical slice is mobile broadband service using an advanced multiple in multiple out (MIMO) scheme and a medium to high bandwidth front-haul.

Example 449 may include the method of examples 443-448 or some other example herein, the method further comprises partitioning the BBU and/or RRH according to parameters of the vertical or horizontal network slice.

Example 450 may include the method of examples 443-449 or some other example herein, wherein the parameters of the vertical or horizontal network slice include any one or more of: a data rate; a data bandwidth; a number of devices to be served; a latency; a mission criticality; a delay; a quality of service (QoS); a network profile of a service.

Example 451 may include the method of examples 443-450 or some other example herein, wherein the method further comprises determining or carrying out front-haul packetization using scheduling information for or of each network slice.

Example 452 may include the method of example 451 or some other example herein, wherein the method further comprises determining or carrying out a front-haul packetization procedure defined by any of: a common public radio interface (CPRI)-like/CPRI-advanced technique; and a physical Layer (PHY) split technique across the BBU and RRH.

Example 453 may include the method of example 452 or some other example herein, wherein the method further comprises determining or carrying out the front-haul packetization procedure defined by a frequency/time resource schedule that supports an advanced MIMO technique, wherein the technique may include any one or more of CoMP, beam aggregation or cell-less operation.

Example 454 may include the method of example 452 or some other example herein, wherein the method further comprises determining or carrying out the front-haul packetization procedure defined by a frequency/time resource schedule or technique that supports any of: a mission criticality, delay or bandwidth.

Example 455 may include the method of example 454 or some other example herein, wherein mission criticality applies to a delay sensitive application.

Example 456 may include the method of example 454 or some other example herein, wherein the method, or at least part thereof, executes in a Cloud-RAN (C-RAN), a RAN control entity, a base station, a device served by the RAN, a UE, a BBU or a RRH.

Example 457 may include the method of examples 453 to 456 or some other example herein, wherein a vertical network slice comprises any one or more of: a logical partition of a physical radio access network infrastructure for or in exclusive use of a single type of communication; a logical partition of a physical radio access network infrastructure for or in exclusive use by communications of a specific use-case of communication; a logical partition of a physical radio access network infrastructure having self-contained operation and traffic flow independent of operation and traffic flow on any other logical partition of the physical radio access network infrastructure; and wherein a horizontal network slice comprises a logical partition of a computational resource of at least one device operating in the RAN, wherein the at least one device comprises a base station, a controller, or a device being served by the RAN.

Example 458 may comprise one or more computer-readable media comprising instructions to cause an electronic device, upon execution of the instructions by one or more processors of the electronic device, to perform one or more elements of any methods described in or related to any method or process described herein, or to provide the functionality of any device described herein.

Example 459 may comprise an apparatus comprising logic, modules, means for and/or circuitry to perform one or more elements of a method described in or related to any method or process described herein.

Example 460 may comprise a method, technique, or process as described in or related to any of example or portions or parts thereof.

Example 461 may comprise an apparatus comprising: one or more processors and one or more computer readable media comprising instructions that, when executed by the one or more processors, cause the one or more processors to perform the method, techniques, or process as described in or related to any of example or portions thereof, or to provide the functionality of the apparatus or device described herein.

Example 462 may comprise a method of communicating in a wireless network as shown and described herein. Example 463 may comprise a system for providing wireless communication as shown and described herein. Example 464 may comprise a device for providing wireless communication as shown and described herein.

Example 463 may comprise one or more non-transitory computer-readable storage mediums that stores instructions for execution by one or more processors to perform wireless communications operations, the operations, when executed by the one more processors, to perform horizontal computation resource slicing of a plurality of computation resources, and perform sharing and computation offloading via the plurality of computation resources according to any horizontal computation resource slice.

Example 464 may comprise the subject matter of example 463, or any other example described herein, wherein the wireless communications system comprises a sliceable radio access network (RAN) architecture, and the operations further comprising operations to manage, via a RAN control entity, a control plane (c-plane) and a user plane (u-plane) of underlay RAN slices.

Example 465 may comprise the subject matter of any of examples 463-464, or any other example described herein, further comprising operations to identify an association of a c-plane slice, and identify an association of a single u-plane slice and the c-plane slice.

Example 466 may comprise the subject matter of any of examples 463-465, or any other example described herein, the operations further comprising operations to identify a first association of a first local component of a Radio Access Network (RAN) and a second remote component of the RAN, the first association corresponding to a network slice, and identify a second association of the first local component of the RAN and a third component of the RAN that is different than the second component of the RAN, the second association corresponding to the network slice, wherein the second association is based on at least one of traffic type, traffic load, or a Quality of Service (QoS) requirement.

Example 467 may comprise the subject matter of any of examples 463-466, or any other example described herein, the operations further comprising operations to provide mobile broadband (MBB) access and dedicated access for vertical markets or underlay networks.

Example 468 may comprise the subject matter of any of examples 463-467, or any other example described herein, the operations further comprising operations to execute baseband unit (BBU) and remote radio head (RRH) function partition to enable network slicing with different deployment scenarios.

Example 469 may comprise the subject matter of any of examples 463-468, or any other example described herein, wherein the one or more processors are included in an apparatus for an evolved nodeB (eNB), and the operations further comprising operations to perform baseband unit (BBU) and remote radio head (RRH) function partition utilizing, at least in part, scheduling information for each network slice.

Example 470 may comprise the subject matter of any of examples 463-469, or any other example described herein, the operations further comprising operations to perform hypervisor operations for a computation platform, provide a radio link to couple modem circuitry at a client device and a host device, the modem circuitry to include radio access technology (RAT) circuitry, and connect the computation platform at the client device and the host device via one or more containers.

Example 471 may comprise the subject matter of any of examples 463-470, or any other example described herein, the operations further comprising operations to execute vertical computation resource slicing of the plurality of computation resources.

Example 472 may comprise the subject matter of any of examples 463-470, or any other example described herein, at least one of a horizontal network slice or a vertical network slice is to comprise a core network slice, or an air interface slice.

Example 473 may comprise one or more apparatuses for a wireless communications system, comprising circuitry to execute horizontal computation resource slicing of a plurality of computation resources, and circuitry to execute sharing and computation offloading via the plurality of computation resources according to any horizontal computation resource slice.

Example 474 may comprise the subject matter of example 473, or any other example described herein, wherein the wireless communications system comprises a sliceable radio access network (RAN) architecture, and further comprises a RAN control entity managing a control plane (c-plane) and a user plane (u-plane) of underlay RAN slices.

Example 475 may comprise the subject matter of any of examples 473-474, or any other example described herein, further comprising circuitry to identify an association of a c-plane slice, and circuitry to identify an association of a single u-plane slice and the c-plane slice.

Example 476 may comprise the subject matter of any of examples 473-475, or any other example described herein, further comprising circuitry to identify a first association of a first local component of a Radio Access Network (RAN) and a second remote component of the RAN, the first association corresponding to a network slice, and circuitry to identify a second association of the first local component of the RAN and a third component of the RAN that is different than the second component of the RAN, the second association corresponding to the network slice, wherein the second association is based on at least one of traffic type, traffic load, or a Quality of Service (QoS) requirement.

Example 477 may comprise the subject matter of any of examples 473-476, or any other example described herein, further comprising circuitry to support mobile broadband (MBB) access and dedicated access for vertical markets or underlay networks.

Example 478 may comprise the subject matter of any of examples 473-477, or any other example described herein, further comprising circuitry to execute baseband unit (BBU) and remote radio head (RRH) function partition to enable network slicing with different deployment scenarios.

Example 479 may comprise the subject matter of any of examples 473-478, or any other example described herein, wherein the one or more apparatuses are of an evolved nodeB (eNB) to perform baseband unit (BBU) and remote radio head (RRH) function partition utilizing, at least in part, scheduling information for each network slice.

Example 480 may comprise the subject matter of any of examples 473-480, or any other example described herein, further comprising hypervisor circuitry included in a computation platform, radio access technology (RAT) circuitry included in a modem circuitry, a radio link to couple the modem circuitry at a client device and a host device, and container circuitry to connect the computation platform at the client device and the host device.

Example 481 may comprise the subject matter of any of examples 473-479, or any other example described herein, further comprising circuitry to execute vertical computation resource slicing of the plurality of computation resources.

Example 482 may comprise the subject matter of any of examples 473-481, or any other example described herein, wherein at least one of a horizontal network slice or a vertical network slice comprises a core network slice, or an air interface slice.

Examples use-cases/types of communications may include: Wireless/Mobile Broadband (MBB) communications; Extreme Mobile Broadband (E-MBB) communications; Real-time use-case such as Industrial Control communications, Machine-to-Machine communications (MTC/MTC1); non-real-time use-case, such as Internet-of-Things (IoT) sensors communications, or massive-scale Machine-to-Machine communications (M-MTC/MTC2); Ultra Reliable Machine-to-Machine communications (U-MTC); Mobile Edge Cloud, e.g. caching, communications; Vehicle-to-Vehicle (V2V) communications; Vehicle-to-Infrastructure (V2I) communications; Vehicle-to-anything communications (V2X). This is to say, the present disclosure relates to providing network slicing according to any readily definable/distinguishable type of communication that can be carried out over a wireless network.

In some examples, the radio access network (RAN) control entity is distributed across portions of the RAN. In some examples, the portions of RAN are the base stations (e.g. eNBs) of the RAN, in others, the portion(s) of the RAN may be a UE, or any other device being or to be served by the wireless network/RAN, or forming part of (or serving) the same, e.g. mobility management engine (MME), baseband unit (BBU), remote radio head (RRH) or, etc. In some examples, if the RAN control entity is physically distributed, the RAN control entity can be collocated with the macro BS, and only manage the slice portions that under the coverage of the macro BS. In some examples, if the RAN control entity is in a central location, the RAN control entity can manage a slice portion across multiple BSs which are under the coverage of the RAN control entity. The RAN control entity may comprise at least a portion controlling allocation of RAN, or device, resources according to a need of the one or more horizontal or vertical slices, for example computational resources at/in, or available to, a device in the wireless network.

As herein described, where an example or claim recites RF circuitry, for example, to form a greater entity within the wireless network, e.g. a base station, this is also intended to cover the or an alternative embodiment which does not include the RF circuitry, for example for use in (or to provide) a distributed form of entity according to the disclosure. This may be applicable, for example, when the entity forms part of a Cloud RAN, where the radio portions (e.g. RRH) are not co-located/within the same entity as at least a significant portion of the control function (entity, module, etc.), e.g. BBU. Thus, no embodiments are intended to be restricted to only those having an RF portion that sends or receives messages to or form the wireless network. For example, some implementations may be part of front-haul capabilities, which may be the connections to radio front ends (e.g. RRHs) from a centralized, or more centralized baseband function (e.g. BBU).

As used herein, any reference to computer program product or computer readable medium, may include reference to both transitory (e.g. physical media) and non-transitory forms (e.g. signals or data structures thereof).

Various examples disclosed herein may provide many advantages, for example, but not limited to: providing full(er) coverage for the devices being served, for any given amount of core network and/or RAN resources (e.g. computing, radio, etc.); less control signaling delay and signaling exchange overhead among transmission points; providing improved coverage and at the same time reducing control signaling exchange among network nodes (including transmission points); a more efficient (overall, or substantial portion of a) wireless network, for example because, it allows a given amount of (e.g. a single) physical radio access network infrastructure to be used by multiple use-cases, thereby resulting in less hardware/infrastructure than would otherwise be used (e.g. double, or more, hardware, for example to provide separate physical radio access network infrastructure for each use case); generally improved radio access network performance, efficiency, reliability, maintaining/maintenance of service and quality of service, for all devices operating across the RAN, and within each slice of the RAN.

As herein described, turn-on, activation or logical separation, or the like, of the, or a, network slice may be equivalent to one another, and the terms used inter-changeably. Similarly, the turn-off, deactivation or logical desperation, or the like, of a network slice may all be equivalent to one another, and the terms used inter-changeably. A network slice may also be referenced as a logically separate (separated, partitioned, etc.) radio network access, or as a logically separate (separated, partitioned, etc.) radio network access portion. A device being, or to be served by the physical radio access network infrastructure, or a network slice may include a UE, however any and all other forms of devices that may be served are also interchangeable with a reference to a UE herein. A device may be referenced as a wireless network device. However, a wireless network device as used herein may also reference a serving entity, such as base station, MME, BBU, RRH, etc., dependent on context of use. Operationally, in terms of the disclosed network slicing, an access point and base station may be considered similar in use or deployment.

As herein described, specific examples have been used to explain the disclosed methods and functions (and function units that carry out those functions), however, the disclosure is not so limited. For example, embodiments of the disclosure is/are not limited to any specific example, such as: where a specific vertical market is disclosed in relation to a Figure, this is only an example, and any vertical market may be used instead; where a specific portion of a slice is disclosed in relation to a Figure, any portion of a slice may be used instead; where a RAN has been disclosed as having a certain size, type or number of slices (horizontal or vertical) in relation to a Figure, any size, type or number of slices may be used instead; where a slice or slice portion has been disclosed as having a certain size, type or number (in the horizontal or the vertical) in relation to a Figure, any size, type or number of slice or slice portion may be used instead. Also, in the foregoing, whilst a numbering scheme for the slices has been applied starting from 1, other numbering schemes may also be implemented, e.g. the numbers may start from 0 instead, such that Slice #1 may be Slice #0, and the like. Thus, the specific numbers are not limiting, other than by showing an exemplary distinction between slices (by being differently numbered) or an exemplary relation between numbered slice portions (by being consecutively numbered sub-parts of the same numbered slice).

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware or software components, including a one or more virtual machines that can provide the described functionality. In some embodiments, the circuitry may be implemented in, or functions associated with the circuitry may be implemented by, one or more software or firmware modules. In some embodiments, circuitry may include logic, at least partially operable in hardware. In some embodiment, the processing/execution may be distributed instead of centralized processing/execution.

As used herein, any reference to a (RAN) architecture may include anything that may be defined as or thought of as any form of specific process(es), technique(s), technology(ies), implementation detail, improvement in or type of operation of a wireless network (or similar networking system entity), particularly in the RAN. Architectures may be typically introduced, maintained and updated in the standards documents for the respective wireless network technologies in use, for example the third generation partnership project (3GPP) standards, and the like.

It will be appreciated that any of the disclosed methods (or corresponding apparatuses, programs, data carriers, etc.) may be carried out by either a host or client, depending on the specific implementation (i.e. the disclosed methods/apparatuses are a form of communication(s), and as such, may be carried out from either 'point of view', i.e. in corresponding to each other fashion). Furthermore, it will be understood that the terms "receiving" and "transmitting" encompass "inputting" and "outputting" and are not limited to an RF context of transmitting and receiving radio waves. Therefore, for example, a chip or other device or component for realizing embodiments could generate data for output to another chip, device or component, or have as an input data from another chip, device or component, and such an output or input could be referred to as "transmit" and "receive" including gerund forms, that is, "transmitting" and "receiving", as well as such "transmitting" and "receiving" within an RF context.

As used in this specification, any formulation used of the style "at least one of A, B or C", and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order. There may be more or less than three features used in such formulations.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Unless otherwise explicitly stated as incompatible, or the physics or otherwise of the embodiments, example or claims prevent such a combination, the features of the foregoing embodiments and examples, and of the following claims may be integrated together in any suitable arrangement, especially ones where there is a beneficial effect in doing so. This is not limited to only any specified benefit, and instead may arise from an "ex post facto" benefit. This is to say that the combination of features is not limited by the described forms, particularly the form (e.g. numbering) of the example(s), embodiment(s), or dependency of the claim(s). Moreover, this also applies to the phrase "in one embodiment", "according to an embodiment" and the like, which are merely a stylistic form of wording and are not to be construed as limiting the following features to a separate embodiment to all other instances of the same or similar wording. This is to say, a reference to 'an', 'one' or 'some' embodiment(s) may be a reference to any one or more, and/or all embodiments, or combination(s) thereof, disclosed. Also, similarly, the reference to "the" embodiment may not be limited to the immediately preceding embodiment.

In the foregoing, reference to 'layer' may be a reference to a predefined (or definable) portion of the infrastructure, whereas reference to 'Layer' may be a reference to a network protocol Layer in operation on/in the network infrastructure, or portion thereof. Reference to MAC Layer may also comprise a reference to the MAC Layer and above, up to just below the IP Layer, and for example may comprise the RRC functions of the wireless network (or RAN). As used herein, a vertical slice may be referenced as or related to a vertical market segment. As used herein, any machine executable instructions may carry out a disclosed method, and may therefore be used synonymously with the term method.

The foregoing description of one or more implementations provides illustration and description, but is not intended to be exhaustive or to limit the scope of the claims to the precise form disclosed. Modifications and variations are possible in light of the above teachings or may be acquired from practice of various implementations of the disclosure.

The invention claimed is:

1. One or more non-transitory computer-readable storage mediums that store instructions for execution by one or more processors to perform wireless communications operations for a wireless communications system, the operations, when executed by the one or more processors, to:

perform horizontal computation resource slicing of a plurality of computation resources to obtain a set of horizontal computation resource slices, wherein a horizontal computation resource slice of the set of horizontal computation resource slices includes physical resources in two adjacent layers of a network hierarchy of the wireless communications system; and perform sharing and computation offloading via the plurality of computation resources according to any horizontal computation resource slice of the set of horizontal computation resource slices.

2. The one or more non-transitory computer-readable storage mediums of claim 1, wherein the wireless communications system comprises a sliceable radio access network (RAN) architecture, and the operations further comprise operations to:

manage, via a RAN control entity, a control plane (c-plane) and a user plane (u-plane) of underlay RAN slices.

3. The one or more non-transitory computer-readable storage mediums of claim 2, wherein the operations further comprise operations to:

identify an association of a c-plane slice; and identify an association of a single u-plane slice and the c-plane slice.

4. The one or more non-transitory computer-readable storage mediums of claim 1, wherein the operations further comprise operations to:

identify a first association of a first local component of a radio access network (RAN) and a second remote component of the RAN, the first association corresponding to a network slice; and identify a second association of the first local component of the RAN and a third component of the RAN that is different than the second component of the RAN, the second association corresponding to the network slice;

wherein the second association is based on at least one of traffic type, traffic load, or a Quality of Service (QoS) requirement.

5. The one or more non-transitory computer-readable storage mediums of claim 1, wherein the operations further comprise operations to:

provide mobile broadband (MBB) access and dedicated access for vertical markets or underlay networks.

6. The one or more non-transitory computer-readable storage mediums of claim 1, wherein the operations further comprise operations to:

execute a baseband unit (BBU) and remote radio head (RRH) function partition to enable network slicing with different deployment scenarios.

7. The one or more non-transitory computer-readable storage mediums of claim 6, wherein the one or more processors are included in an apparatus for an evolved nodeB (eNB), and the operations further comprise operations to:

perform a baseband unit (BBU) and remote radio head (RRH) function partition utilizing, at least in part, scheduling information for each network slice.

8. The one or more non-transitory computer-readable storage mediums of claim 1, wherein the operations further comprise operations to:

perform hypervisor operations for a computation platform;

provide a radio link to couple modem circuitry at a client device and a host device, the modem circuitry to include radio access technology (RAT) circuitry; and connect the computation platform at the client device and the host device via one or more containers.

9. The one or more non-transitory computer-readable storage mediums of claim 1, wherein the operations further comprise operations to:

execute vertical computation resource slicing of the plurality of computation resources.

10. The one or more non-transitory computer-readable storage mediums of claim 9, wherein at least one of a horizontal network slice or a vertical network slice is to comprise:
a core network slice; or
an air interface slice.

11. One or more apparatuses for a wireless communications system, comprising:
circuitry to execute horizontal computation resource slicing of a plurality of computation resources to obtain a set of horizontal computation resource slices, wherein a horizontal computation resource slice of the set of horizontal computation resource slices includes physical resources in two adjacent layers of a network hierarchy of the wireless communications system; and
circuitry to execute sharing and computation offloading via the plurality of computation resources according to any horizontal computation resource slice of the set of horizontal computation resource slices.

12. The one or more apparatuses of claim 11, wherein the wireless communications system comprises a sliceable radio access network (RAN) architecture, and further comprises:
a RAN control entity managing a control plane (c-plane) and a user plane (u-plane) of underlay RAN slices.

13. The one or more apparatuses of claim 12, further comprising:
circuitry to identify an association of a c-plane slice; and
circuitry to identify an association of a single u-plane slice and the c-plane slice.

14. The one or more apparatuses of claim 11, further comprising:
circuitry to identify a first association of a first local component of a radio access network (RAN) and a second remote component of the RAN, the first association corresponding to a network slice; and
circuitry to identify a second association of the first local component of the RAN and a third component of the RAN that is different than the second component of the RAN, the second association corresponding to the network slice;
wherein the second association is based on at least one of traffic type, traffic load, or a Quality of Service (QoS) requirement.

15. The one or more apparatuses of claim 11, further comprising:
circuitry to support mobile broadband (MBB) access and dedicated access for vertical markets or underlay networks.

16. The one or more apparatuses of claim 11, further comprising:
circuitry to execute a baseband unit (BBU) and remote radio head (RRH) function partition to enable network slicing with different deployment scenarios.

17. The one or more apparatuses of claim 16, wherein the one or more apparatuses are of an evolved nodeB (eNB) to perform a baseband unit (BBU) and remote radio head (RRH) function partition utilizing, at least in part, scheduling information for each network slice.

18. The one or more apparatuses of claim 11, further comprising:
hypervisor circuitry included in a computation platform;
radio access technology (RAT) circuitry included in a modem circuitry;
a radio link to couple the modem circuitry at a client device and a host device; and
container circuitry to connect the computation platform at the client device and the host device.

19. The one or more apparatuses of claim 11, further comprising:
circuitry to execute vertical computation resource slicing of the plurality of computation resources.

20. The one or more apparatuses of claim 19, wherein at least one of a horizontal network slice or a vertical network slice comprises:
a core network slice; or
an air interface slice.

21. The one or more non-transitory computer-readable storage mediums of claim 1, wherein the physical resources of the horizontal computation resource slice of the set of horizontal computation resource slices are contained within a vertical slice.

22. The one or more non-transitory computer-readable storage mediums of claim 1, wherein the physical resources of the horizontal computation resource slice of the set of horizontal computation resource slices are distributed across a plurality of vertical slices.

23. The one or more apparatuses of claim 11, wherein the physical resources of the horizontal computation resource slice of the set of horizontal computation resource slices are contained within a vertical slice.

24. The one or more apparatuses of claim 11, wherein the physical resources of the horizontal computation resource slice of the set of horizontal computation resource slices are distributed across a plurality of vertical slices.

* * * * *